United States Patent
Hansson et al.

(10) Patent No.: US 10,265,612 B2
(45) Date of Patent: Apr. 23, 2019

(54) VIDEO GAME WITH REPLACEABLE TILES HAVING SELECTABLE PHYSICS

(71) Applicant: KING.COM LIMITED, St. Julians (MT)

(72) Inventors: Magnus Hansson, Stockholm (SE); Niclas Alftberg, Stockholm (SE); Tobias Nyblom, Stockholm (SE); Rikard Jaksch, Stockholm (SE)

(73) Assignee: KING.COM LTD., St. Julians (MT)

( * ) Notice: Subject to any disclaimer, the term of this patent is extended or adjusted under 35 U.S.C. 154(b) by 0 days.

(21) Appl. No.: 15/597,412

(22) Filed: May 17, 2017

(65) Prior Publication Data

US 2017/0246530 A1    Aug. 31, 2017

Related U.S. Application Data

(63) Continuation of application No. 14/609,971, filed on Jan. 30, 2015, now Pat. No. 9,687,729, which is a
(Continued)

(30) Foreign Application Priority Data

Feb. 19, 2013 (GB) .................................... 1302910.3
Jun. 21, 2013 (GB) .................................... 1311119.0
(Continued)

(51) Int. Cl.
*A63F 13/40* (2014.01)
*A63F 9/06* (2006.01)
(Continued)

(52) U.S. Cl.
CPC ............ *A63F 9/0612* (2013.01); *A63F 13/00* (2013.01); *A63F 13/005* (2013.01); *A63F 13/10* (2013.01);
(Continued)

(58) Field of Classification Search
CPC .... A63F 13/06; A63F 13/10; A63F 2300/609; A63F 2300/64; A63F 2300/646;
(Continued)

(56) References Cited

U.S. PATENT DOCUMENTS 5,488,496 A   1/1996  Pine
6,068,552 A   5/2000  Walker et al.
(Continued)

FOREIGN PATENT DOCUMENTS

DE    10304725 A1   9/2004
EP     1564698 A2   8/2005
(Continued)

OTHER PUBLICATIONS

International Search Report, dated May 13, 2015, and Written Opinion, issued in corresponding International Application No. PCT/EP2015/052000, dated May 13, 2015.
(Continued)

*Primary Examiner* — Lawrence S Galka
(74) *Attorney, Agent, or Firm* — Saul Ewing Arnstein & Lehr LLP

(57) ABSTRACT

A computer device has user interface configured to display user actuatable game elements and to detect user input when a user engages with a game element; and a processor configured to receive a detected user input and on detecting a match game condition to control the user interface to remove at least three game elements from the display and to provide on the user interface replacement user actuatable game elements, wherein the manner of providing each replacement game element has a graphical representation governed by a tile associated with each game element, wherein each tile has a selectable physics which controls at least one of (i) the direction in which it moves to replenish
(Continued)

a vacancy left by the removed user game elements; and (ii) the speed at which it moves to replenish the vacancy.

20 Claims, 32 Drawing Sheets

Related U.S. Application Data continuation of application No. 14/316,274, filed on Jun. 26, 2014, now Pat. No. 9,079,097, which is a continuation-in-part of application No. 14/183,997, filed on Feb. 19, 2014, now Pat. No. 9,592,441, which is a continuation-in-part of application No. 14/029,261, filed on Sep. 17, 2013, now Pat. No. 9,526,982, and a continuation-in-part of application No. 14/029,538, filed on Sep. 17, 2013, now Pat. No. 9,579,569.

(30) Foreign Application Priority Data

| Oct. 17, 2013 | (GB) | 1318416.3 |
|---|---|---|
| Jan. 31, 2014 | (GB) | 1401717.2 |

(51) Int. Cl.
| A63F 13/20 | (2014.01) |
|---|---|
| A63F 13/52 | (2014.01) |
| A63F 13/56 | (2014.01) |
| A63F 13/55 | (2014.01) |
| A63F 13/50 | (2014.01) |
| A63F 13/57 | (2014.01) |
| A63F 13/45 | (2014.01) |
| A63F 13/00 | (2014.01) |
| A63F 13/30 | (2014.01) |
| G06F 9/44 | (2018.01) |
| G07F 17/32 | (2006.01) |
| A63F 13/2145 | (2014.01) |
| A63F 13/92 | (2014.01) |
| A63F 13/23 | (2014.01) |
| A63F 13/48 | (2014.01) |

(52) U.S. Cl.
CPC .............. *A63F 13/12* (2013.01); *A63F 13/20* (2014.09); *A63F 13/2145* (2014.09); *A63F 13/23* (2014.09); *A63F 13/45* (2014.09); *A63F 13/48* (2014.09); *A63F 13/50* (2014.09); *A63F 13/52* (2014.09); *A63F 13/55* (2014.09); *A63F 13/56* (2014.09); *A63F 13/57* (2014.09); *A63F 13/92* (2014.09); *G06F 9/44* (2013.01); *G07F 17/32* (2013.01); *G07F 17/3274* (2013.01); *A63F 2300/1075* (2013.01)

(58) Field of Classification Search
CPC .......... A63F 13/45; A63F 13/50; A63F 13/52; A63F 13/55; A63F 13/57; A63F 13/63
See application file for complete search history.

(56) References Cited

U.S. PATENT DOCUMENTS

| 6,117,013 | A | 9/2000 | Eiba |
|---|---|---|---|
| 7,073,792 | B2 | 7/2006 | Esposito et al. |
| 7,749,060 | B1 | 7/2010 | Olmes et al. |
| 8,002,633 | B2 | 8/2011 | Shimizu et al. |
| 8,075,404 | B2 | 12/2011 | Stamper et al. |
| 8,088,010 | B1 | 1/2012 | Hill et al. |
| 8,237,743 | B2 | 8/2012 | Csurka et al. |
| 8,277,320 | B1 | 10/2012 | Hart et al. |
| 8,369,873 | B2 | 2/2013 | Krasner et al. |
| 8,388,446 | B1 | 3/2013 | Craine et al. |
| 8,526,490 | B2 | 9/2013 | Buckley et al. |
| 8,672,744 | B1 | 3/2014 | Steere et al. |
| 8,711,923 | B2 | 4/2014 | Buckley et al. |
| 8,727,893 | B2 | 5/2014 | Otremba et al. |
| 8,784,181 | B2 | 7/2014 | Frank et al. |
| 8,964,830 | B2 | 2/2015 | Perlman et al. |
| 9,033,803 | B1 | 5/2015 | Etter et al. |
| 9,446,313 | B2 | 9/2016 | Norden |
| 2002/0082068 | A1 | 6/2002 | Singhal et al. |
| 2002/0094870 | A1 | 7/2002 | Murray et al. |
| 2003/0049592 | A1 | 3/2003 | Park et al. |
| 2003/0050118 | A1 | 3/2003 | Suzuki et al. |
| 2003/0074416 | A1 | 4/2003 | Bates et al. |
| 2003/0119581 | A1 | 6/2003 | Cannon et al. |
| 2004/0053688 | A1 | 3/2004 | Hosaka et al. |
| 2004/0224772 | A1 | 11/2004 | Canessa et al. |
| 2005/0256985 | A1 | 11/2005 | Shea et al. |
| 2006/0068876 | A1 | 3/2006 | Kane et al. |
| 2006/0160620 | A1 | 7/2006 | Matthews et al. |
| 2006/0223635 | A1 | 10/2006 | Rosenberg et al. |
| 2006/0277474 | A1 | 12/2006 | Robarts et al. |
| 2006/0281541 | A1 | 12/2006 | Nguyen et al. |
| 2006/0287098 | A1 | 12/2006 | Morrow et al. |
| 2007/0259709 | A1 | 11/2007 | Kelly et al. |
| 2008/0005353 | A1 | 1/2008 | Panabaker et al. |
| 2009/0170608 | A1 | 7/2009 | Herrmann et al. |
| 2009/0203415 | A1 | 8/2009 | Falciglia et al. |
| 2009/0209311 | A1 | 8/2009 | Bennett et al. |
| 2010/0144426 | A1 | 6/2010 | Winner et al. |
| 2010/0151934 | A1 | 6/2010 | Kniberg et al. |
| 2010/0218135 | A1 | 8/2010 | Brugler et al. |
| 2010/0227675 | A1 | 9/2010 | Luxton et al. |
| 2010/0271367 | A1 | 10/2010 | Vaden et al. |
| 2010/0317437 | A1 | 12/2010 | Berry et al. |
| 2011/0014977 | A1 | 1/2011 | Yamazaki et al. |
| 2011/0053681 | A1 | 3/2011 | Goldman et al. |
| 2011/0111835 | A1 | 5/2011 | Cohen et al. |
| 2011/0136561 | A1 | 6/2011 | Acres et al. |
| 2011/0136572 | A1 | 6/2011 | Karn et al. |
| 2011/0230246 | A1 | 9/2011 | Brook et al. |
| 2011/0269532 | A1 | 11/2011 | Shuster et al. |
| 2012/0030094 | A1 | 2/2012 | Khalil et al. |
| 2012/0040752 | A1 | 2/2012 | Koo et al. |
| 2012/0064969 | A1 | 3/2012 | Uchibori et al. |
| 2012/0077580 | A1 | 3/2012 | Mahajan et al. |
| 2012/0079126 | A1 | 3/2012 | Evans et al. |
| 2012/0122552 | A1 | 5/2012 | Youm et al. |
| 2012/0191606 | A1 | 7/2012 | Milne et al. |
| 2012/0198417 | A1 | 8/2012 | Haviv et al. |
| 2012/0311036 | A1 | 12/2012 | Huhn et al. |
| 2013/0035164 | A1 | 2/2013 | Osvald et al. |
| 2013/0109469 | A1 | 5/2013 | Hill et al. |
| 2013/0172061 | A1 | 7/2013 | Iosilevsky et al. |
| 2013/0267285 | A1 | 10/2013 | Kelley et al. |
| 2013/0316832 | A1 | 11/2013 | Olofsson et al. |
| 2013/0323697 | A1 | 12/2013 | Shadduck et al. |
| 2013/0331162 | A1 | 12/2013 | Krivicich et al. |
| 2014/0024450 | A1 | 1/2014 | Ramachandran et al. |
| 2014/0080600 | A1 | 3/2014 | Knutsson et al. |
| 2014/0235338 | A1 | 8/2014 | Hansson et al. |
| 2014/0252987 | A1 | 9/2014 | Hinrichs et al. |
| 2014/0342791 | A1* | 11/2014 | Hugh .................. A63F 13/80 463/9 |
| 2014/0357367 | A1 | 12/2014 | Lee |
| 2014/0370950 | A1 | 12/2014 | Jaksch et al. |
| 2015/0050997 | A1 | 2/2015 | Suzman et al. |
| 2015/0174489 | A1 | 6/2015 | Evald et al. |

FOREIGN PATENT DOCUMENTS

| EP | 1870143 A1 | 12/2007 |
|---|---|---|
| EP | 2211299 A2 | 7/2010 |
| JP | 2005-228086 | 8/2005 |
| JP | 2012-61060 A | 3/2012 |
| WO | 01/46790 A2 | 6/2001 |
| WO | 2006/052212 A1 | 5/2006 |
| WO | 2007/078533 | 7/2007 |
| WO | 2007/078533 A2 | 7/2007 |
| WO | 2008/109685 A2 | 9/2008 |

(56) References Cited

FOREIGN PATENT DOCUMENTS

| | | | |
|---|---|---|---|
| WO | 2009/029108 | A1 | 3/2009 |
| WO | 2010/002897 | | 1/2010 |
| WO | 2010/083346 | A1 | 7/2010 |
| WO | 2010/096784 | A1 | 8/2010 |
| WO | 2011/011466 | | 1/2011 |
| WO | 2011/041467 | A2 | 4/2011 |
| WO | 2012/013198 | A1 | 2/2012 |
| WO | 2013/174933 | | 11/2013 |

OTHER PUBLICATIONS

Adbang, "How to block Anipang heart at i-phone", Internet blog, Internet: URL:http://blog.naver.com/cyco5202/110147101106, Sep. 11, 2012.

Anonymous, "Amazon Survival YouTube video, Uploaded to YouTube on Mar. 13, 2009, video length 6:06", https://www.youtube.com/watch?v=8S2gM5POUUk, Mar. 13, 2009, 1.

Anonymous, "Bejeweled 2 Wikipedia Article", Sep. 30, 2015, 1-3.

Anonymous, "Bejeweled article", Wikipedia, Sep. 30, 2015.

Anonymous, "Best iOS/Androoid cross-platform mobiledevelopment SDKs", retrieved from the Internet: URL:http://webification.com/best-iosandroid-cross-platform-mobile-development-sdks [retrieved on Jul. 2, 2013] XP055069062, Sep. 26, 2011, p. 1.

Anonymous, "Bubble Witch Saga—GameSpot", Retrieved from the Internet: URL:http://www.gamespot.co/bubble-witch-saga/ [retrieved on Mar. 21, 2014] XP055109245, pp. 1-2.

Anonymous, "Buck Rodgers Turn Based Strategy Game Design and Planning Document", https://cs.nyu.edu/courses/spring07/V22.0474.001/groups/tbsgame/tbsgame_des_pdf, Feb. 21, 2007.

Anonymous, "Candy Crush Saga Facebook Game levels 1-10 video on YouTube, YouTube screen shorts figures 1-7", https://www.youtube.com/watch?v=8TleNDnJiN8, Apr. 15, 2012.

Anonymous, "Candy Crush Saga for Facebook, YouTube video demonstrating levels 1-10, video length 15:23", https://www.youtube.com/watch?v=cfqHVkWX5yE, Apr. 12, 2012, 1 page.

Anonymous, "Candy Crush Saga on Facebook Review on YouTube video, Screen shots of YouTube video, figures 1-13", https://www.youtube.com/watch?v=AbH8Givg6XM, Sep. 7, 2012.

Anonymous, "Cross-platform", retrieved from the Internet: URL:http://en.widipedia.org/w/index.php?title=Cross-plafform&oldid=487867404 [retrieved on Jul. 1, 2013] XP055068984, Apr. 17, 2012, pp. 1-16.

Anonymous, "Daily Bonus Level Oct. 17, 2012: Bubble Witch Saga Fan Site", retrieved from the Internet:URL:http://bubble-witch-saga.se/daily-bonus-level-17-oct-2012/ [retrieved on Mar. 21, 2014] XP055109244, Oct. 17, 2012, pp. 1-2.

Anonymous, "Dig Dug article", Wikipedia, Sep. 30, 2015.

Anonymous, "Facebook Platform—Wikipedia, the free encyclopedia", Retrieved from the Internet: URL:http://en.wikipedia.org/w/index.php?title=Facebook_Platofrm&oldid=533105338 [retrieved on Mar. 21, 2014] XP055109249, pp. 1-2.

Anonymous, "Facebook Spiel Candy Crush Saga: Cheats, Tipps, News and Videos BILDspielt", URL: http://www.bildspielt.de/social-games/3-gewinnt/candy-crush-saga-180643/[retrieved on Oct. 25, 2013] XP055085339, Apr. 12, 2012, pp. 1-10.

Anonymous, "Game Architecture: Model-View-Controller", retrieved from the Internet: URL:http://www.koonsolo.com/news/model-view-controller-for-games/ [retrieved on Oct. 8, 2013] XP055083073, Jul. 13, 2009, pp. 1-2.

Anonymous, "Guide to Bubble Witch Saga—Facebook Hints & Tips—How to level guide", retrieved from the Internet: URL:http://reindeerz.hubpags.com/hub/Bubblewitch [retrieved on Dec. 9, 2012] XP055092347, Apr. 10, 2012, pp. 1-2.

Anonymous, "iPhone Game 'Trism' break $250,000. Review.—[Updated] razorianflyofficial", retrieved from the Internet: URL: https://razorianflyofficial.wordpress.com/2008/09/25/iphone-game-trism-breaks-25000-review/, [retrieved on Apr. 15, 2015] XP055183153, Sep. 26, 2008.

Anonymous, "King.com expands to Google+ with Bubble Witch Saga", Retrieved from the Internet: URL:http://www.insidesocialgames.com/2012/01/24/king-com-expands-to-google-with-bubble-witch-saga/ [retrieved on Mar. 21, 2014] KP055109246, Jan. 24, 2012, pp. 1-2.

Anonymous, "King.com Skill Games for iPhone and Facebook: http://www.ubergizmo.com/2009/07/king-com-skill-games-for-iphone-and-facebook/", retrieved from the Internet: URL:http://www.google.de/imgres?client=firefox-a&hs=0gJ&sa=X&rls=org.mozilla:en-GB:official&biw=1680&bih=858&tbm=isch&tbnid=Dp0hnHVKMxtoUM:&imgrefurl=http://www.ubergizmo.com/2009/07/king-com-skill-games-for-iphone-and-faceboo, Jul. 13, 2009, pp. 1-2.

Anonymous, "Minecraft", retrieved from the Internet: URL:http://en.widipedia.org/w/index?title=Minecraft&oldid=409326251 [retrieved on Jul. 1, 2013] XP055068987, May 2, 2014.

Anonymous, "Model-view-controller", retrieved from the Internet: URL:http://en.widipedia.org/w/index/php?title=Model%E2%80%93view%E2%80%93controller&oldid=511810952 'retrieved on Oct. 8, 2013] XP055083072, Sep. 11, 2012, pp. 1-2.

Anonymous, "OpenOffice, Creating Charts and Graphs", Dec. 2004, 1-17.

Anonymous, "Pygame", retrieved from the Internet: URL:http://web.archive/org/web/20120413123244/http://www. pygame.org/wiki/tut_design [retrieved on Oct. 8, 2013 XP055083074, Apr. 13, 2012, pp. 1-5.

Anonymous, "Salesforce Tutorial—Model View Controller (MVC)", [online] Retrieves from the Internet: <https://web.archive.org/web/20130814042919/http://www.salesforcetutorial.com/model-view-controller-mvc> [retrieved Jul. 1, 2016], Apr. 10, 2013.

Anonymous, "Search for Play Free Online Games on GamesGames. com Home Action Strategy Bomberman War Games Shoot & Throw Worms Fly & Shoot Run & Shoot Tower Defence Flying Wreck the City Adventure Collect & Run Puzzle & Run Role Playing Games Escaping Jump & Shoot Point", retrieved from the Internet: URL:http://web.archive.org/web/20120621061714/http://www.gamesgames.com/games/social-games/social-games.html [retrieved on Oct. 15, 2013] XP055084089, Jun. 21, 2012, pp. 4-6.

Anonymous, "Why King.com's Candy Crush is crushing it on Facebook", retrieved from the Internet: URL: http://blog.games.com/2012/05/01/why-king-coms-candy-crush-is-crushing-it-on-facebook/ [retrieved on Oct. 25, 2013] KP055085338, May 1, 2012, pp. 1-4.

Collins, "Will Collins Game Spotlight: Candy Crush Saga", retrieved from the Internet: URL:https/developers.facebook.com/blog/post/2012/06/15/game-spotlight--candy-crush-saga/ [retrieved on Oct. 25, 2013] XP055085345, Jun. 15, 2012, pp. 1-2.

Demeter, "Trism: Upcoming iPhone Game by Demiforce", retrieved from the Internet: URL: https://www.youtube.com/watch?v=hy0ptZisr70, [retrieved on Apr. 16, 2015] XP054975820, Feb. 26, 2008.

Dotson, "Bubble Witch Saga Pops Bubbles o iOS and Facebook >148Apps> iPhone, iPad, and iPod touch App Reviews and News", retrieved from the Internet: URL:http://www.148apps.com/news/bubble-witch-saga-pops-bubbles-ios-facebook/ [retrieved on Dec. 9, 2013] XP055092342, Jul. 27, 2012, pp. 1-2.

Duffy, "Home Product Guies Software Internet 7 Great Google+ Games You Might Also Like", retrieved from the Internet: URL:http://www.pcmag.com/article2/0,2817,2391136,00.asp [retrieved on Oct. 15, 2013] XP055084091, Aug. 16, 2011, p. 1.

Goad, ""Why King.com's Candy Crush is crushing it on Facebook"", Games.com [online], Internet: URL:http://blog.games.com/2012/05/01/why-king-comes-candy-crush-is-crushing-it-onfacebook/, May 1, 2012.

Josef, "Bloxley Tutorial #1—Sokoban", http://bloxley.net/2010/10/tutorial-1-sokoban, Oct. 13, 2010.

Kangbelief, ""Kakao talk, how to reject the undesired invitation message of Anipang and receive the heart quietly"", Internet blog, Internet: URL:http://kangbelief.tistory.com/312, Sep. 16, 2012.

Murphy, "Bejeweled 2 Strategy Guide", www.bigfishgames.com, Aug. 15, 2010

Namco, "Dig Dug Video Game (copy unavailable)", 1982.

Popcap, "Bejeweled Video Game (copy unavailable)", 2001.

(56) References Cited

OTHER PUBLICATIONS

Rua, "Candy Crush Saga Gameplay First Look (Episode 1-10 levels)", Video on YouTube, screen shots 4 pages, video length 15:40; retrieved from the Internet: https://www.youtube.com/watch?v=8TleNDnJiN8 [retrieved on Oct. 28, 2016], Apr. 15, 2012.

Schoenau-Fog, "The Player Engagement Process—An Exploration of Continuation Desire in Digital Games", http://www.digra.org/wp—content/uploads/digital-library/11307.06025.pdf, 2011.

Squires, "Bubble Witch Saga is going mobile—Gamezebo", retrieved from the Internet: URL:http://www.gamezebo.com/news/2012/06/27/bubble-witch-saga-going-mobile [retrieved on Dec. 9, 2013] XP055092339, Jun. 27, 2012, pp. 1-2.

'Classic Game Room—Bejeweled 3 review for Nintendo DS, screen shot 1 page, video length 4:22; retrieved from the Internet; URL: https://www.youtube.com/watch?v=pxVGdIJTVxQ ,Dec. 16, 2011.

'Sutek's Tomb on YouTube, Screen shot 2 pages, video length 6:59, retrieved from the Internet: URL: https://www.youtube.com/watch?v=D0Z1FN7OSwE,Aug. 12, 2007.

'Bejeweled 3 Video Review, retrieved from the Internet: URL: https://www.youtube.com/watch?v=Nnb4z-BpQA8; dated Dec. 7, 2010.

'Bejeweled Blitz 878,550 Points "elite Technique" Legit No Boosts Facebook, YouTube Video, 2 page screen shot; retrieved from the Internet: URL: https://www.youtube.com/watch?v=eusZMBjSD5E.

'Match-3 in Construct 2: part one, Retrieved from the Internet; URL: http://weconstruct.blogspot.com/2011/12/match-3-in-construct-2-part-one.html; posed on Dec. 16, 2011.

Lee,Xah et al.,Bejeweled Blitz Strategy as Math, 4 pages ,Sep. 22, 2011.

\* cited by examiner

VIDEO GAME WITH REPLACEABLE TILES HAVING SELECTABLE PHYSICS

CROSS-REFERENCE TO RELATED APPLICATIONS

This application is a continuation of U.S. application Ser. No. 14/609,971, filed Jan. 30, 2015, which is a continuation of U.S. application Ser. No. 14/316,274, filed Jun. 26, 2014, which is a continuation-in-part of U.S. application Ser. No. 14/183,997, filed Feb. 19, 2014, which is a continuation-in part of U.S. application Ser. No. 14/029,261, filed Sep. 17, 2013; and a continuation-in-part of U.S. application Ser. No. 14/029,538, filed Sep. 17, 2013, and is based on, and claims priority to GB Application No. 1302910.3, filed Feb. 19, 2013; GB Application No. 1311119.0, filed Jun. 21, 2013; GB Application No. 1318416.3, filed Oct. 17, 2013; and GB Application No. 1401717.2, filed Jan. 31, 2014, the entire contents of each of which is fully incorporated herein by reference.

FIELD OF THE INVENTION

The present invention relates to controlling a user interface responsive to user engagement with displayed elements on the interface of a computer device.

BACKGROUND OF THE INVENTION

In the field of computer-implemented games, there are many technical challenges facing the designer of such games when considering how the user interface is to be controlled in the context of computer devices available to play the game.

One technical challenge can involve allowing a game to be fun and compelling even when there is limited display resource available, such as when a game is being played on a smartphone, tablet or other minicomputer. Another significant challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

An existing type of match-three game is a so-called "switcher" game. A match-three game is a type of casual puzzle game where the player is required to find patterns on a seemingly chaotic board. The player then has to match three or more of the same type of game element on the game board and those matched elements will then disappear. In a switcher game, the player switches place onto adjacent game elements on the game board so that one or both of them create a chain of at least three adjacent game elements of the same type. Those matched game elements will then disappear. The game board is then repopulated with game objects.

One such known match three-type game is known by the trade name Candy Crush. In that game, the game board is repopulated with game elements which are perceived as falling downwards onto the game board from the top edge of the screen from which the game is played.

SUMMARY OF THE INVENTION

Aspects of the present invention provide improved methods of controlling a user interface in the context of a computer-implemented game of the match three game-type. They provide a solution to the technical problem of user engagement with a limited screen resource and/or improve user engagement.

One aspect of the present invention provides a computer device having a user interface configured to display user actuatable game elements and to detect user input when a user engages with a game element a processor configured to receive a detected user input and on detecting a match game condition to control the user interface to remove at least three game elements from the display and to provide on the user interface replacement user actuatable game elements, wherein the manner of providing each replacement game element has a graphical representation governed by a tile associated with each game element, wherein each tile has a selectable physics which controls at least one of (i) the direction in which it moves to replenish a vacancy left by the removed user game elements; and (ii) the speed at which it moves to replenish the vacancy.

In one embodiment of the game, the processor is configured to select the physics for each tile based on user input at the user interface.

The user input can be a deliberately generated user input to alter the physics of tiles which would then govern how game elements are replaced. Alternatively, the user input can form part of the game play as discussed more fully in the following.

In the following described embodiments, the physics of the tile which is adjusted as the direction in which a replacement tiles moves. However, the speed at which a tile moves can also be adjusted, either by deliberate user input or by player involvement in the game. Thus, a tile can be replenished at various speeds depending on how a player has played the game. This is, the game element could arrive extremely quickly, or could arrive more slowly associated with visual animations of its arrival.

The processor may be configured to select physics for each tile based on the location on the display at which the at least three game elements are removed. That is, part of the displayed game board is replenished with game elements according to one physics, and another part would be replenished with game elements of another physics.

The computer device can comprise a graphics controller which is connected to receive information for the processor defining the graphical representation and to supply the graphical representation to the user interface in the form of a video sequence based on the physics of the tile. For example, the game element can be perceived as falling downwards or moving upwards.

The user interface can be configured to display each tile with a visual indication of its selected physics, such as colour.

The user interface can be configured to display a separator between tiles of a first physics and tiles of a second physics. In this case, the displayed part of the game board may be shown in two colours representing two different physics. In the described embodiment, the tiles of the first physics move in a direction replenish a vacancy downwards from an upper portion of the screen, and tiles of the second physics move in the direction to replenish a vacancy upwards from a lower portion of the screen. The lower part of the screen is purple referred to herein as "lemonade". It could be termed water or soda or any fluid name. More generically, any highlighting nomenclature could be utilised. In the lemonade, the tiles move upwards. The selectable physics controls a direction in any orientation of the Cartesian or polar axes for replenishment of tiles from an outer portion of a game board to an inner portion of a game board. In one game mechanic, the user interface is configured to display a balloon game element which alters the physics of a set of displayed tiles when a match game condition of game elements associated with the balloon element is detected. The balloon element does not need to take the form of a balloon—any container type icon would be suitable, such as a bottle. The balloon "bursts" and causes more game elements to have the "lemonade" physics. Game elements are associated with the balloon element by virtue of having a matching colour with the balloon element. If a match for example, of red game elements is detected, a red balloon will "burst", increasing the level of the "lemonade": the separator will rise one or more rows up the displayed parts of the game board. The tiles are arranged in rows and columns in one version of the game. The separator extends laterally across the game board between two rows of lines.

In a grid-type arrangement, the set of tiles whose physics is altered by the balloon game element is a row of tiles. Any other kind of set could be chosen, e.g. three rows, top to bottom, one column etc.

To visually demonstrate different physics to a user, the user interface can be controlled by the processor to sequentially apply a visual effect to sets of tiles, thereby indicating physics of the tiles. The visual effect can be a highlighting or shimmer effect, wherein game elements are temporarily enlarged and/or brightened.

In a grid arrangement, the visual effect is sequentially applied to adjacent rows. To distinguish different game physics, the visual effect is applied in a first direction in a set of rows above the separator and not in a set of rows below the separator.

In one version of the game, the number of replacement game elements is the same as the number of game elements in the match condition. However, the number could be different—the location of a spawner can be set to replenish vacancies according to selected tile physics.

In a particularly distinctive optional feature, a game board of the game elements is generated by the processor, but only a portion of the game board is displayed to a user, with subsequent portions of the game board being displayed as a result of a scrolling action displayed on the user interface.

Another aspect of the invention provides user interface responsive to user engagement with displayed game elements on the interface, the method comprising the following steps implemented by a processor of a computer device; detecting a match game condition of at least three game elements responsive to user input; generating replacement game elements to be displayed, each game element associated with a tile; selecting a physics for each tile; controlling a graphical representation on the user interface of replacing the game element based on the selected tile physics, wherein the tile physics controls at least one of (i) the direction in which it moves to replenish the vacancy left by the removed game elements; and (ii) the speed at which it moves to replenish the vacancy.

In a grid-type arrangement, the user interface displays a game board of game elements in rows, and wherein there is a visual indication of the tile physics associated with each tile in a row. All tiles in the same row have the same physics. Where a separator is displayed on the user interface between adjacent rows of differing tile physics, the location of the separator on the game board can be adjusted by user input which causes the "balloon" elements to be actuated thereby increasing the number of tiles below the separator.

In one game mechanic, a game character is displayed on a tile having a first kind of physics, and movement of that character over the game board is affected by the tile physics of the set of tiles surrounding the game character. For example, the character moves up in the "lemonade" as game elements above him are removed. A target row is identified on the display (for example, with visual targets such as rubber rings) and one game objective is to cause the game character to move up to the target row.

Where the full game board is not displayed on the user interface, a portion of the game board is displayed on the user interface, the displayed portion varying as a result of a scrolling action to display different portions of the game board on the display.

When a first portion of the game board is displayed on the display the target row is not visible to a player, and wherein when a second portion of the game board is displayed on the display as a result of said scrolling action, the target row comes into view of the player.

Another aspect of the invention provides a computer device having: a user interface configured to generate a game board having game elements for display for engagement by a user; and a processor configured to control the user interface responsive to user engagement with the game element to remove from the display game elements on detection of a match game condition and to provide replacement game elements on the display, wherein a portion of the game board is displayed, including the replacement game elements, said portion being controlled to change by a scrolling action whereby enabling portion of the game board is newly displayed and a previously displayed portion of the game board is removed from the display.

Another aspect provides a method of controlling a user interface in a computer device to show a portion of a match three game board and to scroll the game board to show different portions responsive to user input at the user interface to detect and activate matched game elements.

Another embodiment provides a computer device having: a user interface configured to display user game elements and to detect user input when a user engages with a game element; and a processor configured to receive a detected user input and on detecting a game condition to control the user interface to provide a graphical representation of one or more game elements, wherein movement of one or more game elements is controlled by a selectable physics which controls the direction in which it moves.

Another embodiment provides a computer implemented method of controlling a user interface responsive to user engagement with displayed game elements on the interface, the method comprising the following steps implemented by a processor of a computer device;
  detecting a game condition responsive to user input;
  generating game elements to be displayed;
  selecting a physics; and
  controlling a graphical representation on the user interface of one or more game elements, wherein movement of one or more game elements is controlled by said selectable physics which controls the direction in which it moves.

A further aspect provides computer program products for implementing the afore-defined methods.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the present invention and to show how the same may be carried into effect, reference will now be made by way of example to the accompanying drawings in which.

DESCRIPTION OF PREFERRED EMBODIMENTS

The terms user and player are used interchangeably throughout this document and no specific meaning is intended using one or the other unless the context suggests otherwise.

In the following description of various implementations of the invention, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

Figure 1:
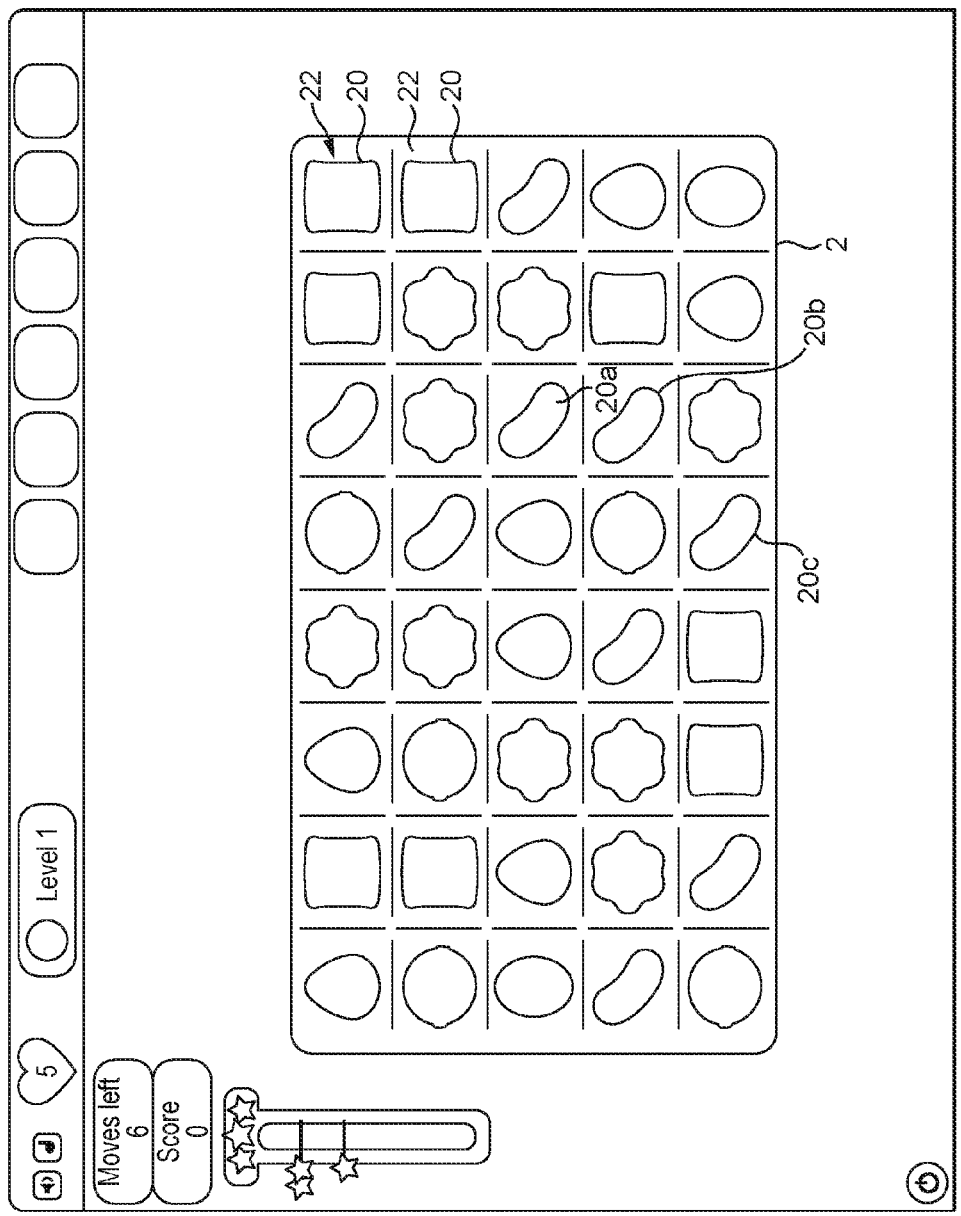
FIG. 1 is a schematic diagram of a game board of an existing version of a match three game.

FIG. 1 shows a display of a known version of a match 3 switches game called Candy Crush Saga™. FIG. 1 illustrates a game board 2 with a plurality of game elements 20. The game elements are each of six different shapes and colours. Each game element is supported by a tile 22. The tiles are not readily visible to a player of the game—the game elements are the main focus for a player. However, the tiles govern characteristics of the game elements which are visible to a player as will be described in more detail later.

Figure 2:
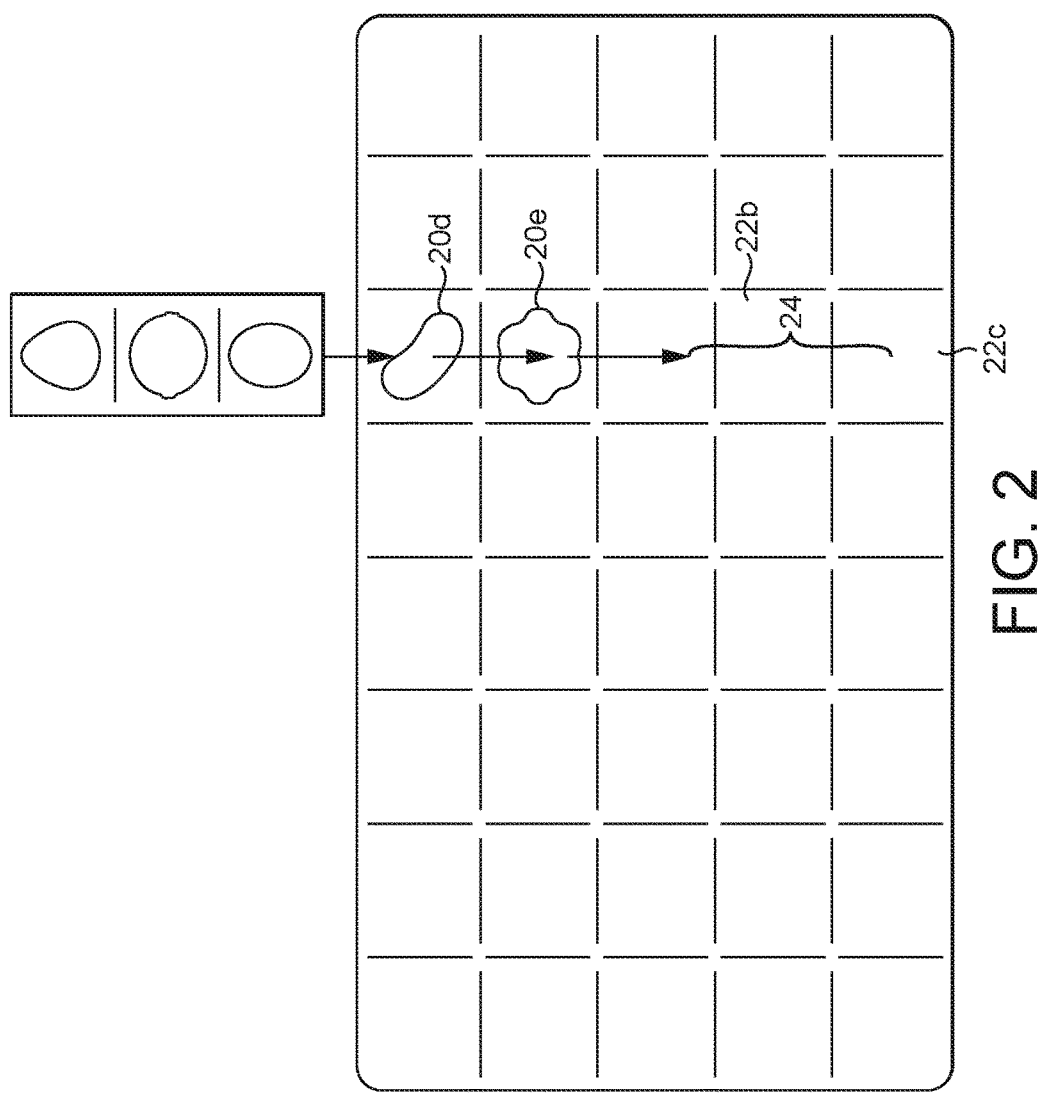
FIG. 2 is a schematic diagram illustrating how a game board is repopulated with replacement game elements.
Figure 3:
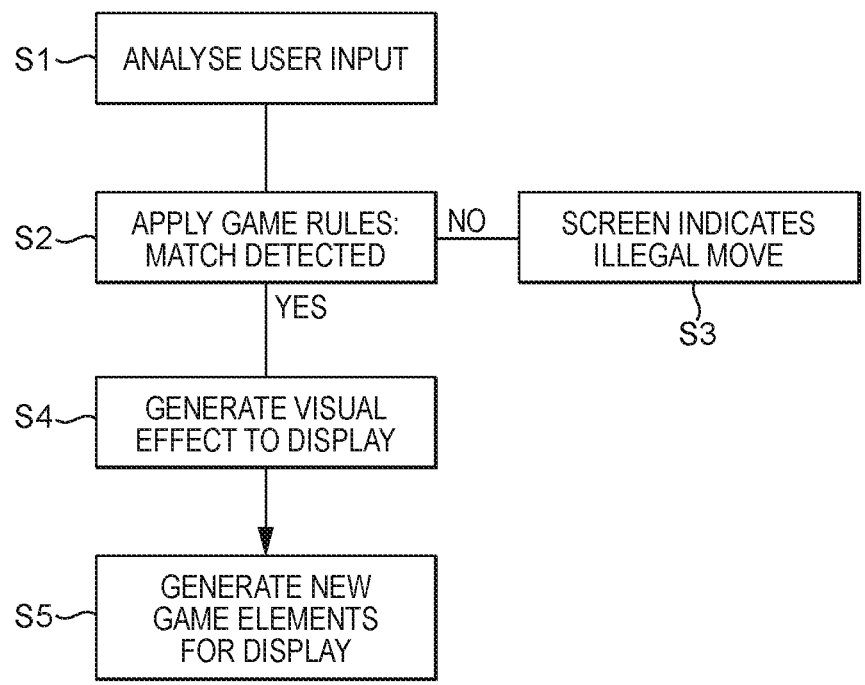
FIG. 3 is a flow chart indicating the operation of the replacement of FIG. 2.

In the known version of the match 3 switcher game, the aim of the game is to swop game elements in the shape of candies with each other to make moves on the game board. To gain points the player has to make moves that create matches of at least three of the same candy. In doing so, the player gains points and the matched candies are removed. As a result new candies fall into place from the top of the game board in order to fill any spaces created. Assume in FIG. 1 that game element 20c is moved one place to the right to form a three-line match with game elements 20a and 20b. Turning now to FIG. 2, this has the effect of game board elements 20a, 20b and 20c "disappearing", creating a visual effect (animation) on the screen to indicate the disappearance, such as a minimal explosion effect denoted 24 in FIG. 2. The two game elements which were directly above game elements 20a will now fall downwards into the spaces created by the removal of game elements 20a, 20b and 20c. Thus, game element 20e will end up at the location of tile 22c, and game element 20d will end up at the location of tile 22b. In addition, three new tiles with game elements are "created" and fall downwards into the game board to fill the remaining three spaces above tile 22b. The game elements on the newly created tiles which fall downwards into the game board are generated at random. The user then has a new game board on which to play a subsequent move. FIG. 3 is a flow chart illustrating a process implemented by software in a processor for executing the basic game mechanic just discussed. At step S1 the input made by a player on the screen is analysed. At step S2 the game rules are applied to see whether or not at least a three-element match has been created. If it has not, at step S3, the screen indicates an illegal move to a user, and the player must try again. If a match has been detected, at step S4 an appropriate visual effect is generated for the display to denote the match and the disappearance of the game elements which have been matched. At step S5, new game elements are generated for the display, these game elements falling downwards to fill up the display from the top. The so-called physics of the tile on generation of a new game board after each move is always the same in the existing version of the game called Candy Crush. That is, tiles drop down from above the game board at a set speed.

Tile Physics

Figure 4:
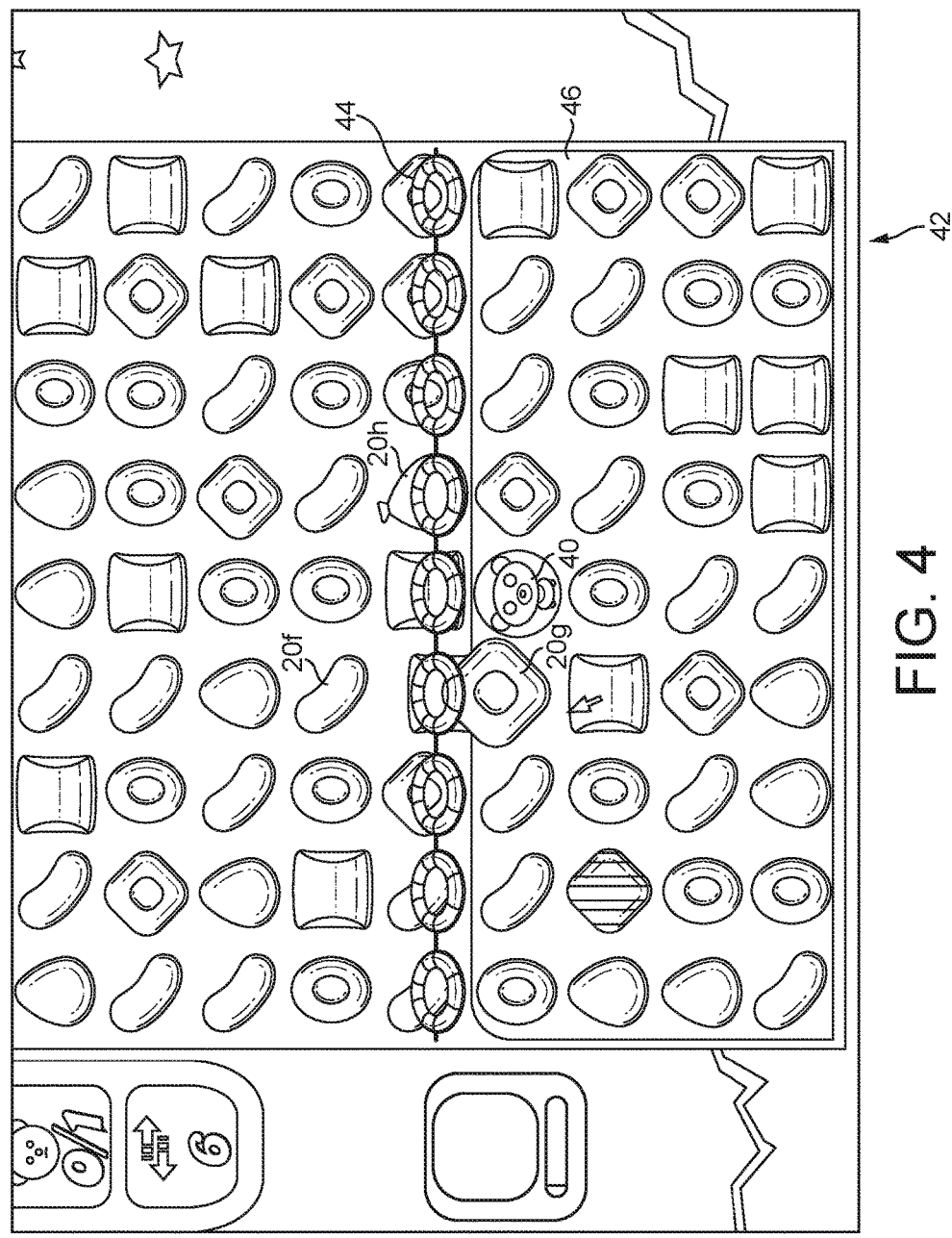
FIG. 4 is an illustration of a scrolling-type game board with visual indication of different tile physics.

In an improved version of the game described herein, the physics of each individual tile can be altered based on the game play of a user, or based on an instruction from the game software. Both the speed at which the tile can move, and the direction in which it can move can be governed by play of the game. FIG. 4 illustrates a game board of one embodiment of the present invention. The game board has two sections which are divided by a dividing line 40. In the upper section, the game mechanic is as just described with respect to FIG. 1. If a match is made, the game elements are removed and replacement tiles with associated game elements fall down from the top of the screen into the new game board. However, if game elements are matched and thus removed from an area below the dividing line 40, then game elements arrive to create a new game board from below the screen in the direction of arrow 42 in FIG. 4. Thus, the physics of the tile below the dividing line 40 is such that there is an upward movement to complete the display, rather than a downward movement in the upper section. The physics of the tile is governed by the location of the tile vis-à-vis the dividing line 40. This dividing line is visible to a player as a result of having tiles above the dividing line of one colour, and tiles below the dividing line of another colour. The tiles below the dividing line form a continual background which is referred to in the game as "lemonade". This is just a denotation of a continuous colour formed by the tiles below the dividing line 40. Game elements cannot fall into the "lemonade" from above the dividing line. The dividing line 40 represents a barrier to game elements moving further either upwards or downwards.

Game Character Release

Figure 5:
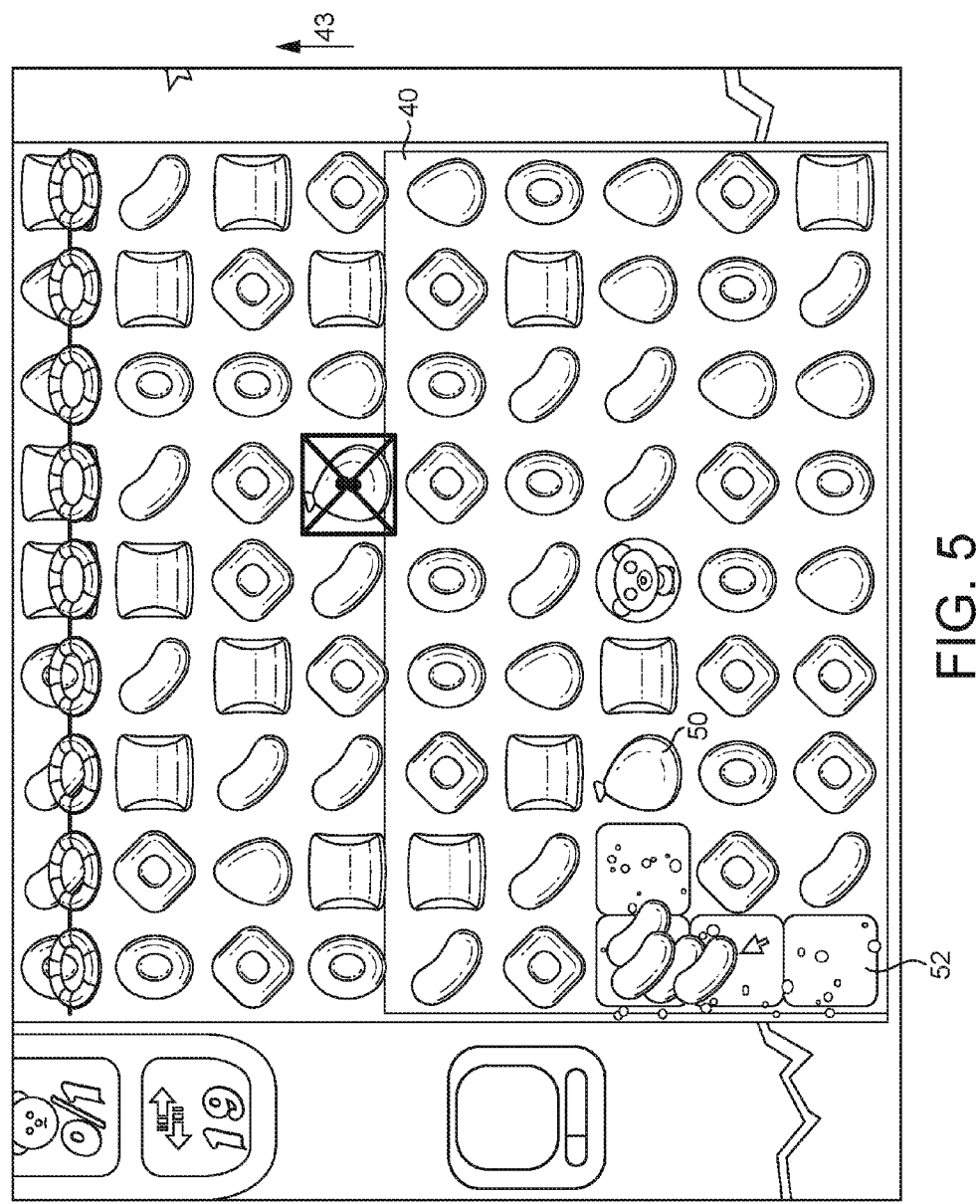
FIGS. 5 and 6 are diagrams illustrating actuation of a balloon element.
Figure 6:
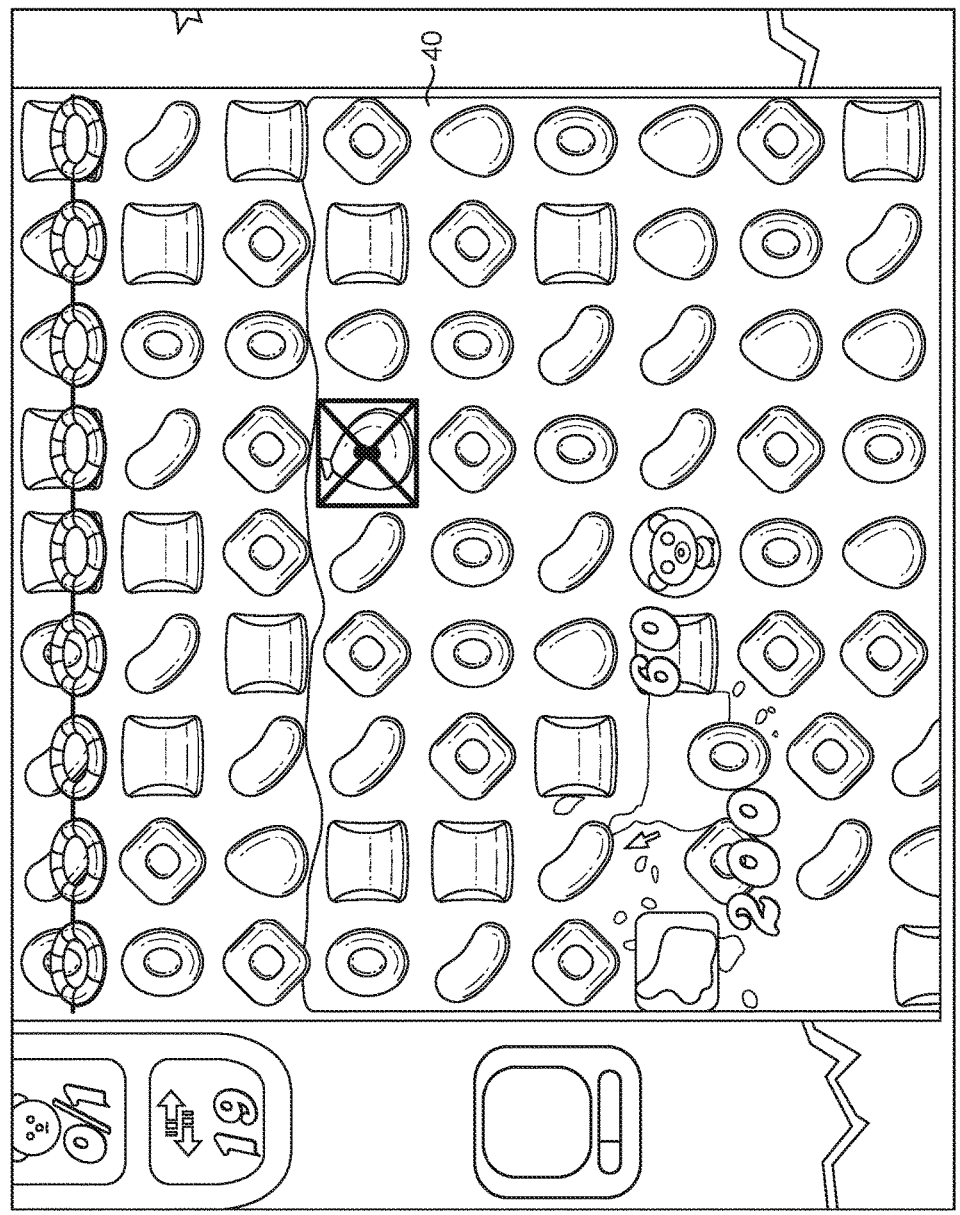
Figure 16A:
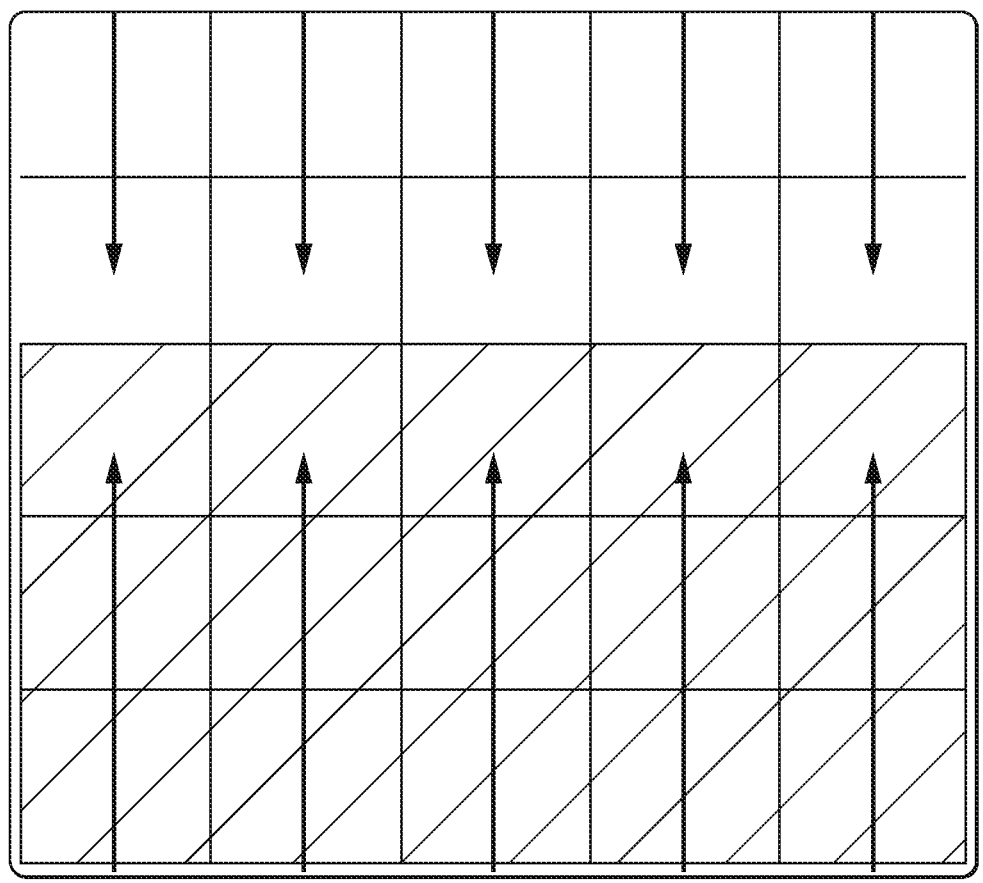
FIG. 16a is a diagrammatic representation of tiles with different physics (up and down)

Players can control the location of the dividing line 40 with respect to the displayed area of the game board. That is, they can move the dividing line 40 upwards on the screen in accordance with a particular game mechanic involving the bursting of balloon-shaped game elements. FIG. 5 illustrates this game mechanic. A balloon 50 has arrived on the game board and is thus available for bursting. In order to burst the balloon, a match of game board elements of the same colour as the balloon needs to be formed. In this case, an L-shaped match of red elements is shown as having been made on the left-hand corner of the display at 52. This match has been shown with a visual effect on the screen, and these game elements will thus disappear. This is shown in FIG. 6 where the balloon 50 has now burst, the game elements of the match 52 have disappeared and the level of the "lemonade" has now risen. Thus the dividing line 40 is now in a new location one row above its earlier location in FIG. 5. The movement is denoted by arrow 43 in FIG. 5. In this way, a player can influence the number of tiles which have an altered physics, in this case, the number of tiles which have a physics to cause them to replenish the game board moving upwardly from below the screen as opposed to downwardly from above the screen: see FIG. 16*a*.

Figure 16B:
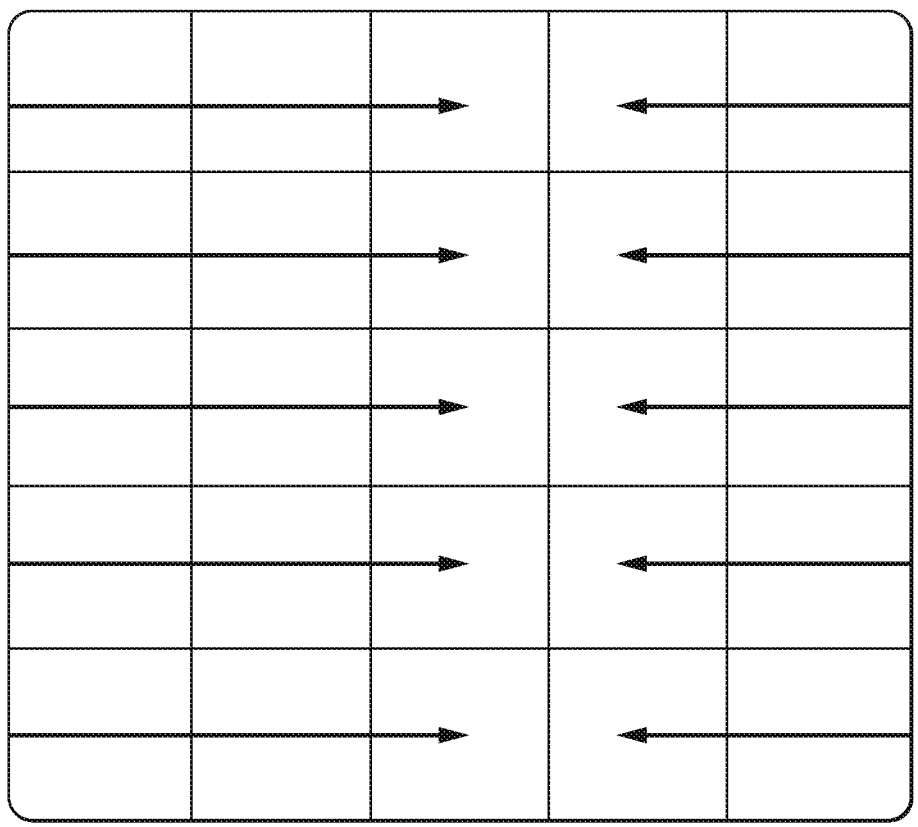
FIG. 16b is a diagrammatic representation of tiles with different physics (sideways)
Figure 20:
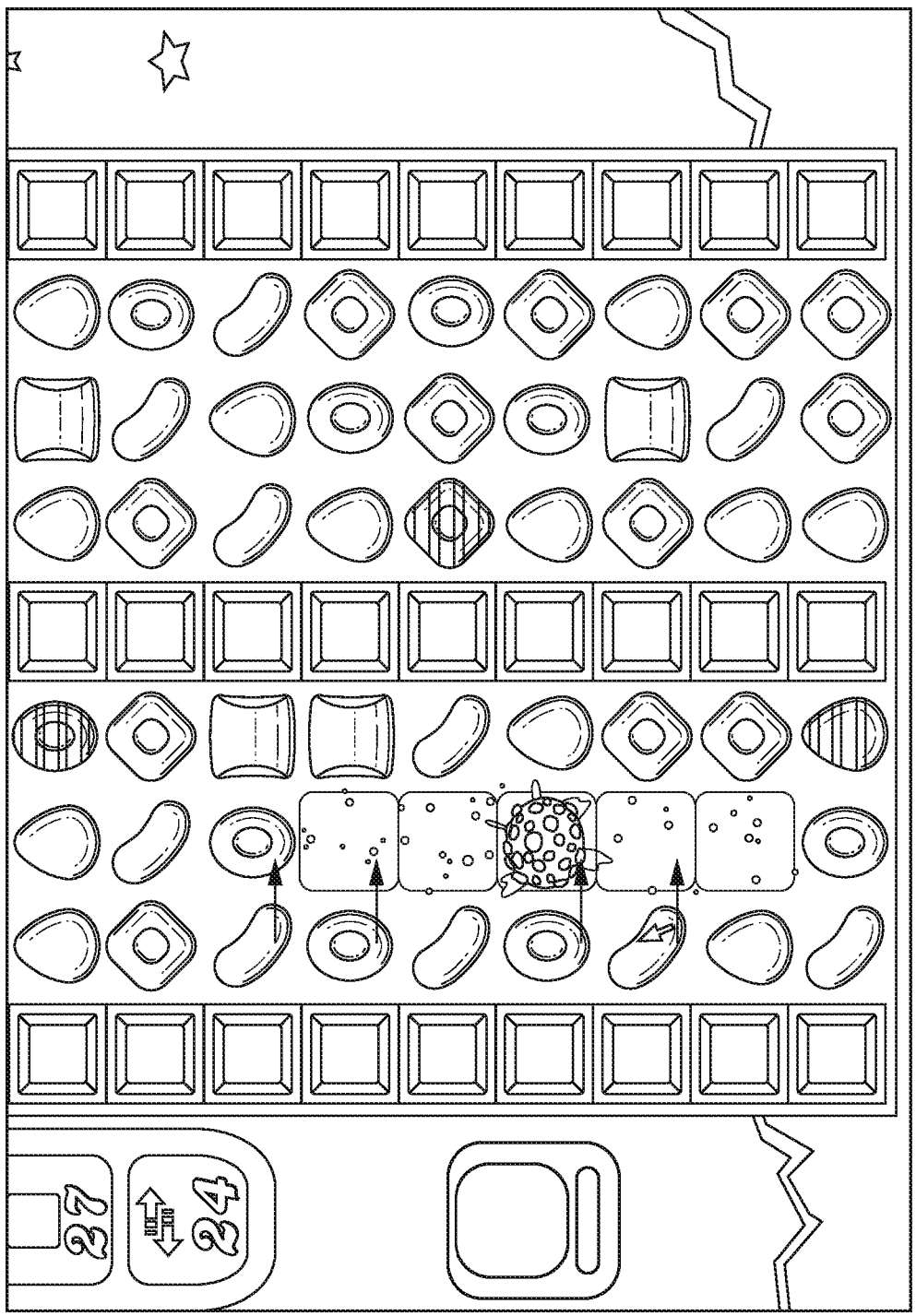
FIGS. 20 and 21 show replacement tiles with sideways physics.
Figure 21:
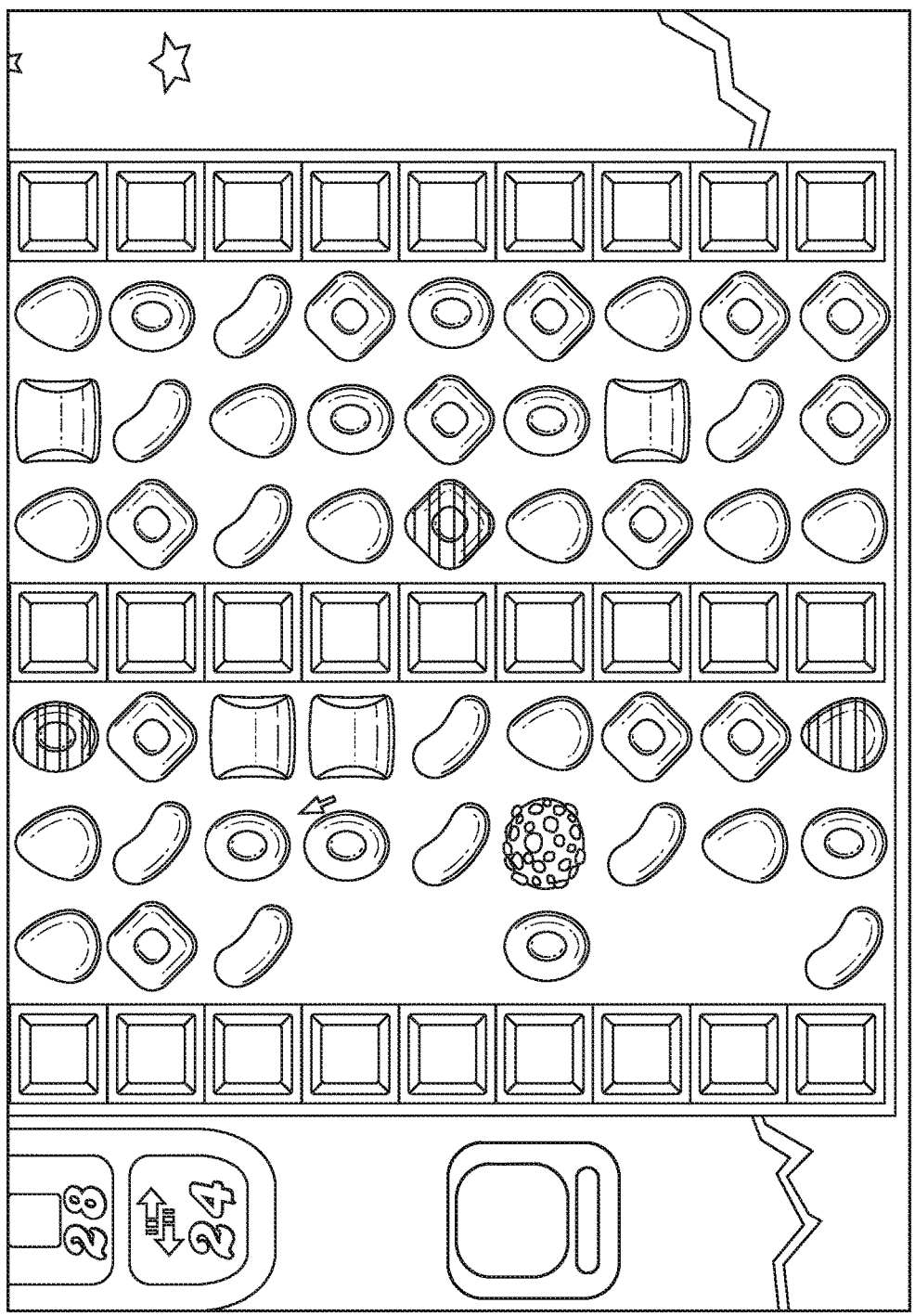

In an alternative embodiment shown in FIGS. 16*b*, 20 and 21, game elements move in from the side to replace matched game elements. FIG. 20 shows five game elements moving from the left-hand side as new replacement elements.

Figure 16C:
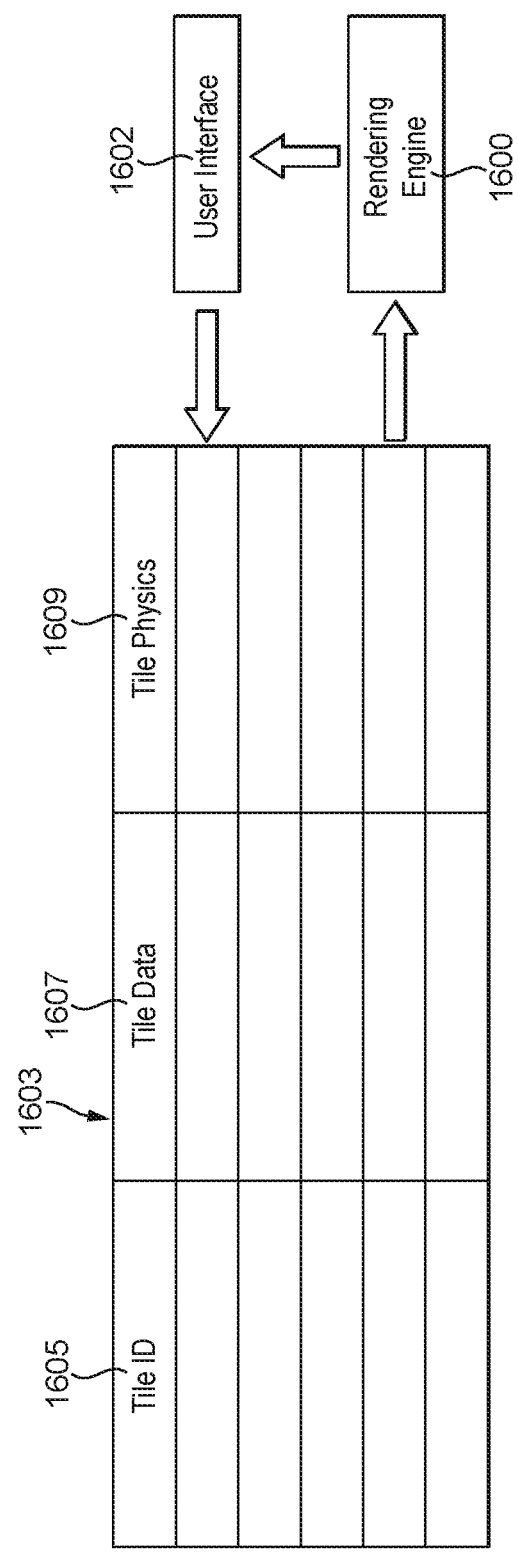
FIG. 16c illustrates a data structure for managing the file physics.
Figure 17:
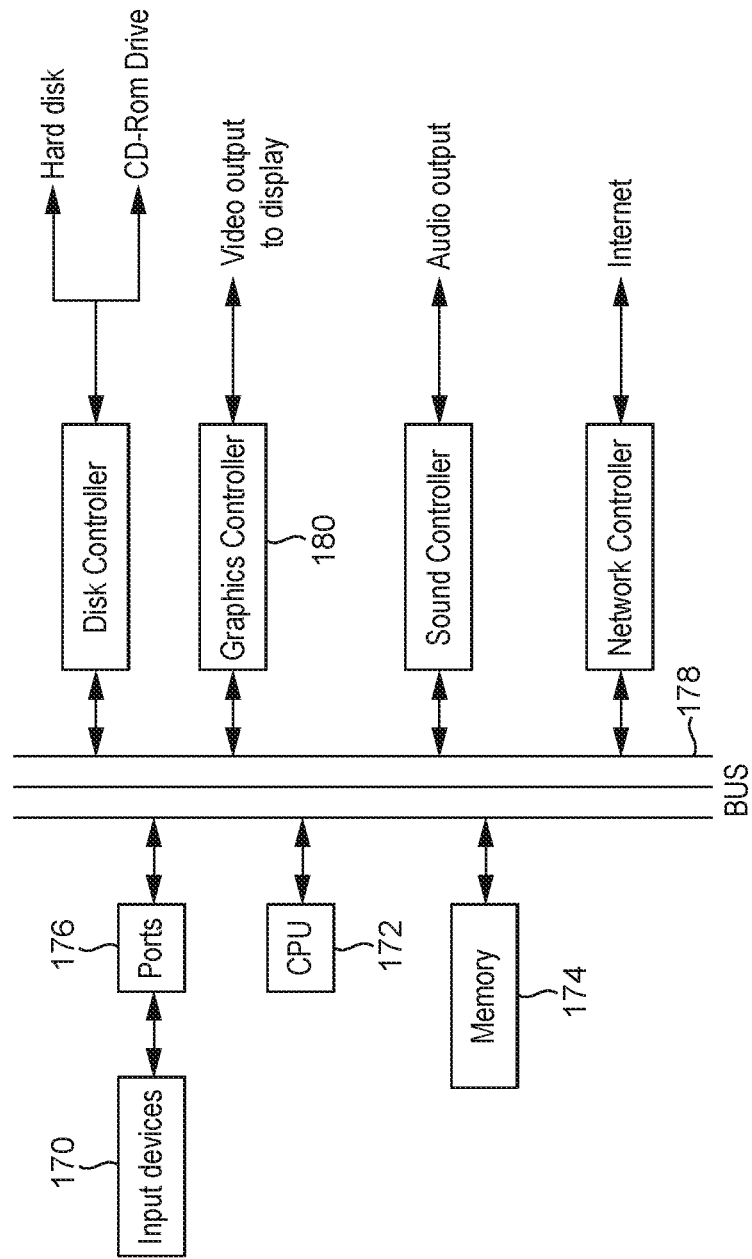
FIG. 17 is a schematic diagram of a computer device.

FIG. 16*c* illustrates a data structure for managing the tile physics, and schematically illustrates the interrelation between the data structure 1603 and a rendering engine 1600 of the graphics controller 180. The graphics controller 180 is illustrated in FIG. 17. The data structure 1603 can be held in any suitable storage circuitry, such as illustrated by memory 174 in FIG. 17. The rendering engine 1600 drives the display on a user interface 1602 which receives the video output from the graphics controller 180 illustrated in FIG. 17.

As mentioned, activity at the user interface 1602 can alter tile physics. The data structure 1603 is responsible for managing how replacement tiles are delivered to the user interface. Each tile has a tile ID 1605. The tile ID 1605 can define the location on the user interface where the tile is to be replenished, that is governed by the vacancy which has been released by gameplay. This allows the rendering engine 1600 to generate that tile at an appropriate location on the user interface display 1602. Each tile ID 1605 is associated with tile data 1607 which defines how the tile is to be displayed, that is what game element it has associated with it, and whether it has any "blockers" in addition to or instead of a game element, or any foreground or background. Different alternatives for blockers, foreground and background are discussed later.

In addition to tile data, the tile physics 1609 is also stored in association with a tile identifier. The tile physics can be modified for a particular tile based on activity at the user interface 1602. Thus, after each gameplay, the tile identifier, which defines the location at which the tile is to be replenished, can have different tile physics associated with it, as modified by activity at the user interface 1602. The modified tile physics is stored in the data structure 1603 so that at the next gameplay the appropriate tile physics is utilised to replenish that particular tile when the vacancy arises.

As the level of the "lemonade" moves by virtue of activity at the user interface, the tile physics associated with all tiles which are affected by the movement of the level are altered in the data structure 1603.

In the embodiments described above, the physics of the tiles are predetermined by the game software in dependence on the location of the tile on the screen (in particular as to whether or not it is in the "lemonade"). However, players can use boosters and/or sidekicks to alter the physics of tiles in a more general way. For example, a sidekick can be provided which when enabled changes the physics of some or all of the tiles. The tiles of whom the physics is changed can be preselected or determined by a user, or the result of game play.

In the embodiments described above, altering the physics of a tile can change the speed or direction with which the game element can fill vacancies left by "matched" game elements. In an alternative embodiment, the physics of a tile could affect how game elements bounce off one another.

Figure 7:
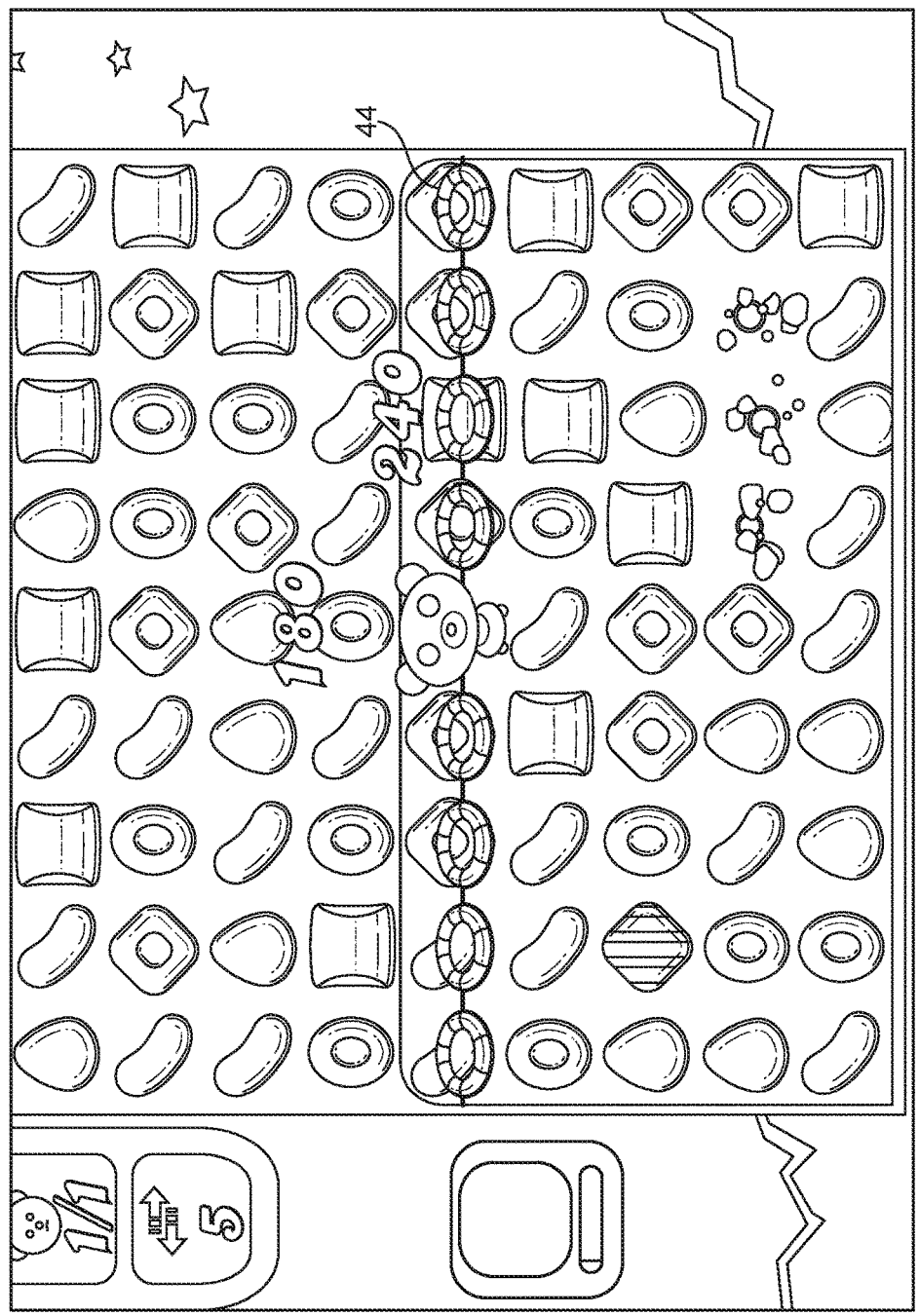
FIG. 7 is an illustration of the successful completion of a game level wherein a character reaches a target row.

One game objective will now be discussed with reference to FIGS. 4 and 7. FIG. 4 illustrates across the screen a row of rubber rings 44. There is also illustrated a teddy bear 46. The requirement to complete this level is to release the teddy bear 46 from its bubble. This can be achieved by raising the level 40 of the lemonade to the row which contains the rubber ring 44. The "reverse gravity" effect of the game tiles in the lemonade enables the player to bring the bear up to the rubber rings. That is, if the bear was formerly below game elements, a match of those game elements would cause them to disappear and the bear 46 would thus move upwardly towards the rubber rings. In FIG. 4, it is shown in the row immediately below the rubber rings. In FIG. 7, it is shown in capture by the rubber rings 44 and thus being released from its bubble. The transition between FIG. 4 and FIG. 7 has been achieved by swapping game element 20*f* with element 20*g*. FIG. 4 shows the gameboard 42 immediately after the player has provided the input to produce this swap. The game element 20*f* is moving to occupy the position above the level 40 where a row of three green elements will be formed. One of the green elements of this row 20*h* is a balloon, the matching of which will lead to a rise in the level 40. FIG. 7 shows the gameboard 42 after the level rise has occurred. The bear has risen up the gameboard to encounter the rubber rings and be removed from the gameboard. A record of the removal of the bear is made at bear icon on the left-hand side of the screen 48. This icon 48 denotes that there may be more than one bear available to a player on any particular game board.

The game software is programmed to visually indicate to a player the physics of the tile by a shimmering or "Mexican wave" effect. Highlight could involve briefly enlarging or brightening game elements in the row. That is, the rows of the tiles above the dividing line 40 are each highlighted in sequence, so as to illustrate that game elements fall downwardly to the dividing line. Conversely, rows of game elements below the dividing line are briefly highlighted in a reverse sequence indicating that game elements arrive upwardly below the dividing line. Alternatively, no highlighting can take place in the lemonade.

Scrolling Game Board

Figure 8A:
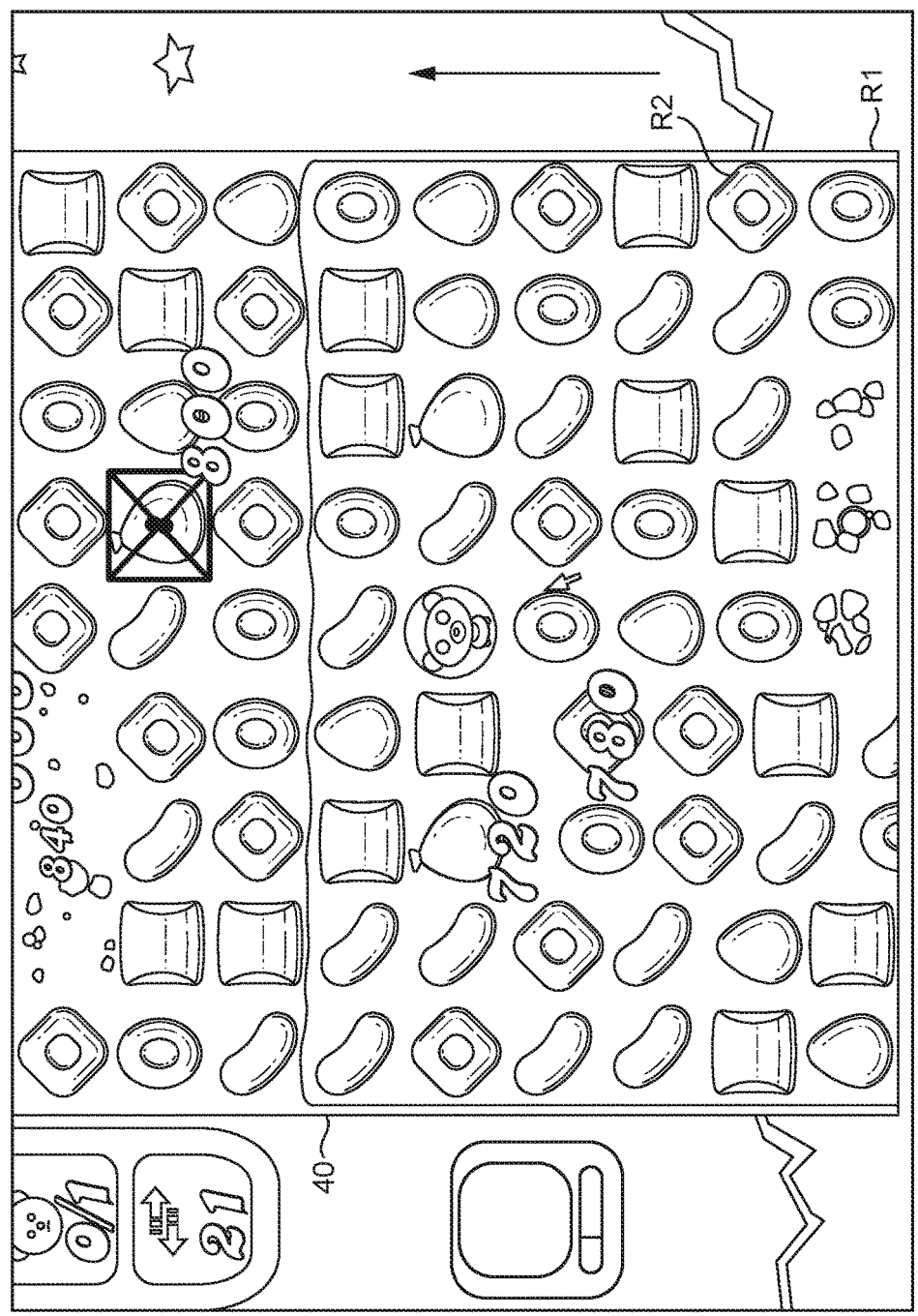
FIGS. 8a and 8b illustrate operation of a scrolling game board.
Figure 8B:
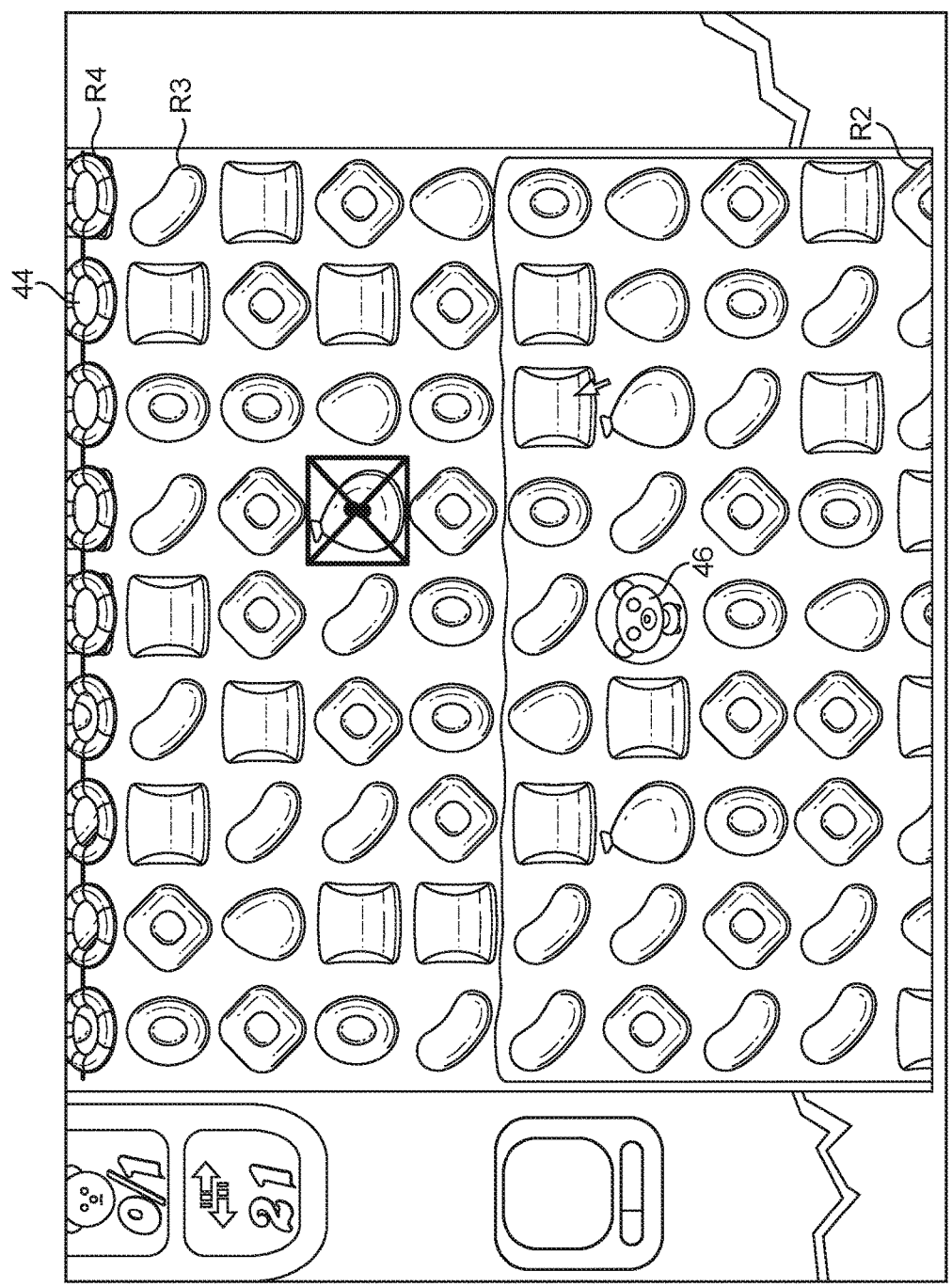

Another aspect of the present invention pertains to the manner in which the game elements are displayed as a game board. In the known version of the three-match game known as Candy Crush, the game board has a fixed size (in FIG. 1; 8×5 elements), and is replenished to the fixed size by game elements falling downwardly. The fixed size does not need to be 8×5 or indeed a matrix, but in the known game it is a fixed size. According to an embodiment of the present invention, there is instead a scrolling version of the screen illustrated in FIGS. 8a and 8b. Note that in FIG. 8a there are two rows R1 and R2 illustrated at the bottom of the display, and note that the dividing line 40 occurs six rows above the bottom of the display. Above the dividing line there are three visible rows. Consider now FIG. 8b where the screen has scrolled upwardly, so that a user can now not see two R1 and can only see the upper half of row R2 at the bottom of the screen. However, an additional row R3 has now appeared at the top of the screen and half of a further row R4 with the rubber rings has also appeared at the top of the screen. This allows a user to see how progress is being made of the lemonade to bring the teddy bear character 46 up to engagement with the rubber ring 44. The effect of this is that the game board appears to move downwards relative to the background once the lemonade appears to be over halfway up the visible game board, allowing a player to see the level of rubber rings which they must reach, and which was not in immediate view when the player started the game.

One aim of the scrolling is to follow the bear character 46 as though he is being followed by a camera. This improves user engagement and interest in following the fate of the character as it moves towards the target. Other modes of moving the camera are available. It is possible to move in any direction in the two dimensional screen and to control the camera to centre on any particular tile based on a predetermined condition. For example, a condition could have the following components: same state; goal met; user input; booster. In some embodiments, user input can thus determine which character or tile to centre the camera view of the screen.

Figure 9:
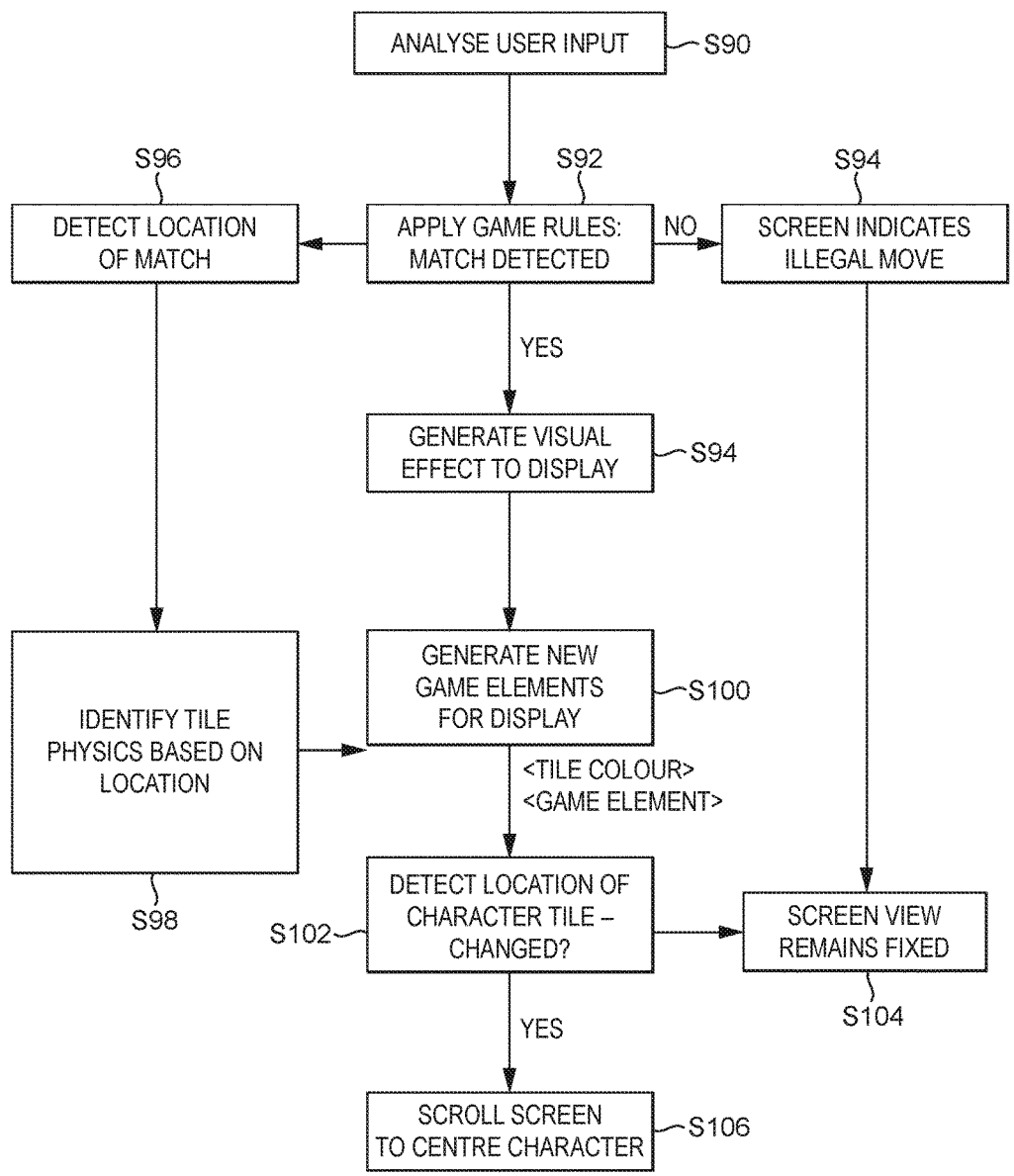
FIG. 9 is a flow chart illustrating a method of controlling an interface for the scrolling game board.

FIG. 9 is a flow chart illustrating the steps taken by the software executed by a processor in delivering the game mechanics discussed above. In Step S90 the user input is received at the processor from the user input device and analysed. In Step S92 the game rules are applied and it is determined whether or not a match has been detected. If it has not then at Step S94 the screen indicates an illegal move. If it has, then the procedure flows to step S96 to generate a visual effect to the display to indicate a match. In addition, at step S96 the location of the match is detected, that is, whether it is above or below the dividing line 40. At step S98 the tile physics is identified based on the location (tile fall down or tile rise up). At step S100 new game elements are generated for the display and arrive on the display using the tile physics identified in Step S98. When generating the game elements for the display, both the game element and the underlying tile colour are generated in dependence on where the tile is to be located (above or below the dividing line), which in turn depending on where the match was created. At step S102, the location of the bear character is detected to ascertain whether or not a scroll of the screen is required. If no scroll is required then at step S104 the screen view remains fixed. If however, a scroll of the screen is required then at step S106 the screen display is scrolled to show new rows of game elements to the player. The scroll of the screen is intended to keep the character at a centred location.

Sidekick

Figure 10A:
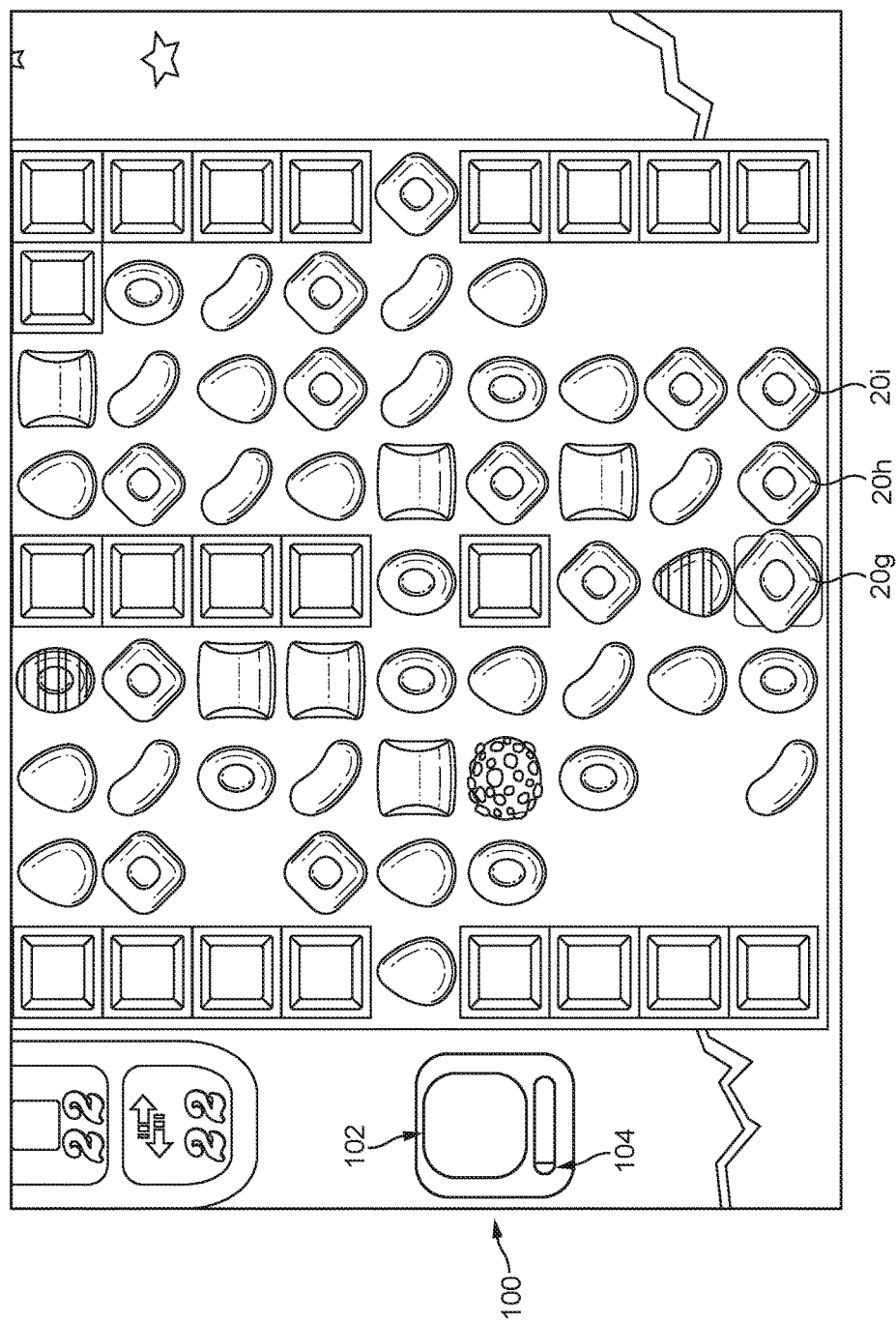
FIGS. 10a, 10b, 10c and 11 are diagrams illustrating operation of a manually operated sidekick.
Figure 10B:
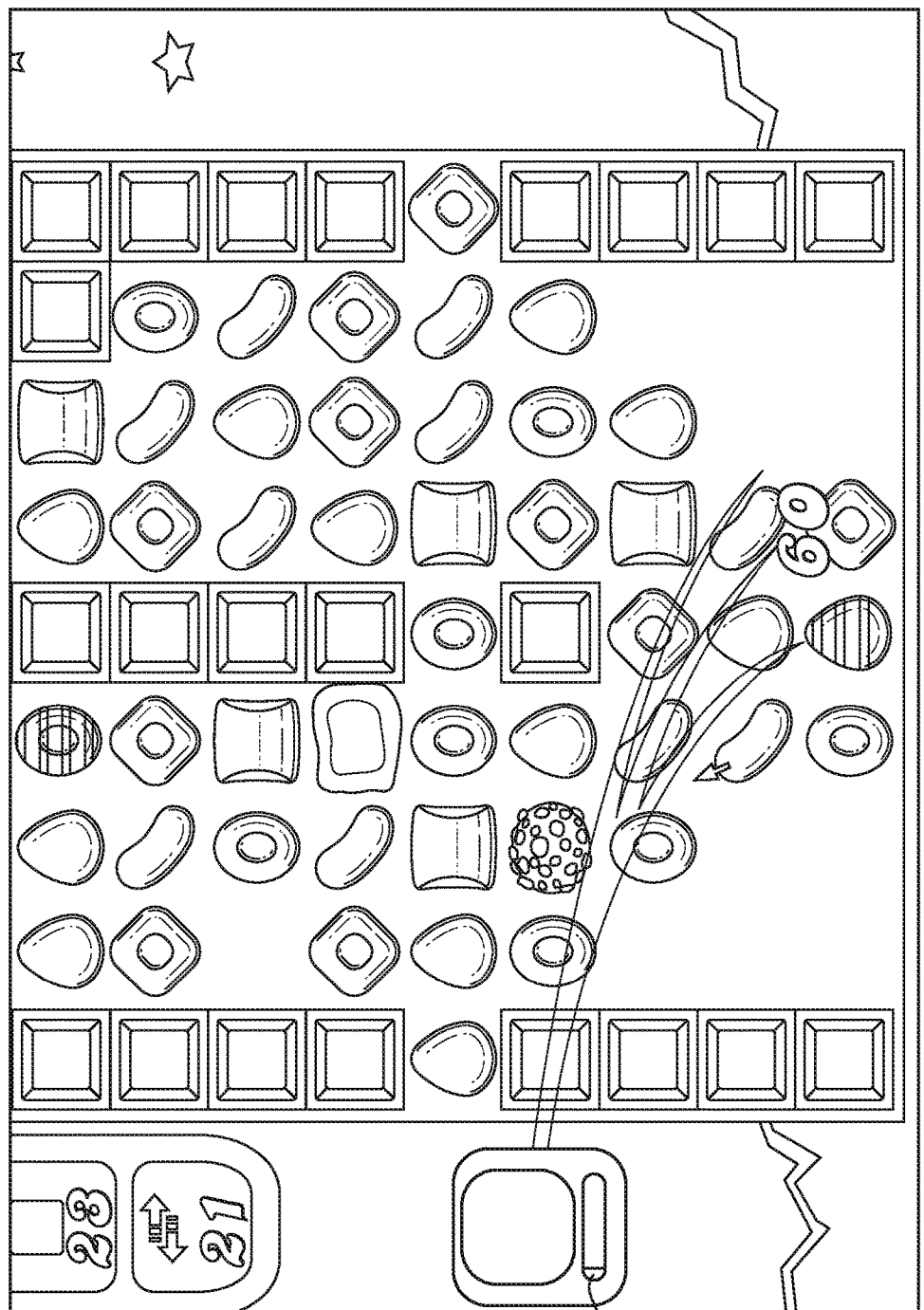
Figure 10C:
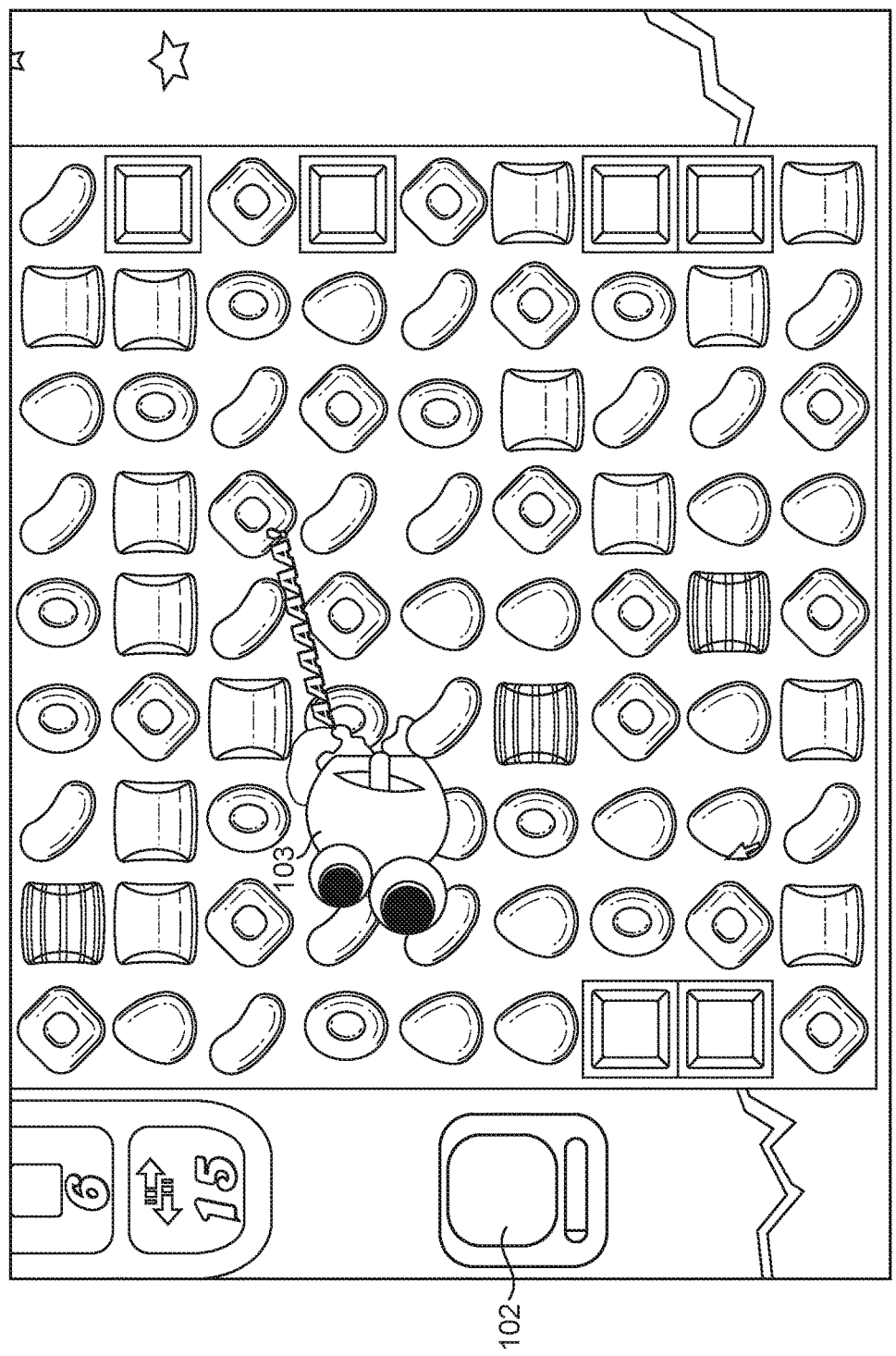
Figure 11:
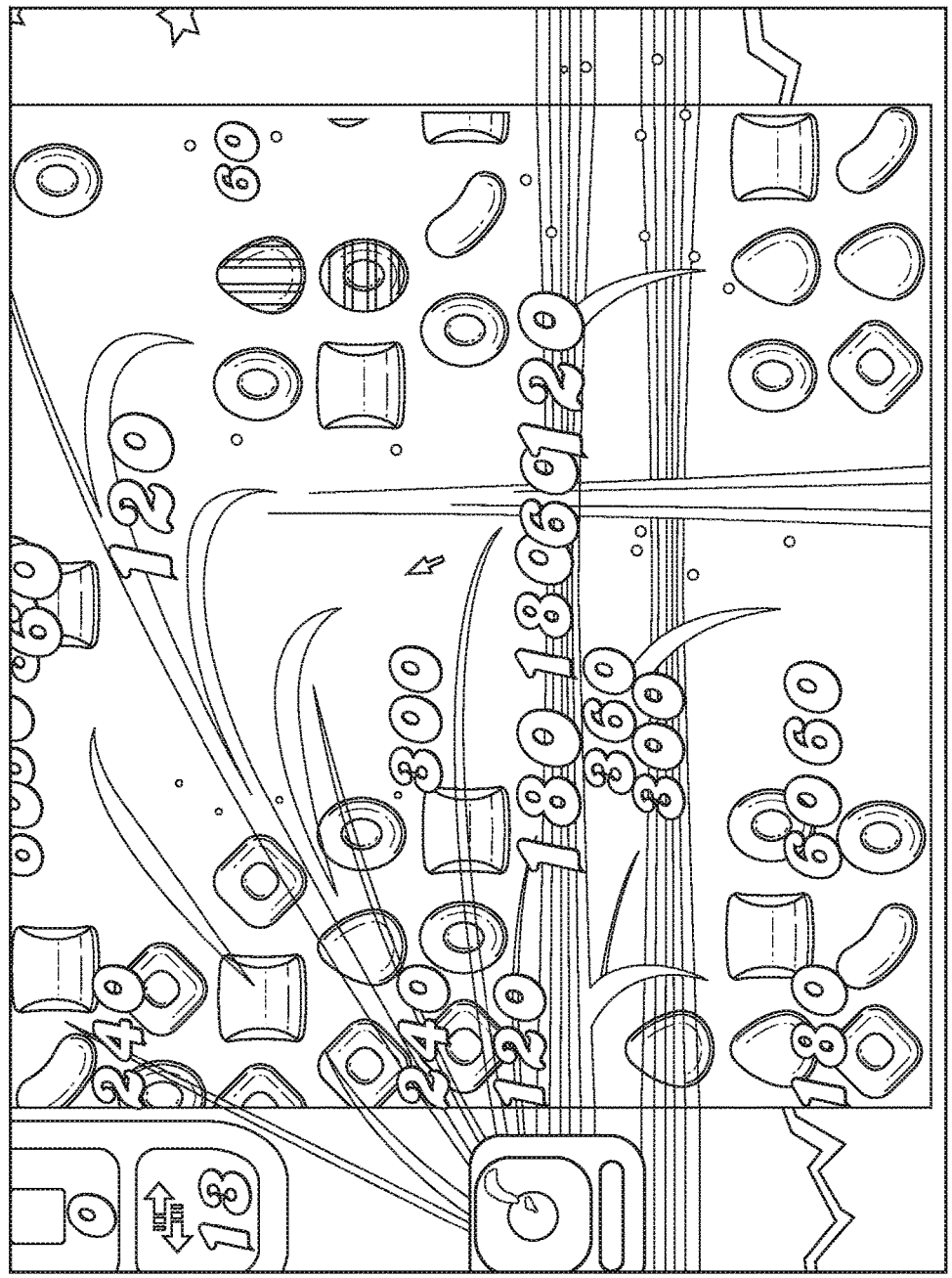

FIGS. 10a, 10b, 10c and 11 illustrate operation of a sidekick in a match 3 switcher game. The sidekick is denoted by reference numeral 100 and has an animated character within a frame 102. The animated character can for example be a frog. A charge bar 104 can be visually charged by game activity. That is, a colour bar can move from left to right indicating the degree of charge of the sidekick 100. The change bar is changed by matching candies of a certain colour, for example, blue. In FIG. 10a, candy 20g has been moved to a 3-match location, causing the removal of candies 20s, 20h, 20i (see FIG. 10b) and a corresponding increase in change of the charge bar 104, represented by an animated effect seen in FIG. 10b. When the sidekick is fully charged as shown in FIG. 11, it can be activated by a user (by touch or mouse, etc.) and the effect is that the character, such as the frog 103 jumps out of the frame 102 and destroys all candies of the same colour as the sidekick. For example, in one embodiment the frog is yellow and the frog leaps on to the board and destroys all yellow candies.

Chocolate Removal

Figure 22:
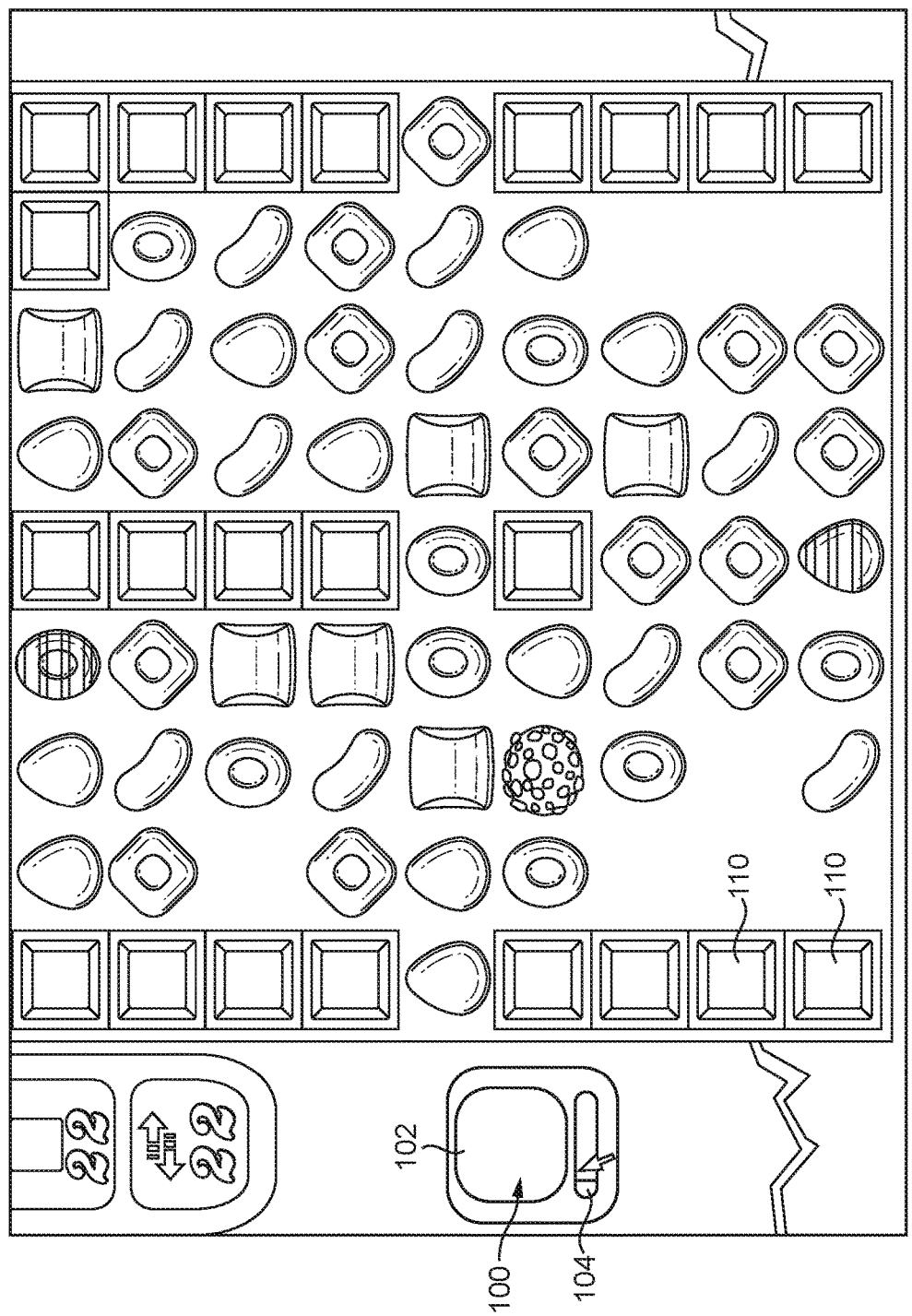
FIG. 22 shows a novel feature objective with chocolate blockers.

FIG. 22 illustrates chocolate blockers at 110. The concept of blockers in a match 3 switcher game is described later. A novel game objective is to destroy all of the chocolate blocks on the game board. This differs from the existing version of Candy Crush, where no such game objective exists.

Uncover Jelly Bears

Figure 23:
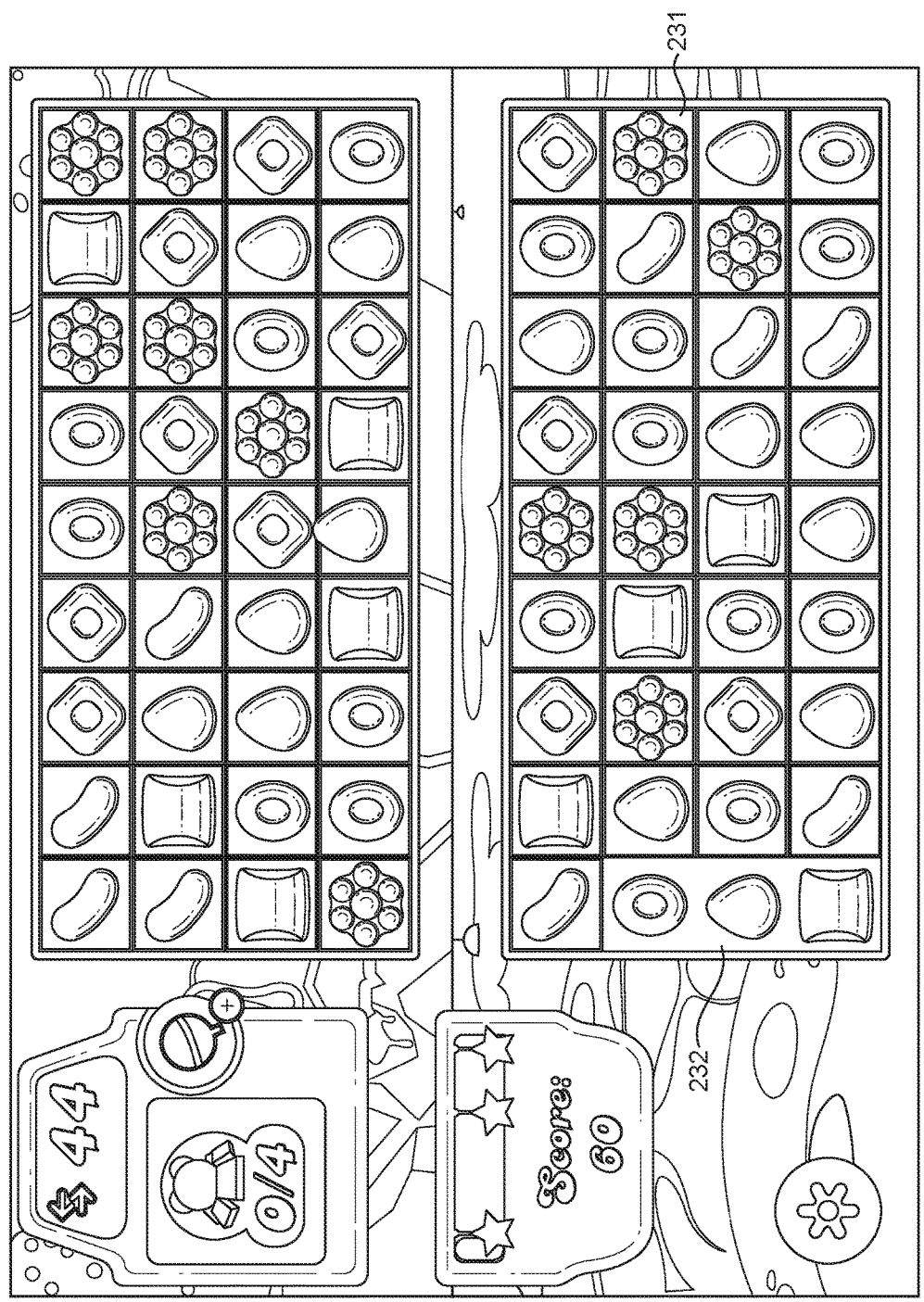
FIG. 23 shows an implementation of a novel game mode.

In the known version of Candy Crush Saga, some levels have special game elements known as 'jelly blocks'. As will be described later, jelly blocks are placed on game tiles underneath game elements. A jelly block can be removed by performing a match on the tile on which it is located. FIG. 23 shows a gameboard having jelly blocks placed over it. On the gameboard there are tiles with jellies 231 and tiles without 232.

Figure 24:
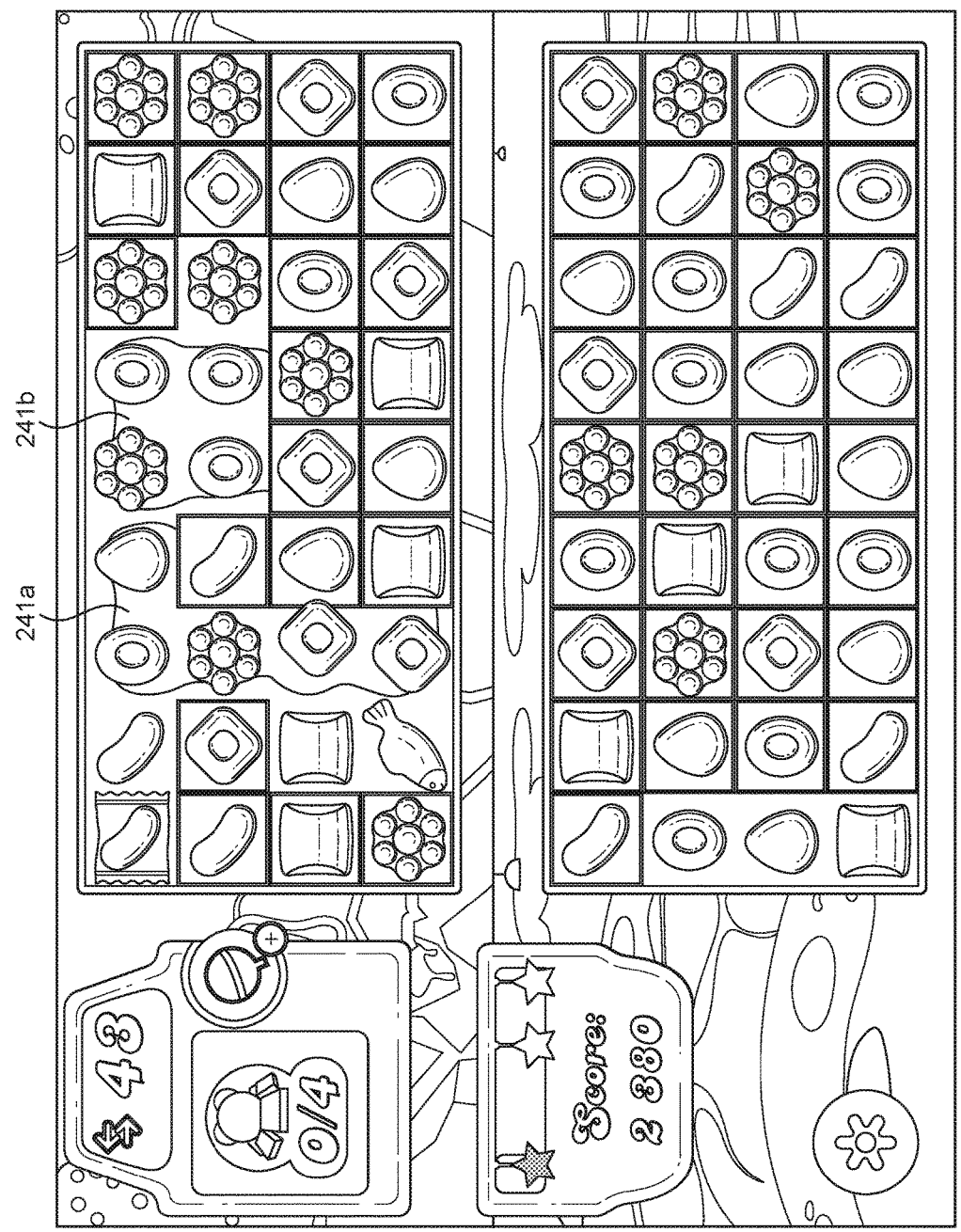
FIG. 24 shows one implementation of a novel game mode.

FIG. 24 shows the gameboard of FIG. 23 at a later point in time after several of the jelly blocks in the top of the screen have been removed. Revealed behind the removed jelly blocks are a further pair of game objects 241a, 241b each occupying several tiles. In one embodiment, these game objects 241a, 241b may take the form of jelly bears.

Figure 25:
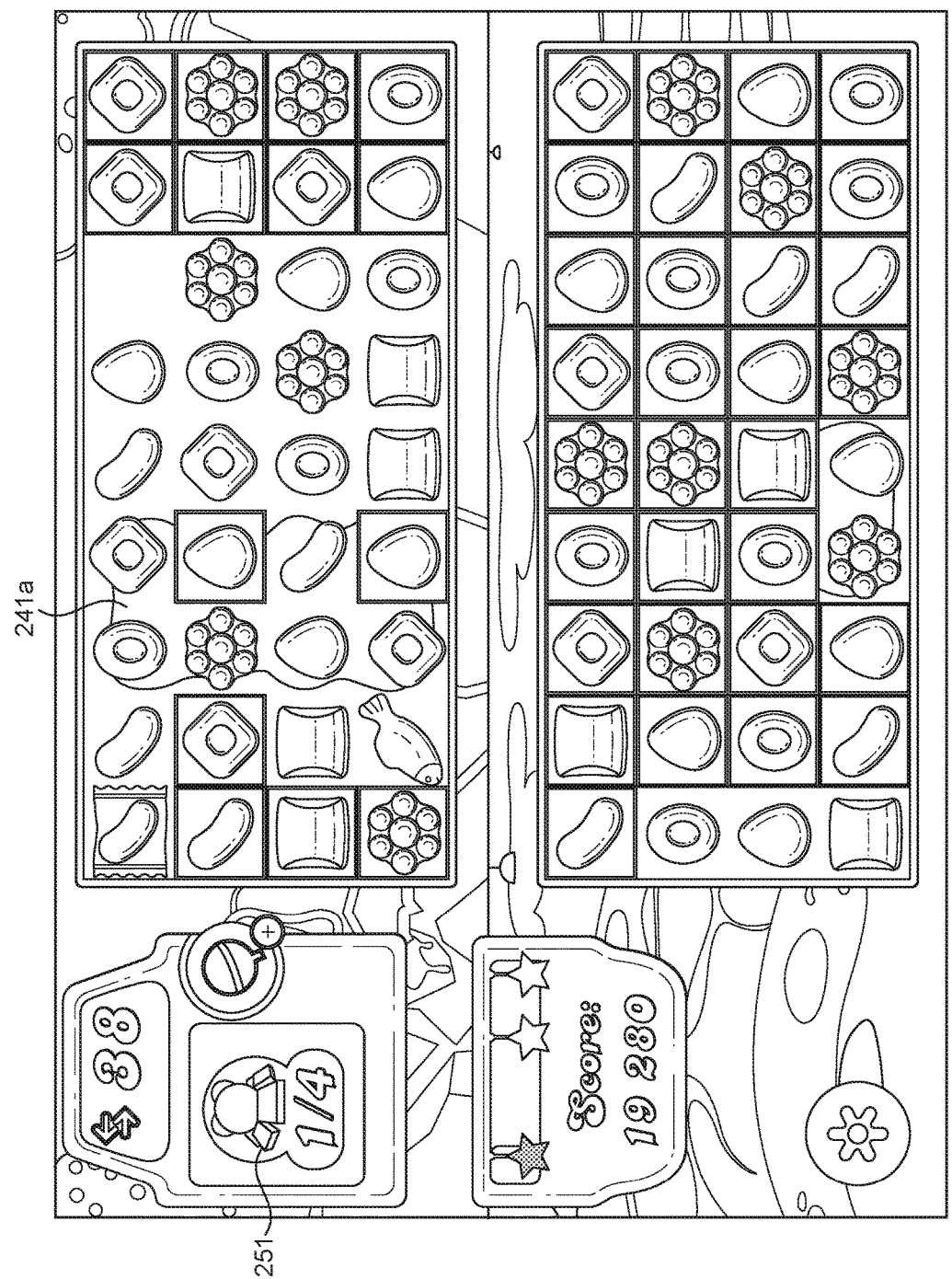
FIG. 25 shows one implementation of a novel game mode.

One novel game objective that may be presented to the player may be to collect all of these jelly bears by removing all of the jelly blocks covering them. FIG. 25 shows the gameboard after all of the jelly blocks that were covering the jelly bear 241b have been removed. Consequently, the jelly bear 241b is no longer present on the gameboard, and the value of the counter 251 has increased by one. To successfully complete the level, the player must remove all of the jelly bears from the gameboard. There is, therefore, no need for all of the jelly blocks to be removed, as in previous implementations of the game, but only those that cover the jelly bears.

Colouring Candy Booster

Figure 12:
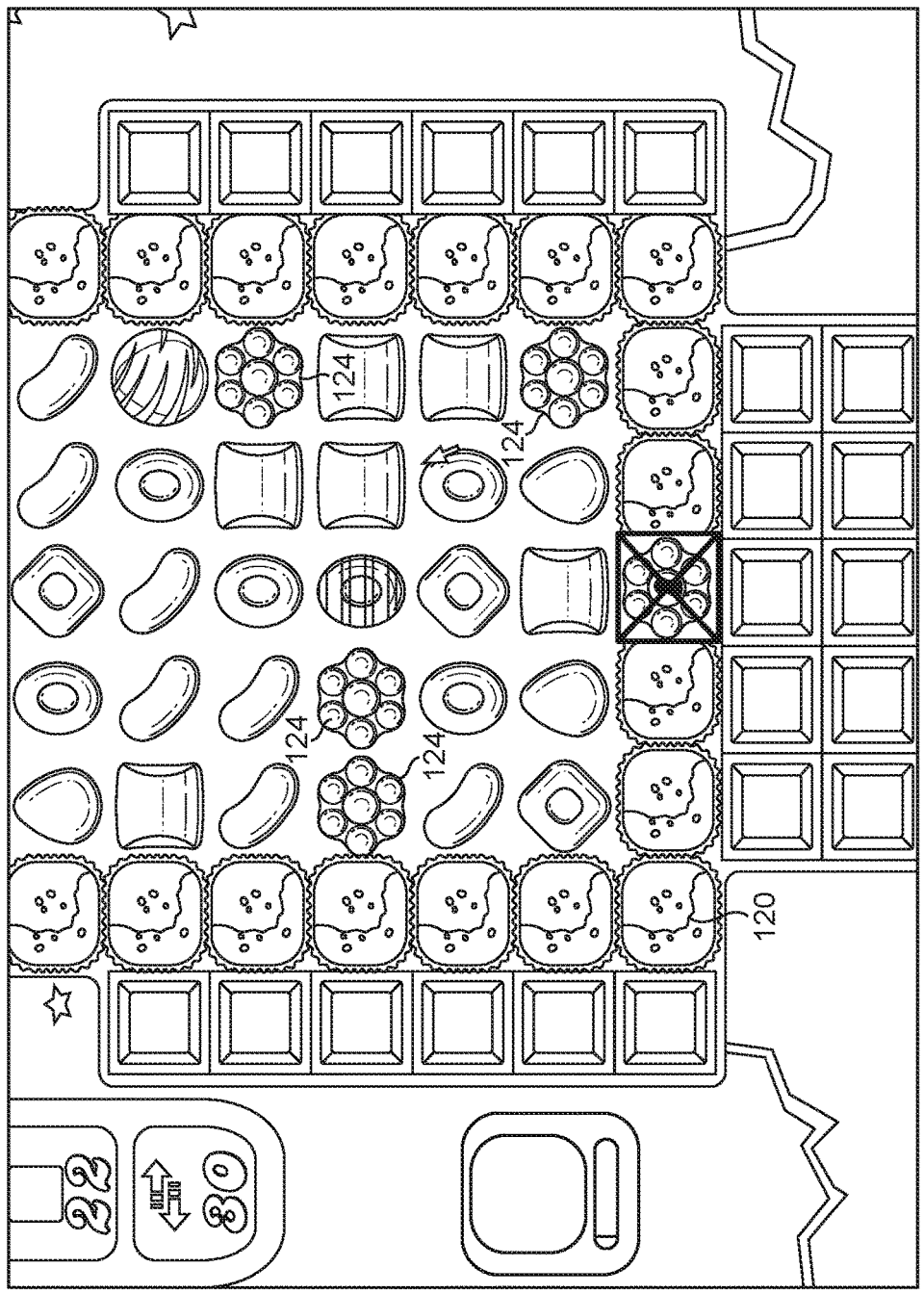
FIGS. 12 and 13 are diagrams illustrating operation of a novel game element.
Figure 13:
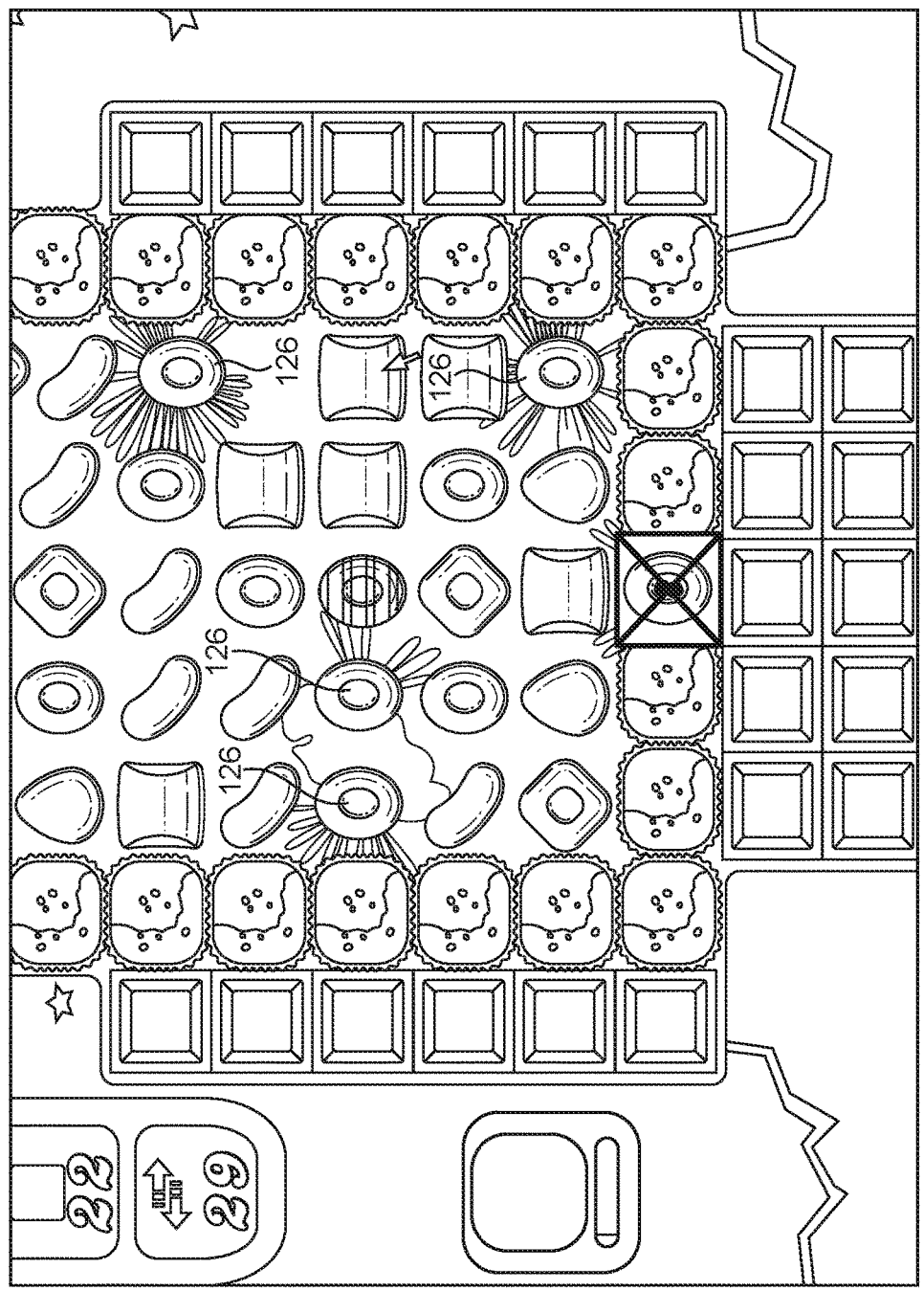

The concept of booster is described later. FIGS. 12 and 13 illustrate a novel booster in the form of colouring candy. The colouring candy looks like a sweet inside a bubble as illustrated for example at 120 in FIG. 12. In FIG. 12 the sweet is an orange sweet. Swopping a colouring candy with one of its adjacent neighbours will cause all occurrences of that neighbour to change into the colour of the colouring candy. For example, swapping the orange colouring candy 120 with a purple candy such as 124 will cause all instances of the purple candy all denoted 124 in FIG. 12 to change into orange candies as illustrated at 126 in FIG. 13.

Swapping Wrapped Candy

Figure 14:
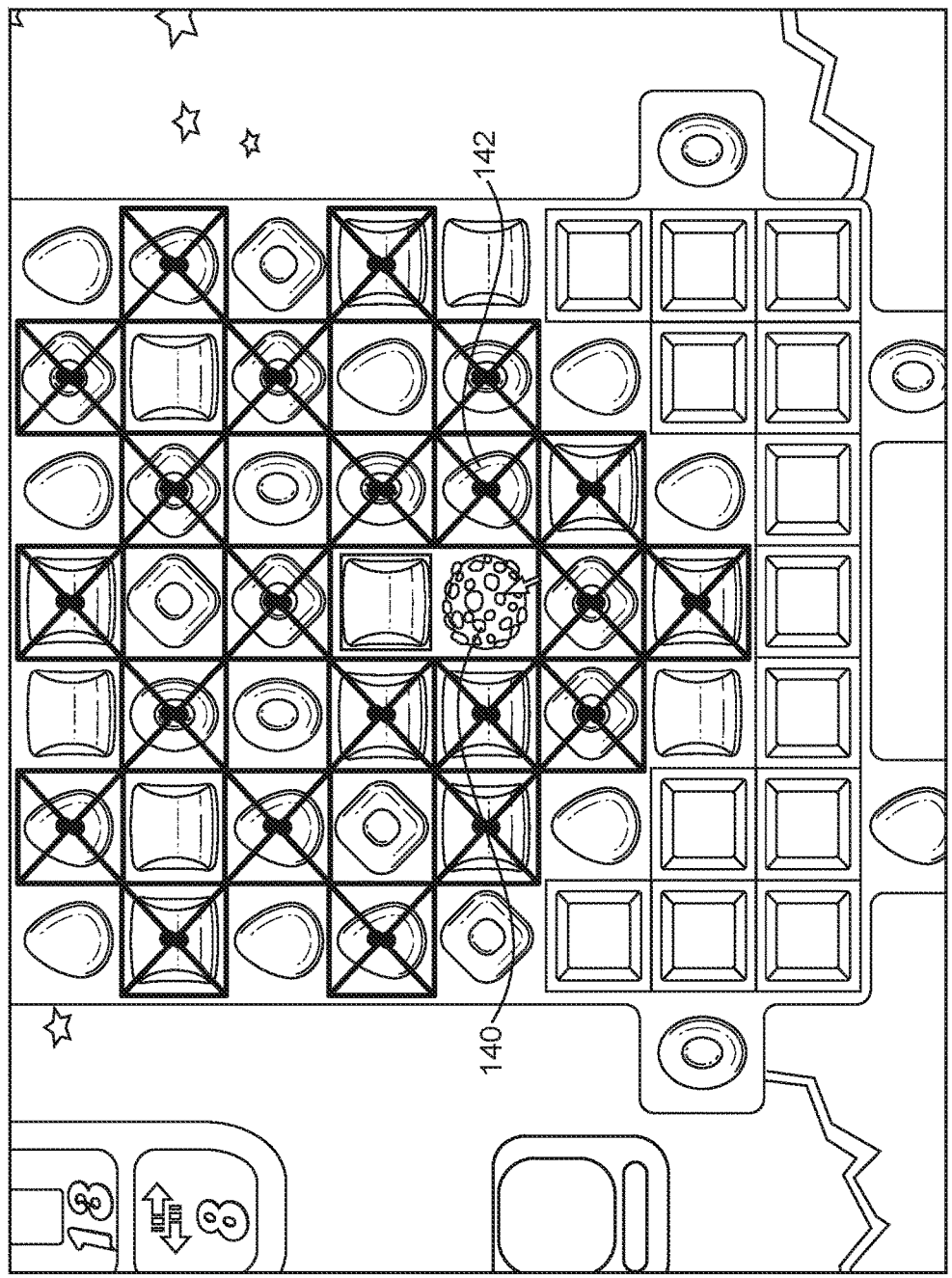
FIGS. 14 and 15 illustrate a novel game mechanic of swapping a multi-coloured booster with a wrapped game element.
Figure 15:
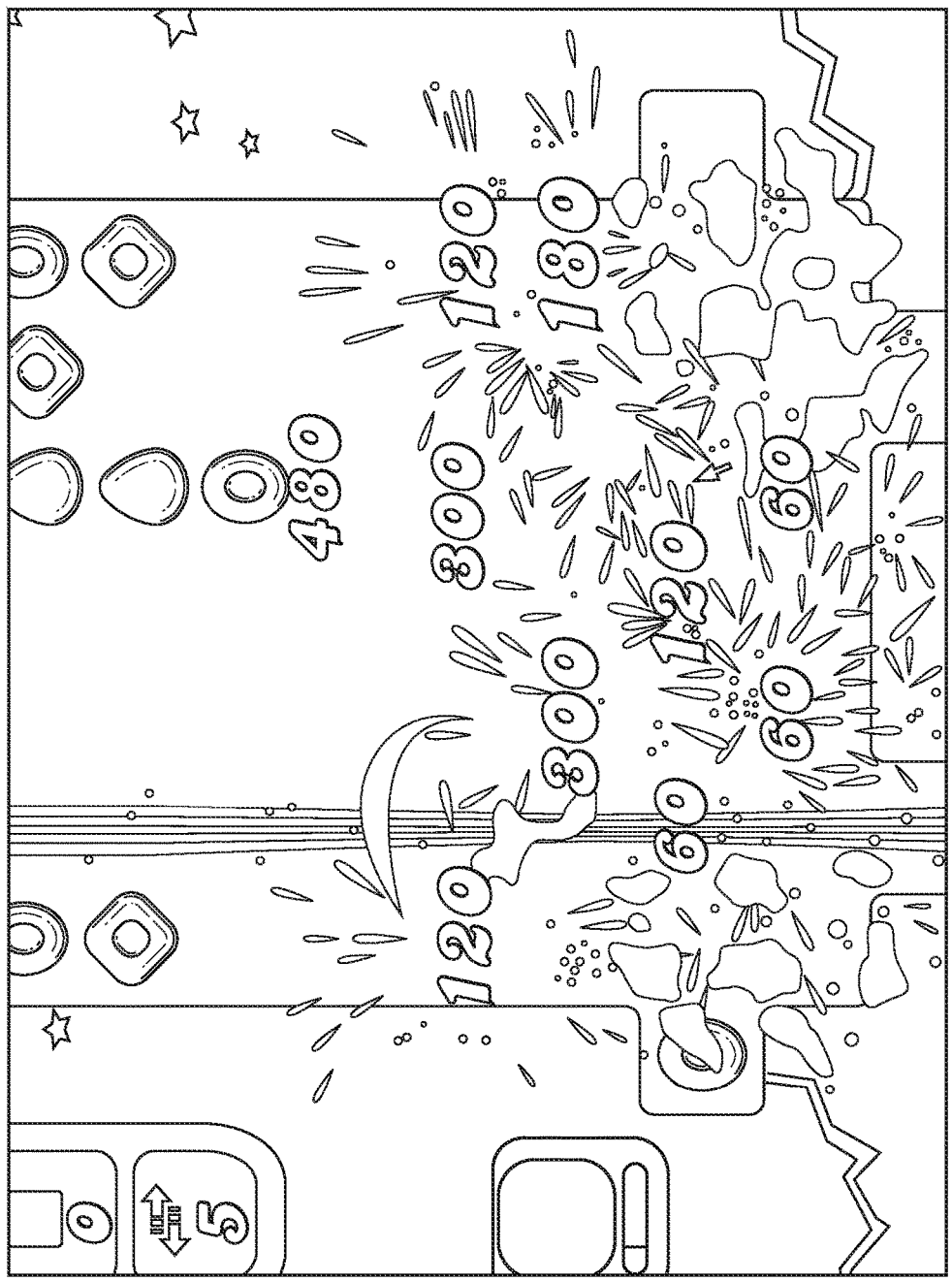

According to another embodiment of the invention, a new dynamic is introduced when a colour bomb is swapped with a wrapped candy. This has the effect of destroying all the candy on that level. See, for example, FIG. 14 where a colour bomb is denoted 140 and a wrapped candy adjacent it 142. FIG. 15 illustrates the effect of swapping the colour bomb 140 with the wrapped candy 142. FIG. 15 also illustrates the numerical scores that result from the destruction of the candies.

Description of Architecture

FIG. 17 shows a schematic picture of a computing device, containing a Central Processing Unit 172 and Memory 174. The CPU 172 acts according to input given from input devices 170, such as a keyboard, mouse or touchscreen via input parts 176. Computer BUS 178 is used to communicate, both between input devices and the CPU, but also between different controllers within the computer device, such as a graphics controller 180 and a network controller. These controllers in turn communicate with external devices, such as a monitor for video output with which the graphics controller communicates, and the network controller communicates with for instance the internet, through wireless or wired connections. A user can interact with the computing device through input devices, such as a pointing device (e.g. a mouse) and a keyboard. The flow diagrams of FIGS. 3 and 9 are implemented in software executed by the CPU 172, that can be stored in memory 174. The output screens are supplied to graphics controller 180 for supplying game video output to a user display 1602 (FIG. 16c).

Figure 18:
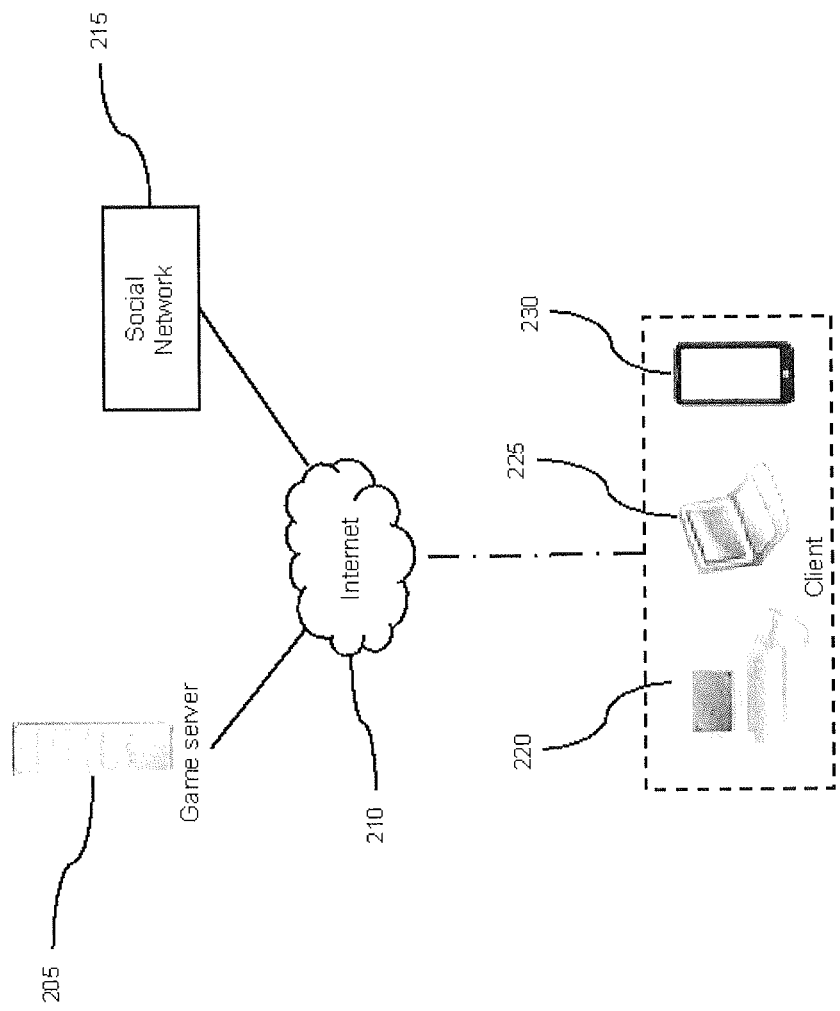
FIG. 18 is a schematic architecture diagram of a context in which a computer device can be utilised to play the game.

FIG. 18 portrays an exemplary overall environment in which the present invention can be utilized. A virtual game is stored on for instance a game server 210. The virtual game is to be played on a client device, such as a computer 240, 250 or a smartphone or other handheld device 260. The client device can also be a kiosk, arcade gaming station, smart TV or other device with computing capabilities, input devices and a screen that can present the game to a user. The client device communicates with a game server 210 and a social network server 230, for instance through the Internet 220 or other network. It should be understood that the social network 230 and the game server 210 does not have to be located in different places, they could be on the same server or on a plurality of servers located in different locations. An environment where the invention may be implemented is described in PCT/EP2013/060641 which is hereby incorporated by reference.

People skilled in the art will understand that other devices than the exemplary ones listed can be also be used without departing from the spirit and scope of the invention.

The techniques described in this patent can be deployed in many different gameplay architectures. For example, a computer game can be implemented as a computer program that is stored and runs entirely locally on the processor of a PC, games console, tablet or mobile telephone or other computing device. The game can be implemented solely as a computer program that is stored and runs entirely on one of many processors in a remote server, and data streams or updates are supplied to the client device (e.g. tablet, smartphone etc.) to enable the client to render and display graphics and sounds; this 'web services' approach is increasingly common.

Another approach is a hybrid one, in which back-end servers handle some elements of the gameplay, and for instance a Java game applet is provided to client devices and it is the locally running Java applet that generates the graphics/sounds/user interaction for gameplay on the player's client device. Some data may be fed back to the back-end servers to enable scoring, interaction with other players and cross-platform synchronisation. Generally, the techniques described in this specification are not specific to any one game architecture but can be deployed on any suitable game architecture.

The game can be implemented allowing a user to interact with it in different ways depending on the capabilities of the device which the user is accessing the game with. A user can interact with the game through using a touch screen where the user can select and/or move elements on the game board with a finger or for instance with a stylus. The game can also be played with a pointing device such as a mouse or other interaction devices such as a keyboard.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

Over the course of players playing the game, data will be produced. This data can for instance be related to a player's game performance or to game information related to a social network to which the game is connected. It is possible to gather this data, store it and make use of it for instance to improve the game. One example is by using a database to store the amount of times players try and fail a level on average. This data can then be reviewed, and if the players seem to fail a substantial amount of times before completing a level, the difficulty can be adjusted accordingly. The difficulty can be adjusted through changing a score target for the level, increasing the available time or moves or giving the player for instance a booster to enhance the gameplay.

There can be certain performance indicators used to measure the success of the game. These indicators can for instance relate to player retention, the virality of the game and the revenue of the game.

A person skilled in the art will realise that the different approaches to implementing the game is not exhaustive, what is described herein are certain preferred embodiments. It is possible to implement the way in a number of variations without departing from the spirit or scope of the invention.

The terms user and player are used interchangeably throughout this document and no specific meaning is intended using one or the other unless the context suggests otherwise.

Match 3 Switcher Game

The following description describes additional game components of match 3 switcher games. The person skilled in the art will understand that there are many other ways the present ideas can be implemented and the description is not limited to only one implementation. The following features can be used in combination with any of the aforesaid novel game components.

Glossary/Terms

Game board: The area where the matching and swapping of elements occur: Note that the entire game board is not visible to a player but can be scrolled to change the player view.

Game elements: All elements that appear on the game board.

Standard game elements: These are the six basic candies used for making switches and colour matches on the game board. Compared to special game elements, the standard game elements have no extra properties or behaviour, they are only used to make colour combinations or to create new special game elements.

Ingredients: Game elements that are included in levels where one of the goals to complete the level is to bring down ingredient elements to the bottom of the game board.

Jelly block: A game element that is placed underneath other game elements and need one or two matches on top of them to disappear.

Special game elements: All elements that appear on the game board and which have specific behaviours and properties.

Striped candy: A special candy with a line blast effect which means it removes one row or one column.

Line blast: An effect which removes one row or one column.

Moves & Score Level: In this game mode you have a limited number of switches before running out of moves. If you have not reached the score required to earn at least 1 Star, then you will fail the level.

Jelly Level: In this game mode the game board behind the candy is covered in jelly. Remove the jelly by matching candy on top of the jelly. If you fail to remove all jelly before running out of moves then you will fail the level.

Ingredients Level: In this game mode, ingredients will appear on the game board. Collect these ingredients by bringing them to their delivery point. On the side of the board you will see a recipe of how many ingredients you need to collect. If you do not bring down all the ingredients before running out of moves then you will fail the level.

Time Limited Level: In this game mode there is a time limit. If you have not reached the score required to earn at least 1 Star when the time runs out, then you will fail the level.

Candy Order level: In this game mode, you are tasked with collecting a number of candies. This is done by removing the wanted candies. If you have not collected all the wanted candies before running out of moves then you will fail the level.

Bomb element: a candy in wrapped paper which removes candies in a 3×3 square area.

Wrapped candy: a candy in wrapped paper which removes candies in a 3×3 square area.

Colour Bomb: Removes all candies of the colour it is being swapped with.

Booster: Something that enhances the gameplay and that supports, assists, or increases power or effectiveness.

Blocker: Special game elements that are unswappable, need 1 or more matches next to them to disappear and are in the way for falling candies.

Candy Crush Saga™ by the games developer King™ is a game belonging to the match-3 category of games. This means that the core basic of the game is to match three or more game elements sharing the same colour with each other. In Candy Crush Saga, these game elements are implemented as candies. FIG. 1 and FIG. 2 shows one implementation of the first level in Candy Crush Saga™ where candies have to be matched to complete the level.

Rules

Basic Moves and Combinations

Moves

To play game elements in the shape of candies are swapped with each other to make moves on a game board. To gain points the player has to make moves that create matches of at least three of the same candy. In doing so, the player gains points and the matched candies are removed. As a result, new candies populate the game board in order to fill any empty spaces created. The game board is populated depending on the physics of a tile associated with each game element. For all candies that are removed on the game board, points are always shown in the same colour as the candy that was removed, for example three red candies will show red points, green candies green points and so on. If a blocker element would be removed then the points shown would be in the same colour as the candies from the match that removed it.

Only swapping moves that will create at least one combination of at least three game elements of the same type are allowed.

Limited Number of Moves

A typical game mode of Candy Crush Saga provides the player with a limited number of moves to reach the level target.

In some implementations additional moves can be earned by good gameplay.

The Game Board

The game board is a scrolling game board. The display displays a grid of square tiles, each with a game element, showing a portion of the level being played (see FIGS. 5 and 6).

Different Goals to Complete Levels

To add more diversity and make Candy Crush Saga™ a more dynamic game, players have to fulfil different criteria in order to complete different levels; these are referred to as goals. Each level always has one or more goals that have to be fulfilled in order to complete that level.

Reach a Set Score Before Running Out of Moves

One of Candy Crush Saga's most common goals is to collect a certain amount of points before running out of moves. The points are collected through making matching combinations on the game board. The smarter combinations made, the more points.

Reach a Set Score Before Running Out of Time

Candy Crush Saga also has timed levels. The goal that needs to be fulfilled on these levels is to collect a certain amount of points before time runs out. The smarter combinations made, the more points.

Bring Down Ingredients

Some levels are referred to as Ingredients levels. The Ingredients levels have two goals which need to be fulfilled in order to complete the level:

The player has to reach a certain target score before running out of moves.

The player has to bring down a certain number of so-called ingredients to the bottom of the game board before running out of moves. When the ingredients reach the bottom of the game board they disappear and candies above them take their place. Ingredients are game elements shaped as fruits or nuts and only exist for this specific goal. They are not matchable with other game elements but they can be switched with other game elements.

Clear Jelly

One of the most frequent set of goals in Candy Crush Saga is the one used for levels that contain Jelly blocks. Jelly blocks are game elements that are found underneath other game elements and need one or two matches on top of them to disappear (See description elsewhere). The goals that need to be fulfilled on levels with Jelly blocks are:

Reach target score before running out of moves (as described elsewhere)

Remove all jelly blocks before running out of moves

Collect Certain Elements

Another type of level Candy Crush Saga has introduced to their variety of game modes is a so-called Order level. Order levels have two goals:

Reach target score before running out of moves (as described elsewhere).

Collect certain amount of candies through specific matches as well as achieving hard to make combos specified on the level played.

Balance Mode

In this game mode, players are required to collect an even amount of two colours of candies to complete the level. The level goal can be indicated with a scale where the two different types of candies to be collected are placed on either side. When the count is unbalanced, one side of a scale starts tipping, the bigger the difference the faster it tips. If one end touches bottom level has failed. Score is given to the player based on the number of moves it takes to collect the required amount of the two colours.

Crescendo Mode

The goal of this game mode is to light up all squares/cells on the game board. In some implementations, the requirement to light up a cell is to combine a candy that is in that cell. In other implementations, the player has to combine multiple candies in the same cell before it lights up.

Digging Mode

In this game mode, players are required to combine candies in cells adjacent to blockers in order to 'dig' down in the level. When digging, the player can uncover objects that are covered initially.

Multiple Game Modes

All of the game modes described herein can also be used in any combination with one another. For instance, the requirement to complete one level could be to remove all jelly as well as bringing down ingredients.

Basic Rules

How to Play

If the player tries to make a move with two candies in such a way that no candy will be matched with at least two more of its own colour, then the move will not be allowed and the player will have to try to find another move.

If no moves are possible on the game board then all the candies are reshuffled so that there will always be at least one possible move available. If the player can't see or find a move to make, then the game helps the player by giving a hint. The hint is displayed after a few seconds of inactivity and is shown by brightening and magnifying the candies of a possible move in a flashing animation.

Advanced Rule

Figure 19:
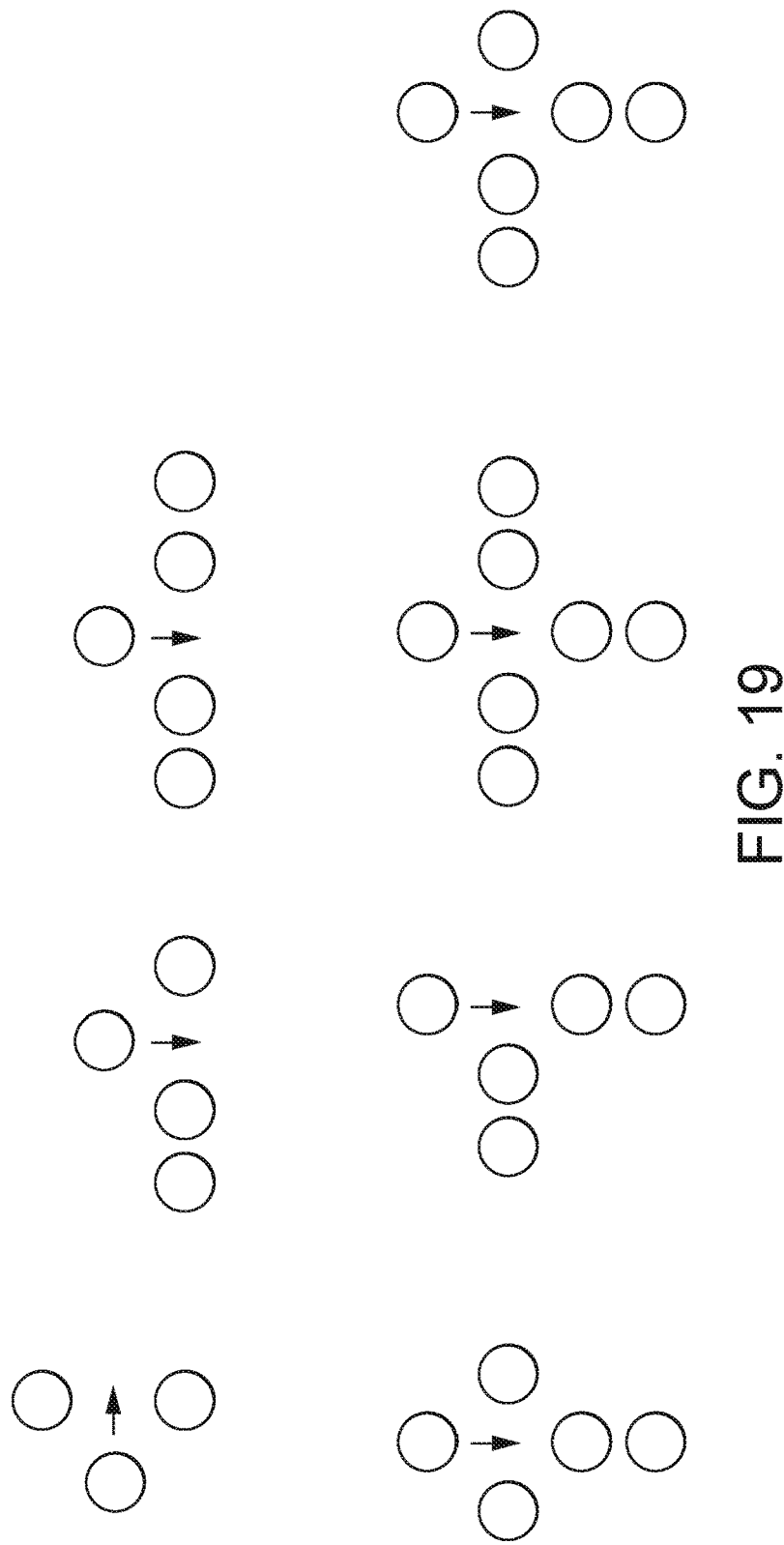
FIG. 19 shows different match possibilities.

Not only the match of 3 candies is allowed but matches of more candies can also be done; see FIG. 19 for the different possible match patterns. Matches with more than 3 candies give more points and is something the player should try and aim for. Different acceptable matches are:

Match of 3 in a line.

Match of four in a vertical line.

Match of four in a horizontal line.

Match of four in a 2×2 square.

Match of five in a vertical line.

Match of five in a horizontal line.

Match of five in a T-shape.

Match of five in an L-shape.

Match of 6 or more candies in a combination of 4-in-a-row, 5-in-a-row, T- and L-shapes.

As can be noticed from the list of possible matches, no diagonal matches are accepted. Diagonal matches and/or swaps can be allowed in some implementations of the game.

Combos to Receive Special Elements

Matches made of four or more candies not only give more points but also reward the player with special game elements. The special game elements received from combos have various positive properties and can be used to gain more points and to easier pass a level. The elements received from different matches are:

4-in-a-row: Striped candy 4 in a 2×2 block: Fish

L- or T-shape: Wrapped candy 5-in-a-row: Colour bomb

If a match is made with more than 6 candies, then it is likely that the combo is a shape merged from 4-in-a-row, 5-in-a-row, L-shape and T-shape. If so, there is a hierarchy of what kind of special element is received:

If there is a merge of 4-in-a-row and an L- or T-shape, then the special game element received will be the same as from an L- or T-shape. L- and T-shapes give the same special game element.

If there is a merge of 5-in-a-row and an L- or T-shape, then the special game element received will be the same as from a 5-in-a-row combo.

How to Trigger Special Elements

To use the special game elements received from combos there are two different ways:

Some of the special game elements are triggered through a standard match with two or more candies of the same colour as the special game element.

Some of the special game elements are triggered by swapping place with any candy regardless if a match-3 is made.

Combining Special Elements with Each Other

Special game elements received from matches can be combined with each other for various positive effects affecting the game board. Striped candies, Wrapped candies and Colour bombs can all be matched with each other. To trigger these combos they do not need to be matched by game elements of the same colour but can simply be swapped with each other for an instant trigger.

Points

The points given for different combinations and removals of blocks are:

3-in-a-row: 60 points 4-in-a-row: 120 points 5-in-a-row: 200 points

T-shape: 200 points

L-shape: 200 points

Break a Jelly block: 1000 points

Break a Frosting block: 20 points/per block

Break a Chocolate block: 20 points/per block

Get an ingredient to the bottom of the screen: 10 000 points

Using a special game element to remove other game elements: 60 points/per element removed Game Elements Standard Game Elements In Candy Crush Saga there are 6 standard game elements (see FIG. 15) which all look like candies:

Purple candy in the shape of a flower

Blue candy in the shape of a sphere

Green candy in the shape of a square block

Red candy in the shape of a tilted bean

Yellow candy in the shape of a drop

Orange candy in the shape of an oval

Special Game Elements

Special game elements can either be received from special combos or from an automatic placement on the game board.

Special Game Elements Received from Combos

Striped Candy

How to Generate a Striped Candy

A Striped candy is given by matching four candies of the same colour in a horizontal or vertical line.

Looks

The Striped candies have the same shape and colour as the standard game elements except for that they have white vertical or horizontal lines on them. The colour and the shape of the striped candy will be the same as the candies' which were being matched to create it.

If the match of four candies is done in a horizontal line then a candy with vertical lines will be given. If a match of four candies is done in a vertical line, then a candy with horizontal lines will be given.

Effect

Striped candies remove a whole row or column depending on if it was made from a vertical or horizontal combo. The white lines on the candy indicate whether it will remove a row or a column. To trigger a Striped candy it needs to be matched with two more candies of the same colour.

Striped candies removes all candies in a row or column also if the game board is divided up in two or more areas that are not connected. The player can this way remove candies from areas that otherwise would be hard or impossible to find combinations in. The impact of different game board designs are described elsewhere in this document.

Animation when Used

When a Striped candy is being triggered, an animation shoots out of the Striped candy following the row or column which it is removing. The animation looks something like the candy being stretched out and turned into lines that shoot out together with a sparkle effect. For all candies that are being removed, the points given for each candy will be shown in the same colour as the candy being removed.

Wrapped Candy

How to Generate a Wrapped Candy

A Wrapped candy is given by having an L- or T-shaped combination.

Looks

The Wrapped candies have the same shape and colour as standard game elements but with a wrapping around them. The colour and the shape of the Wrapped candy will be the same as the candies' which were being matched to create it.

Effect

The Wrapped candy is triggered by matching it with two more candies of the same colour. The result of the trigger are two explosions removing candies in a 3×3 square around the Wrapped candy. The first explosion occurs instantly when the Wrapped candy is being triggered, the second explosion occurs after all candies from the first explosion have been removed and replaced with new candies. If the Wrapped candy is at the edge of the game board an explosion will happen but there is no effect from the part of the explosion area that is outside of the game board. When swapped with a colour bomb, all candy in the level is destroyed.

Animation when Used

When a Wrapped candy detonates, an animation with sparkling effect and light circles is shown with the Wrapped candy in the centre of the animation.

Colour Bomb

How to Generate a Colour Bomb

A Colour bomb is received when matching five candies in a vertical or horizontal line.

Looks

The Colour ball looks like a chocolate sweet. A round ball with multi coloured sprinkles on it.

Effect

To trigger the Colour bomb it can be swapped with any candy, no match-3 is necessary. When the Colour bomb is triggered, it removes all candies of the same colour as the candy that was used to trigger it.

Animation when Used

When the Colour bomb is being used. Blue coloured lightning bolts shoots out from the colour bomb to all candies that are going to be removed.

Other Special Game Elements

Mystery Candy

How to Generate a Mystery Candy

Mystery Candies are placed randomly on the game board and do not need a special combination to appear.

Looks

The Mystery candies have an oval flattened shape which is slightly tilted and with a question mark painted onto it. The Mystery candy comes in the 6 standard candy colours.

Effect

To use the mystery candy it needs to be included in a standard match-3 with candies of the same colour as the Mystery candy. The Mystery candy will then turn into a random game element which could have either positive or negative impact for the player. It could for example turn into a Striped candy or a Colour bomb, or it could turn into something less fortunate for example a spreading chocolate block (see description elsewhere) or a bomb that counts down and explodes to make the player game over.

Animation when Used

When the Mystery candies are used in a combination they burst and turn into a random element.

Lucky Candy

How to Generate a Lucky Candy

Lucky candies are inserted on the game board automatically when having selected a pre-game booster which specifically adds Lucky candies to the candy mix on the game board.

Looks

The Lucky candy looks like a flattened sphere with a white tick mark painted on top of it. The candy comes in all the 6 standard candy colours.

Effect

To use the Lucky candy it need to be matched with two more candies of the same colour. The Lucky candy will then turn into a random positive game element.

Animation when Used

When the Lucky candy is being matched it looks like it is unwrapped and behind the wrap it reveals the new game element.

Fish

How to Generate a Fish

Fishes are placed on the game board by selecting a pre-game booster that specifically does so. They can also be created by creating a match of 4 candies in a 2×2 block. Further ahead in the game the Fish can also appear randomly on the game board.

Looks

The Fish looks like a candy jelly fish. It comes in the same colours as the standard 6 candies.

Effect

The fish is used by matching it with two more candies of the same colour. Doing so will cause the fish to swims towards a random element on the gameboard and remove it.

If there are Jelly blocks or other blockers then the game will prioritize to remove those before removing a candy that stands on an empty square.

Polka Fish

How to Generate a Polka Fish

This fish is given when combining a Fish with a Striped candy. The Striped candy and the Fish do not need to be of the same colour. Furthermore the Polka fish will be triggered instantly and cannot be saved for later use.

Looks

The Polka fish looks like a standard candy Fish but with the same kind of stripes as the Striped candy.

Effect

The Polka fish turns a random candy into a vertical or horizontal striped candy which in turn is instantly triggered and creates a line blast effect.

Animation when Used

In one implementation, as with the standard candy Fish and the Wrapped Fish, the created Polka fish swims out of view and returns with two more Polka fishes of the same colour which then swims to the position of the candies that are to be turned into triggered line blast elements. Having reached their destination the Polka fishes disappear.

Colour Changing Candy

How to Generate a Colour Changing Candy

These candies are placed automatically on the game board. They could also be a resulting candy when having used a mystery candy.

Looks

Like a standard candy but with a soft glow around it and an animation of a rainbow passing by over the surface of the candy.

Effect

The candy changes between two colours for every switch made on the game board.

Teleporter

This is a game element that is automatically placed on a fixed position on an edge of one of the cells in the game board. The teleporter will typically be placed on the game board in pairs where one of the teleporters act as an entry point for candies falling on the game board across the cell edge where the teleporter sits. The candy will then be introduced on the game board where the exit point teleporter sits. So if a candy is normally falling one way from the top of the game board to the bottom of the game board, the teleporter can move a candy up the game board again or to another area of the game board.

The teleporter does not fall down or take space on the area where switching is done and it is never included in any colour combinations.

Jelly Blocks

Jelly blocks are introduced early in the game and a typical goal to complete a level is to remove all Jelly blocks on the game board. Alternatively, the goal to complete a level may be to uncover larger game objects that are positioned behind several jelly blocks as seen in FIG. 17.

The Jelly blocks are placed behind candies and are stuck into place. They cannot be swapped and they do not fall down if candies below them are being removed.

To remove a Jelly block a match has to be made on top of it. Sometimes Jelly blocks consist of two layers and then they need two matches on top of them to be removed.

Candy Cannon

This is a visible game mechanic. In one implementation it can indicate where liquorice, bombs, and ingredients are set to appear.

Combining Special Game Elements

Special game elements can be combined with each other through a simple switch. Doing so creates powerful effects that help the player earn more points and to easier pass a level.

The different combos and effects received are:
Two Striped candies
Two Wrapped candies
One Striped and one Wrapped candy
One Wrapped candy and one Colour bomb
One Striped candy and one Colour bomb
Two Colour bombs
Two Fish Two Striped Candies Combining two Striped candies will trigger two simultaneous line blasts where one row and one column is removed in a cross shaped way, see FIG. 24. It does not matter if the Striped candies combined are horizontal or vertical. The column and row blasts will be initiated from the position which the moved striped candy has been moved to.

Two Wrapped Candies

Swapping any two Wrapped candies with each other will create a double explosion as with a standard Wrapped candy, the difference being that the area of effect will be much larger and remove everything in a 6×5 square area or a 5×6 square area depending on if the Wrapped candies are placed next to each other horizontally or vertically.

One Striped and One Wrapped Candy

Combining any Striped candy with any Wrapped candy will trigger 3 horizontal and 3 vertical line blast effects. The result is three adjacent rows being removed and thereafter three adjacent columns being removed.

One Wrapped Candy and One Colour Bomb

Combining these two will first remove all of the candies on the gameboard. See, for example, FIG. 14 where a colour bomb is denoted 140 and a wrapped candy adjacent it 142. FIG. 15 illustrates the effect of swapping the colour bomb 140 with the wrapped candy 142.

One Striped Candy and One Colour Bomb

The combination of these two special candies will turn all candies of the same colour as the Striped candy into randomly vertical or horizontal Striped candies which are then instantly triggered and fills the game board with line blasts.

Two Colour Bombs

Combining two Colour bombs will remove all game elements on the game board except if a game element is a multi-layered blocker (see description elsewhere). If a game element has more than one layer then one of those layers will be removed.

Two Fish

Combing two fish causes three fish to swim out from the position of the combination to three random locations on the gameboard. The fishes remove the game elements at the three position that they swim to.

Coconut Wheel and Colour Bomb

First, all candies which the game board has the most of will be removed. After those candies have been removed, the Coconut wheel will roll over the board and every candy it rolls over will turn into stripes.

Coconut Wheel and Striped Candy

With this combination, the Coconut wheel will roll over the board and turn all candies it rolls over into Striped candies that instantly triggers.

Coconut Wheel and Wrapped Candy

With this combination, the Coconut wheel turns all candies that it rolls over into Wrapped candies which are then instantly triggered and explodes.

Blockers

The game implements several different kinds of so called Blockers. Blockers are negative game elements that are in the way for the player when wanting to make matches on different areas of the game board. The game described herein has a new game objective associated with a Chocolate blocker.

The Chocolate blocker not only blocks a space on the game board but also multiplies to block even larger areas of the game board. If a colour combination is made next to a Chocolate blocker then no Chocolate block will multiply and that Chocolate block will be removed. However, if a colour match is made and is not next to a chocolate block then one of the Chocolate blocks on the game board will multiply and another space on the game board will be filled with a Chocolate blocker. The space that receives a new Chocolate block will always be adjacent to an existing Chocolate block, however, which Chocolate block on the game board it will come from is seemingly random. If all Chocolate blocks on the game board have been removed then no new Chocolate blocks will appear. Chocolate blockers cannot be swapped and change places but are stuck where they are. Chocolate blockers can only multiply to a cell on the game board that is occupied with a candy.

Boosters

Novel boosters discussed herein include the colouring candy and the Manually Operated Sidekick.

In-Game

Game Board

Part of the game board is presented to the player while playing levels in Candy Crush Saga. The term game board signifies the area that contains candies and other elements such as ingredients, jelly and frosting, not the surrounding landscape such as the score meter and the heart showing the amount of lives left. The entire game board is not visible to a player; instead the CPU can control the user interface to scroll the service board to a player.

There are audio controls on the user interface used for the music and sound effects. The amount of moves the player has left to complete the level is shown. The current score of the player, expressed in absolute points is presented so that the player may follow the gameplay. The star meter, showing an indication of how much points the player has in relation to the pre-defined goals required for achieving a certain amount of stars. The game board is populated with regular candies in regular cells and or tiles. The number of lives the player has left is shown. Both the current level of the game and a symbol indicating what the goal of the level is are shown in relation to the game board. The physics of a tile governs where new candies enter onto the board when existing ones are removed. For part of the game board (upper part in FIG. 16) new candies are generated from the top and fall downwards as shown by the arrows, and for the lower part in FIG. 16 candies are generated from the bottom and move into place upwards.

The entire game board is not visible to a player: instead it can scroll upwards or downwards depending how the game progresses as described earlier.

Star Meter

In the most basic version, this feature serves the purpose of letting players know their performance while playing the game by showing which level of score they have accomplished. The level of score is determined by the amount of points gathered and compared against predefined levels that will earn the player one, two or three stars. Stars are a representation of how well a player is performing on a level. Achieving at least one star is required to pass a level.

Achieving more than one stars indicates that a player is performing better than the minimum required and is a factor that helps drive engagement by making players feel more skilled. The amount of points required to achieve one, two or three stars is pre-defined and typically does not change for any level. However, in some implementations it is possible to have a variable score required for different amounts of stars, for instance one that is correlated with the average scores of all players playing the game.

In some implementations, there are indications of the performance of other players displayed during the play of a level. This information is often based on data from previously completed levels, but it can also be related to levels that have been attempted and failed by other players. Performance information can for instance be derived from a social network connected to the game or from databases more directly related to the game. In some implementations, players can see the score of other players in real-time, thus increasing the competitive element of the game. The other players whose performance will be displayed is sometimes chosen by the player, sometimes automatically derived from a social network of the player, and other times it can be based on other elements, such as the performance of all players of the game.

In some implementations, the player can see indications of the previous high score achieved on a level while playing it. It is also possible that no indication of the player's own previous score is shown.

In some implementations, the indications of the performance of other players are shown in relation to the score meter. It can be both absolute and relative indications. The indications can be in the form of pictures associated with the players. When the player passes the score of another player or the previous best score the player has achieved, a message can be shown to encourage the player and denote the accomplishment.

It should be understood that the invention is not limited to using stored scores to show the performance of other players. In one implementation, players can see the scores of other players currently playing the same level while they are playing it, making it so that the indications of other players' scores can be moving in real time during the play of a game.

The score comparisons presented to the player can be given in percentages, points and when applicable other indicators, for instance time played or number of attempts on a level.

The look of a level, as well as the overall look of the virtual landscape, can change as the player performs better. For instance, after achieving one star during the play of a level, the digits shown when scoring points can turn into a different colour. The lookout of the virtual landscape can become warmer and more colourful as more stars are gained. The look of the game can change according to other variables as well, such as the in-game view changing depending on how many moves are left in order to convey a sense of urgency.

The Star Meter also has other important functions. One is that the score of friends from a social network is shown on the meter, if there is data available. This increases competition and incentivises players to replay levels in order to beat the score of friends.

Another function is that the amount of stars achieved on each level is shown next to the levels on the map view. This gives players an overview of their overall performance in the game. Also, in order to complete a level the player needs to reach the amount of points needed to achieve at least one star.

Soda Crush End Game

Upon finishing a level, Candy Crush Saga may display the words "Sugar Crush" accompanied by audio saying the words. In one embodiment, the first thing that happens after this display is that all special candies trigger one after another, removing other game elements and gaining points. Secondly, the special game elements—such as wrapped candies, stripped candies, etc—may be placed on the gameboard in random position and instantly triggered, removing further game elements and gaining points. The number of game elements placed on the board may be equal to the number of moves that remain to the player upon completion of the level.

Candy Fish

In some game modes, players are awarded for their remaining moves by a number of candy fish spawning. The fish are proportional to the amount of remaining moves left. The fish come from outside the game board and randomly seek out candies, which are removed upon impact. Players receive bonus score for when each fish hits a candy.

Wrapped Candy Transformation

In levels where the player has a limited amount of time, there are certain candies that are marked with a '+5' symbol, meaning that they give an additional 5 seconds if popped. If any of these candies remain when the time runs out, they transform into wrapped candies that subsequently trigger.

Pre-Level

Before starting a level, players have to select which level to play from the map view. The exception to this is the very first time Candy Crush Saga is played, when level one starts immediately. When selecting a level, the player is shown information about the level, such as the amount of points needed, the available boosters that can be used, the goal of the level and also the high scores of friends who have previously played that level.

A difference between playing a level for the first time and playing a previously completed level is that the previous best score of the player is displayed, together with the amount of stars achieved. Also, the text that is telling the player what the target goal is, in terms of points, is changed depending on how many stars the players has achieved before. Having the game set up in this way increases replayability by making players focus on always improving, but not necessarily too much at a time. If the first goal presented was the one correlating to three stars, players could feel inadequate if they get less points than that, even if the level was completed.

The player can choose boosters that will in some way affect the game play, before starting a level. Boosters are unlocked and gained as the player progresses throughout the game, but it is also possible to purchase more boosters.

It is also possible to help friends by sending them lives.

Post-Level

Completing a Level

When completing a level, the player is presented with a screen that shows the amount of points gained, the amount of stars achieved and the previous high scores of friends.

After the post-level screen has been closed, the player may be presented with yet another screen related to the performance of the just completed level.

Both the Post-level screen and the screen that shows when a friend has been beaten present the player with an option to share this information. The sharing part is done on a social network to which the game is connected. By sharing information such as which friends the player has beaten, competition is encouraged and the viralisation of the game is increased, due to people not playing the game also being able to see such messages.

It is possible to help friends by sending lives from this screen as well. This can be done with a click on an icon with a heart and letter on it, next to the friends' names. The tick marks indicate that the player has already sent lives to those friends. The player may only send lives to any one friend once within a certain period of time—for instance once per day.

Failing to Complete a Level

When failing to complete a level, a screen similar to the one shown when completing a level is displayed. The difference is that the screen when failing a level has a broken heart on it, together with information stating why the level was failed. Failing a level can happen due to a number of reasons, such as not reaching the minimum score for one star, failing to accomplish the goal or by a bomb exploding. The player is informed of the reason for why he has failed the level. Understanding why you have failed a level increases the likelihood that he player will try to play the level again to reach that target for the level. If wanting to play the same level again there is an option to do so. In one implementation the option to replay the failed level is presented with a large and visually significant button.

Level Progress and Ways of Playing the Game

Ways to Play the Game

Games created using the techniques described herein can be played locally on a player's computer or handheld device. The game can also be played over the Internet where the whole game or portions are downloaded and executed on the local machine or run on a remote computer or server. The user's progress in the game and results can be stored locally and compared to the user and other players on the local computer. The progress and results can in an alternative embodiment be synchronised with other players, either directly or through a server or social network or gaming platform.

Cross-Device and Cross-Game Functionalities

Three platforms in particular are changing the way people expect games to be played. These three platforms are growing at the same time, and provide new input possibilities. To date, games have not absorbed all the new input possibilities.

The first platform is Facebook. The skilled person will understand that where Facebook is referred to in this document, other social network platforms may be used. A Facebook game may be a social game, a game you play with your friends. It is rare or unthinkable to launch a game (i.e. to play for the first time) on Facebook that is a paid game, because people playing games on Facebook expect not to pay to access a game. A Facebook game may be played on the internet, after logging in to Facebook (whether automatically or manually), such as from a personal computer.

The second platform is smartphones. Use of smartphones is not always continuous. You may use a smartphone for 5 minutes on a bus, and then for 20 minutes on a connecting train, for example. The use can have many starts and stops, not like someone working at an office desk or at a home desk in a conventional way. A smartphone can be on an iOS platform, or on an Android platform, for example.

The third platform is tablets. A tablet can function as a mobile device and as a non-mobile device. The tablet can be a substitute for a personal computer. A user may want a seamless experience between using the game on a personal computer and on a tablet and on another mobile device. A tablet can be on an iOS platform, or on an Android platform, for example.

A game which works on a plurality of, such as all three of the above platforms (or more), may provide a connected fully-synchronized seamless experience. Hence multi-platform games are important. Key criteria for multi-platform games are: they are free, they are social, stop-start use is possible, and seamless experience is provided. Such games may be "played anywhere" e.g. in a mobile environment or in a non-mobile environment. Such games may also be played online or offline.

The game must be fun when used in a stop-start way, and when used for even just short intervals. In an example, a game consists of parts or levels, each of which runs for about 3 minutes, e.g. between 1 and 5 minutes. In an example, a game is structured in levels, so that if successful in a game level, such as by scoring a minimum score, a user can progress from that level to the next level. In an example, a game has about 200 levels.

A game can be optimized post-launch. For example, if it is clear that too many users are failing to progress past a particular level, the minimum score to pass the level can be lowered. An optimized game may be provided as an application update from an application store. In an alternative, a game may be optimized by a server sending a revised data file of scores required to pass each game level to a mobile device, when a game state of a user is being synchronized with the server, wherein the application running on the device replaces the previous file of scores stored on the device required to pass each level with the revised file of scores required to pass each level.

The progress of a player is also synchronised across devices, for instance between a handheld device and a computer. This is described in further detail in Appendix A. The player can play on one platform, have the progress saved and then continue playing seamlessly on another platform. It is also possible for the player to play on offline devices and having the game synchronise when a connection is available.

In some implementations, players can be rewarded for playing the game on multiple platforms. For instance, players active on a computer-based platform could get a bonus for also installing the game on a handheld device.

Players can also be rewarded for playing multiple games that are related, for instance games from the same developer. When choosing to play a new game, the player can receive bonuses in another game. This can be triggered by using a link from one game to the other, or by games sharing information between one another so that it automatically detects a player that is playing more than one game and subsequently rewards them.

It is also possible that games can have elements in common that enables certain objects, for instance boosters, to be usable in multiple games. These games can be located on the same or on different servers. In some implementations, a booster bought in Candy Crush Saga can be used in another game that shares certain features with it.

One example of an implementation with synchronisation across platforms is as follows:

A first server, for instance one hosting a social network, with a first data store storing data relating to the state of a game. The first server is configured to communicate with a first plurality of devices, such as mobile phones or personal computers, through a first application programming interface, where the first plurality of devices is related to a first computing platform.

A second server, for instance one hosting a game platform, with a second data store storing data relating to the state of the game. The second server is configured to communicate with a second plurality of devices, such as mobile phones or personal computers, through a second application programming interface, where the second plurality of devices is related to a second computing platform.

A third server with a third data store, configured to communicate with the first and the second server. The three servers are configured to synchronise the three data stores in such a way that when synchronized, the first, second and third data store all relate to a synchronised game state.

Localisation and Updates

It is possible for implementations of the game to vary depending on the location of the player. For instance, the language can be adapted and translated into different languages. It can also be so that updates of the game are incorporated at different times in different locations, in order to avoid interference with the times of the day that players are as most active.

If trying to access the game online, as opposed to starting a local version that is saved on the device, while updates are being made, the player can be met by a message saying that the game cannot be accessed right at that moment. Such a message could be displayed instead of the game as a placeholder for when the game is taken offline, for instance so that the game can be updated with new features and software.

Progress Over Several Levels

The game can be implemented so that a player progresses through multiple levels of changing and typically increasing difficulty. The user interface can present a virtual map layout of a game environment, displayed on the computing device used by the game player. As the player travels through the levels in the game, his progress is represented as a journey along a path in the virtual map. Representing progress in this manner provides an additional layer of engagement for players, and also opportunities for viralisation and monetisation.

The virtual map consists of stages with varying number of levels. The user travels between levels and completes the levels one by one along a path by playing the associated game. When the player reaches the goal of a level, the next level is unlocked and the player can play that level in the game. The number of stages and levels can vary depending on the implementation. The levels can be numbered consecutively throughout the game or they can be numbered within a stage, it is also understood that other ways of identifying the stages and levels can be implemented. New stages to the virtual map 12 can be added by the game designers at any time—so a game may be launched with say 20 levels, and after a number of weeks, there may be fifty or sixty levels present.

One way of unlocking new stages is to complete the last level on the latest stage. The user is sometimes faced with challenges to unlock the next stage in the virtual map.

In one implementation, traveling from one stage to another once all the levels have been completed on that stage requires the help of for instance three friends. The player can ask friends for help by sending an in-game message within the game environment or for instance through a social network that the game is connected to. The friends can already be playing the game and do not have to be 'new' players, but they can be friends not already on the same social network.

The player can also pay to get instant access to the locked stage. The player can use a combination of help from friend and payment to unlock the new stage. The cost for unlocking can in some implementations be lowered as a fraction of the total number of friends needed when help from some but not all needed friends have been received.

The request for help is sent to the friend who then has the option to accept to help. The request for help can in some implementations be sent using the social network to which the game is connected; an alternative implementation is to send the request to someone external to the game (via email, text message, instant message for instance) who has to join the game to respond to the help request. This is one of the viralisation techniques implemented in this game.

In addition to the virtual map layout, there can also be other levels or stages that are not part of the progress along the path in the virtual map. Such stages or levels can be present in the game associated with the virtual map at all times or can be unlocked when the user reaches a certain in-game achievement. This in-game achievement can for instance be completing a specific level, reaching a predetermined high score (for instance, collecting a specific number of stars when completing a level—highly skilled gameplay can win the user three stars) or paying virtual currency to unlock the stage or level.

The map layout can be used in games connected to or linked with a social network. It is common that the users on such networks have avatars with for instance a photo of the user and/or the user's name. Such avatars can for instance also be a sign or a figure. It is understood that there are different implementations of showing where the user currently is on the map. This can for instance be the latest level the user completed, the level with the highest score or the last completed level along the traversed path.

The user can in some embodiments be given the option to select which users should be shown on the virtual map. The users to choose from can be friends on a social network, or the user can get suggestions to show friends which meet a certain criteria, for instance friends which the player has interacted with the most in the past or friends living in the same geographic area as the player. The user can get the option to choose from other people not being friends on the social network, but that meet other certain criteria.

The user can play any of the unlocked levels on the map, so the user can go back and replay already completed levels to get a better score or beat friends' high scores.

The player is in some implementations of the game rewarded for good gameplay of a level, for instance reaching a target score. In some implementations the user has to reach a certain number of points to complete a level, reaching this target score can be represented with a symbol such as a star. In one implementation a star is lit when the user reaches a certain number of points in a level. The user can earn more than one star on each level and the levels are re-playable to get a higher score.

The player's total number of stars collected in the game can in some embodiments unlock features. The unlocked features can for instance be power-ups, in-game currency or bonus levels.

The symbol representing how well the user has played on each level can be displayed alongside the level on the map.

If the game is connected to a social network or the user has connected with other players in the game, the levels will present a leaderboard showing who among the user's connections has the highest score. There can in some embodiments be a notification 11 shown on the map if the user that has the highest score among the friends connected to the game.

The type of game mode or game goals for a level can be displayed on the map as a symbol.

Animations and Interactions on the Virtual Map

The landscape of the virtual map will typically have animated sequences which give a feeling of the map being alive and dynamic. For example, trees on the map can sway in the wind, animals can move around and the player progressing from one level to another can be accompanied by an animation of a player-associated character moving on the map.

In some implementations, it is possible for the player to interact with objects on the map in such a way that animations are triggered. For instance, clicking on a bird can make it fly into the air and hovering over water can make waves appear.

It is also possible to have any combination of a map that is static but reacts to player input, a static map that does not react to player input, a dynamic map that reacts to player input and a dynamic map that does not react to player input.

Head to Head Tournaments

The game can also be implemented to be played with a limited time or limited number of moves or both over a consecutive set of levels. The score can be collected over the several levels to give the player a score for all the levels completed.

The player can in some implementations play the game in head to head tournaments against one or several other players. The player with the highest collective score over the number of levels will be the winner in the tournament. In some implementations the tournaments are played with real time comparisons of players' scores, in other implementations the scores of players are compared after finishing a level.

The game can also be played in tournaments with jackpots where the player plays the same level where the same types of game elements are used.

The game can also be played in an elimination competition against other players.

Rewards and Bonuses

The game can have schemes for giving rewards and bonuses to players. One reason for giving out rewards is to increase player engagement, and to some extent to help with monetisation. Players can for instance be rewarded for playing multiple days in a row, something that awards persistence and dedication. In other implementations, there is a daily bonus available that is gained by every player playing the game online during that day, or to players passing a certain secret location during that day. By giving players samples of existing boosters, they are given a free preview of purchasable items that potentially can lead to sales in the long run, which helps monetise the game.

Virtual Landscape

The virtual landscape of Candy Crush Saga is presented to the player in between levels. This is also referred to as the 'map view' and the 'virtual map' within this document. The player travels along a virtual path as more levels are completed in the game, which gives the feel of moving forward.

Total Looks

The looks of the map view is in the style of a physical foldable game board such as one commonly used for board games. However, since Candy Crush Saga is not a physical board game but a virtual one, the board is much larger than what can be displayed in a single screen. The player can at any time, while in the map view, look at all available levels and also scroll through the entirety of the map board. Having such a style gives a strong feeling of actually progressing forward in the game as more levels become unlocked.

Navigation

When navigating on a map in a game, it is sometimes difficult to find desired spot or area of the map if the map is, for example, too large. As mentioned earlier, the levels of the game may be grouped together into "stages". In one embodiment, a list of the different stages of the game may be present in an expandable tab. By clicking on one of the stages in this list the screen jumps to the location of this stage on the main map, thereby allowing the player to rapidly navigate the main map. In this document we refer to the expandable tab and the mini map as the navigator.

Navigator Hidden

If the player does not need to use the navigator then it is unnecessary for it to take up precious screen space. Therefore, in one implementation the navigator is only in full view when the player needs it; the rest of the time it is hidden with only a small part of it showing. Clicking on this small part will expand the navigator and let the player use it. Clicking on the same part again will once more hide the navigator. In one implementation, when the navigator is hidden, a small tab is placed at the bottom right edge of the screen which will in turn expand the navigator when clicked on.

In one implementation, if the player for example wants to jump to the furthest reached location on the map, then there is a home button which will take the player there directly. Pressing the home button will not only take the player to the current location but will also hide the navigator, giving the player a full view. With the home button, the player can always find their active location in the blink of an eye.

Another implementation may be to offer the player filtering and multiple choices of where to jump on the map. There could for example be an icon which when pressed lets the player choose exactly which level to jump to. There could also be an alternative to receive a list of levels the player can jump to which satisfy certain criteria, for example all levels with limited moves and ingredients in them. The filter could offer many kinds of choices.

Theme

Overall Theme

The overall theme of Candy Crush Saga lends a special atmosphere to the game. Everything is candy-themed with bright and warm colours used in all animations and pictures. The words used for encouragement throughout the game, such as 'sweet' and 'delicious', serve as an example of the candy-theme.

Individual Areas and Level Progression

As the player progresses in the game, new areas/episodes are unlocked. Each episode has a related story and often a mini-theme that is present in at least some levels in the area. Also, the same background picture is used in all levels in the same area. When reaching a new are the background image will change. Each episode also has a specific colour which is used in the virtual landscape-view to show the different episodes.

The episodes all have different names, each with a candy-theme to it for example Candy Town, Candy Factory, Lemonade Lake, Chocolate Mountains, Lollipop Forrest and so on.

Within each episode there is a set of levels. The division of levels between the episodes is not entirely linear. The first two episodes consist of ten levels each, while episodes three and onward each consists of 15 levels each. This makes it easier for the player to advance in the beginning, something that can be important for player retention and engagement.

Path

In the virtual landscape, the player follows a virtual path as the game progresses. After completing a level, the next one becomes unlocked and the player 'travels' there on the virtual map. There is an indicator showing which level the player is currently on; in one implementation the indicator is in the form of an orange arrow bouncing up and down.

The virtual landscape is divided into areas, each area representing a different episode of the game. The episodes are also coloured differently, with one colour being used consistently throughout one episode/area. The end of an episode is marked by a special kind of obstacle that can only be passed with the help of three friends, or through a purchase. When passing these kinds of obstacles, there is a celebratory animation accompanying the passage to signal that the player has progressed into a new episode of the game.

Unreached Areas

In the virtual landscape, levels that have not yet been reached by the player are shown in a different way than levels already accessible. There is also a difference between unreached levels in an unlocked area and unreached levels in areas not yet unlocked. As can be seen in areas that have not yet been reached are greyed out. This furthers the experience of giving players a sense of accomplishment when reaching a new area, since it is reflected by the virtual landscape actually changing slightly.

Collaboration Blocks

As already mentioned, there are special obstacles that hinder the player from reaching new areas in the game. These obstacles are 'collaboration blocks', which means that the player needs to receive help from friends in order to pass. Help from friends can be requested through a social network, and the new area will not be unlocked until three friends accept to help. This is a way to increase viralisation as well as player engagement. By helping each other players get a sense of collaboration, as well as it being a competitive element to remind the player how far friends have come.

It is possible to circumvent the need of having friends to help pass into the next area by instead paying for it. The amount that has to be paid can be reduced by having some friends help, even if the required amount of help for passing without paying is not reached. For example, if one friends help the player has to pay more than if no friends help, if two friends help a lesser amount has to be paid than if one friends help, and if three friends help the player does not need to pay at all.

When reaching a collaboration block, which is at the end of each episode in the game except for the first two, the player is prompted to select which friends to send requests to. The friends need to have Candy Crush Saga installed in order to be able to provide help, but it is possible to send requests to friends who do not yet To travel from one stage to another once all the levels have been completed on that stage requires the help of three friends. These friends can already be playing the game and do not have to be 'new' players. However, instant access can also be bought using a virtual currency. Friends can be asked for help either by clicking the 'Ask friends for help' button, or by the '+' sign to the right of the buttons. Once the stage has been unlocked with the help of the three friends, all the levels within that stage are unlocked too.

The user can choose to request help from only selected friends or to send a request to multiple friends. There can be a limit to how many friends the player can send the request to and also a limit in time before the user can send a reminder or similar request.

The request for help is sent to the friend who then has the option to accept to help or to decline to help. The request can in one implementation be sent using the social network to which the game is connected; an alternative implementation is to send the request to someone external to the game (via email, text message, instant message for instance) who has to join the game to respond to the help request. This is one of the viralisation techniques implemented in this game.

Mystery Quests

The inventions may be implemented with ways of getting past a collaboration block other than asking friends for help and paying for it, which are the most common ways of passing a collaboration block. This can be done through to use of 'Mystery Quests', which gives the player the option of completing one or several challenges to unlock the block. Such challenge can for instance be to play one or several past levels with modified goals in order to pass the collaboration block, for instance three levels—one for each of the locks.

These challenges are typically in the form of replaying a previously completed level but with a new goal to reach, for instance a target high score. In a typical implementation, the score requirement is higher than it is for playing the level regularly, and also no other goals need to be fulfilled. For example, if the player gets to replay a level with jelly with a new target high score, the player would not need to remove the amount of jellies specified as long as the target score was reached.

In a typical implementation this option to pass a collaboration block in the game is available in three cases; if the player is not connected to the Internet, if the player has not connected the game to a social network, or if the player is not connected to either a social network or to the Internet. If the player is not connected to either a social network or the Internet then the other options available for passing the block, such as sending requests to friends, cannot be used. However, it is possible to have this option available to users connected to both a social network and to the Internet as well.

It is possible to combine the ways of passing a collaboration block. For instance, completing one Mystery Quest could make it so that the player only has to request help from two friends once a connection to a social network has been established, or that the player does not need to pay as much for purchasing a way through the collaboration block.

In some implementations, Mystery Quests are not tied to specific collaboration blocks. For example, if the player reaches a collaboration block and completes a Mystery Quest, then connects to a social network and receives help from three friends, the player will only have to complete two Mystery Quests the next time that option is chosen to pass a collaboration block. If the player then only completes one more mission, and then goes on to receive help from friends or purchase a way through, the third time a Mystery Quest is chosen as a way to pass a collaboration block, the player only needs to complete one level.

If the player chooses to play the mystery quest to pass the collaboration block, the player will be taken to a screen showing three symbols representing challenges to be completed, as well as specifications regarding which level is to be played and what score is required to pass the first challenge. In a typical implementation, the game randomly chooses a previously completed level and increases the score required to pass it. In other implementations, the Mystery Quest levels can be new levels that the player has not completed before.

If the player chooses to continue with the quest, another screen is presented, allowing the player to choose boosters. This screen is very similar to a regular pre-level screen, with the difference that instead of the level number it says 'Mystery Quest', instead of three stars it shows a special padlock indicating that it is a Mystery Quest, and a special symbol in front of the target score to further indicate that it is a Mystery Quest and not a regular level.

If the player chooses to play the Mystery Quest level, the game proceeds to the game board screen and the player can start playing. If the player fails to achieve the target score, a pop-up shows why the player failed. In some implementations using levels previously completed as Mystery Quests, the regular goals for completing the level are listed as a reason for failure as well as failing the target score. However, even though this is shown as a reason for failing the level, the player will in a typical implementation complete the Mystery Quest as long as the target score is achieved, even if the other goals of the level are not. In other implementations, the player can be required to achieve both the target score and other goals for the Mystery Quest to be completed.

However, if the player manages to achieve the target score on a Mystery Quest, the level will be completed. Completing a Mystery Quest level will take the player to a post-level screen similar to a regular post-level screen but with the same differences as the pre-level screen. After this there will typically be an animation to signal that the player has completed the level, such as the padlock going from being locked to being unlocked. There can be other ways to show a post-level screen after the animation of unlocking the padlock has been shown.

After completing a Mystery Quest and pressing 'Done' on the post-level screen, the player is typically taken back to the main Mystery Quest screen. This screen will then show the player the overall progress with the Mystery Quest, which in a typical implementation consists of three levels.

In some implementations, the player needs to wait 24 hours between completing each of the three levels of the Mystery Quest. In other implementations, the wait time could be less or none at all. It is also possible to use other criteria for accessing the next Mystery Quest, such as getting more stars on previously completed levels.

Typically the player will use a life for each failed attempt of clearing a Mystery Quest level, just as is the case with regular level. It is also possible that the Mystery Quest levels do not affect the player's life total, or that it uses up another kind of resource as such as boosters.

It is possible for Mystery Quests to be used for other reasons than to pass a collaboration block. For instance, there can be bonus levels within the game that can only be accessed through completing Mystery Quests. In some implementations, Mystery Quests can be a way for players to earn boosters in the game without having to purchase them. It is also possible that Mystery Quests are only available at certain times, such as between 9 PM and 10 PM each day or on specific days.

Alternative Ways to Connect with Other Players for Help or Other Requests

For players who are not connected to friends through a social network, or players who are connected but only have very small social networks, an alternative way is to connect them to other players (if they want) and find proxies for the social experiences that existing networks provide.

It is important to allow players who otherwise would be stuck at a collaboration block or other social interaction tools to also be able to progress in the game. This is important to minimize the churn and to allow the game to be a fun experience for a larger portion of the players.

One such implementation is to drive installs of the game using new channels—SMS, E-Mail, Twitter etc. This will boost DAU, create engagement by creating social connections and communication channels with those connections. It may also increase revenue by keeping players in the game.

Overall Structure

This alternative approach may be used for interaction for instance when a player reaches a collaboration block or runs out of lives. The game prompts player to "ask for help" from other players based on some user derived player characteristics such as location, player game experience. The player gets a prompt to get help with a generated but editable alias and they "send" the message. If the player's Push Notification (PN) settings are set to off include the requirement to turn PN on. The client registers the player request user ID with the server. Server generates a response granting the user request, on a random basis, from 5 to 55 minutes from request. And sends a PN to player. After the player has completed a single loop—request-PN-request grant. They become capable of receiving help requests when they launch the game.

Feature Description

When a standalone player (a player with no or only a few 'friends' connected to the game or to a social network) reaches a blocker in the game, this alternative approach gives them a way to extend their game play by asking for help. Players will be able to select where they ask for help from, through SMS, Email, Twitter etc.

Upon Completion of the loop, they will receive the requested help allowing them to continue in the game.

This approach can be used for collaboration blocks, that the player can request lives, request other help in the game. It can also be implemented so that the player can send invitations to the game and if the recipient will join the game then the inviting player may get a reward.

The player that receives the request for help can click on the link on for instance his mobile device or computer.

The recipient will be taken to the link destination where the client device is detected and it is identified whether the player has already installed the game on the device. This can for instance be done using a so called URI scheme as described below. If the recipient does not have the game already installed he is taken to the appropriate webpage or application store to download or activate the game. This can for instance be the Apple or android app stores or to the Facebook app page. There are different options available to implement this functionality and the identification of the device can be done on the specific device or on the server.

The player that has sent a help request will be notified when he has received the requested help.

Further Explanation

When a player has run out of lives or is stuck at a collaboration block he or she can send a request for help via SMS. The SMS consists of a short message describing what help is wanted and a link. The message and link can be sent to one or more receivers. The link contains info on who sent the request, what the request was for and a timestamp. When the receiver clicks the link the required help is sent. Link usage is kept track of in the database so a link cannot be reused by the same user. If the player does not get help within a certain time span he or she gets help from themselves (looks like someone helped them). This is only to reward the behaviour of asking for things and its use is limited.

The link payload consists of:

5 bytes user ID 1 byte transport medium and request type 2 bytes arguments (timestamp for life requests, episode and level index for collaboration blocks)

The data is then encoded in Base64, / is replaced by _ and = is replaced by empty string. The link is a normal http link. Nothing is stored server side until the receiver clicks the link.

Push notifications are used to close the loop and are also limited per 24 h period. In some implementations they are not needed for the help to get sent.

7.1 Notifications

Players can choose to be notified of certain events in a game. The notifications may be both 'pushed' as well as only available once a player logs into the game. Notifications can be sent on both stationary computers and mobile devices, depending on the player's platform of choice. It is also possible to have notifications that stretch across multiple platforms, for instance they can pop up on both Facebook and on a mobile device at the same time.

'Push technology' and subsequently 'push notifications' describes communications in which transaction requests are initiated by a publisher or central server, as opposed to 'pull technology' in which the receiver or client initiates a transaction requests. Typically the player can configure in which way push notifications should be received from a range of available options, such as:

Banners—Notifications are shown at the top of the screen and automatically disappear after a set period of time, typically a few seconds, unless the player interacts with them. Banner notifications can state information regarding the notification, or it can simply state which game the notification is coming from. It is in a typical implementation possible to interact with banner notifications, for instance by clicking on them. Typically clicking on a banner notification will bring the player into the game.

Alerts—Notifications require interaction from a player before disappearing, typically they appear in the middle of the screen.

No notifications—The player can also choose to turn of notifications altogether.

In a typical implementation the player can choose which events to be notified about. In some implementations, the player can be choose to be notified when a new Mystery Quest is available, or when the player has full lives. In other implementations, the player can choose to be notified regarding a variety of different events, such as the following:

When a friend passes them in the level progression.

When their score is beaten on a specific level or on any level.

When new levels have been added to the game.

When help has been received.

When help has been requested.

When a new friend, either from a social network or from a game platform, starts playing the game.

When they have not played for a certain period of time.

When the game has been updated.

When new games from the same developer have been added to the application store.

When there are special offers in the in-game shop.

In a typical implementation, the player can choose to interact with notifications in various ways, for example:

Silence the notification temporarily but keep it available.

Dismiss the notification entirely so that it is removed and cannot be seen again.

Go directly to the game and start playing. This can in some implementations be done by automatically starting a specific level, for instance in the case a friend has beaten the player's score on a level or if the player has been passed.

Directly respond to the notification, for instance if a friend has requested help, the player can respond directly by one click that allows them to send help without actually going through the game interface.

In some implementations where notifications are pushed, the player will only get the first notifications pushed, subsequent ones will not be seen until the player chooses to acknowledge the first one. This is because players should not feel irritated or overwhelmed by notifications.

Notifications can also be implemented so that they synchronise across platforms. For instance, if a player has been notified about an occurrence it can be sent to both a mobile device and the Facebook platform, but after acknowledging the notification on one platform it also disappears from other platforms. Notifications can be sent in various ways, for instance:
  Email message
  Message sent through a social network to which the game is connected
  Through a message sent on the game platform
  Through a text message, for instance sent to a mobile device
  Phone call Stars Next to Level Nodes In order to give players a better overview of their progress and overall performance in the game, Candy Crush Saga shows the amount of stars achieved on a level adjacent to the level node. When hovering over a level node, the stars are instead displayed adjacent to the thumbnail.

Social Aspect

Connection to a Social Network

Games created using the invention described herein can be connected to or linked with a social network such as Facebook™ or Google+™ or a games platform with different players who can interact and see each other's progress. It is common that the users on such networks have avatars with for instance a photo of the user and/or the user's name. Such avatars can for instance also be a sign or a figure.

The social network can be located on a server that is different from the server on which the game is located, the game and the social network can also be located on the same server. In some implementations there is a direct live connection between the social network and the game platform that continuously synchronise them, in other implementations the two platforms synchronise at certain intervals, such as when the player logs into the game. The players progress when having played in offline mode (for instance completed levels and score), for instance if the player is travelling in a tunnel, can be synchronized when the player is connected to the internet.

The user and his friends' avatars can be displayed in the game or in relation to different levels in the game to show the player's progress. The avatars can also be shown in relation to indicators of the player's skill level or high score. In some implementations the avatars can be derived from a social network to which the game is connected, in other implementations they can be derived from a database related to the game. It is possible for the avatars related to users to change depending on the overall progress or performance in the game. For instance, an avatar can become larger or more visually advanced as the player plays the game for a longer time.

The user can connect with other users of the social network, either as "friends" on the social network or as "friends" within the game environment. The player can interact with other players he is connected to on the social network or who are playing the same game.

The game can be implemented to synchronize game state information and/or retrieve and connect to the social graph information and user profile of the player on a social network. It can also be connected to a proprietary network related to the game or the game developer.

The game can also be implemented so that it is connected to a plurality of social networks. The user can be given the option to select what information that can be derived and shared with which social network.

One example of how the game can be connected to a social network is the Facebook™'s Open Graph API allows websites and applications to draw and share information about more objects than simply people, including photos, events, and pages, and their relationships between each other. This expands the social graph concept to more than just relationships between individuals and instead applies it to virtual non-human objects between individuals, as well. A game can typically share in-game events such as that a level has been completed, that a player has passed a friend in the game or beaten a friend's high score on a level. The game can also post events, such as that a player has purchased objects in the game or received objects from other players of the game.

High Score List

When showing the pre-level screen, players are presented with the highscores of friends. This gives an opportunity to know beforehand what to aim for, and is something that increases the competitive element in the game. The information about friends' scores is derived from a social network connected to which the game is connected. It is important for further increasing the engagement and of players and to some extent viralisation, since players are constantly being reminded about the performance of others, which can incentivise players to try harder.

In some implementations, each area in the game can have a 'Candy King', meaning the player within a network of players that has the best performance on the levels in that area.

Friends' and Player's Progress Showing on Virtual Path

Another feature in the game that increases the competitive element is that friends' progress on the virtual map is shown. Even if the player has not unlocked or reached the areas in which friends are playing, their progress can still be shown by means of a picture associated with the player being displayed next to the level they are currently at.

It is also possible to invite new players to play the game. These can be invited through the game platform or through a social network to which the game is connected. In some implementations, the game suggests which players to invite. This suggestion can for instance be based on if the players have played other games from the same developer, if they are active on a social network or if they seem to like other games in the same genre. It is also possible for the suggestions to be based from data related to a social network, such as how often they interact with other players or how often they log in to the social network.

One aspect that increases the competitive element of the game is that messages can be sent to friends, for instance related to beating their scores or passing them in terms of overall level progression. In some implementations, the game prompts the player to send a message to signal that a friend has been beaten. This message can be edited by the player, or it can be a pre-defined version suggested by the game.

The messages can be generated on a server hosting the game or on a server hosting a social network to which the game is connected. Information used in the message can for instance be derived from one of the databases to which the game is connected or from databases related to networks to which the game is connected.

Sending Gifts

One aspect of Candy Crush Saga that increases the viralisation and engagement of players is the ability to send gifts to other players, which help them in the game. It is possible to give certain gifts for free, such as one extra life. The option to send free lives is available for instance through the pre-level screen and the post-level screen. When starting the game, the player is presented with a list of friends to send lives to.

After this screen, the player is presented with new messages. Gifts sent from other players are displayed under messages, and certain free gifts such as lives can easily be reciprocated.

In some implementations the game prompts players to send lives to other players that have run out of lives. When a player completes a level after receiving help from a friend, a 'thank you'-message can be sent to that friend, either automatically or manually. This message can contain an item of value. In some implementations the player helping another player can get other benefits, such as special symbols or marks being displayed next to their names. Recognition is another benefit that can be awarded to players who help others.

In the mobile version of the game, the player is presented with messages when logging in. Messages that are presented can be related to the player receiving lives and friends requesting lives. After receiving a life from a friend, the player is asked to send a life back. If choosing to send a life back in response, the friend who originally sent it will not get a request to send back yet another life. So, this chain of events has two steps if a player starts out by sending a life without request; step 1 is sending a life and step 2 is the recipient sending a life back in response. If a player starts with requesting a life, the chain of events has three steps; step 1 is requesting a life, step 2 is receiving a life, step 3 is sending a life back in response.

It is also possible to buy gifts in the Yeti shop and send these to friends. Such gifts are in the form of boosters that can be used either during a level or before a level.

Sending extra moves to a player that is stuck on a level for a certain number of days/failed attempts.

Another way of helping friends is to send extra moves. This is not something that is possible to do to all players at all times, but instead certain criteria must be fulfilled. The criteria are related to how long a player has been stuck on the same level. When selecting the icon 'Play with Friends', a list of friends is presented. Some of these friends will have been stuck on a level for an extended period of time, and the player then has an option to help these players by sending three extra moves, free of charge. These moves are different from the booster giving five extra moves, not only because the amount of extra moves is lower, but also because the booster is only usable and available on a specific level. This is a way of facilitating the harder levels of the game by receiving help from friends.

The game can also prompt the player to send extra moves to friends that have been stuck on the same level for an extended period of time. In some implementations, this period of time is two days. In other implementations, the criteria for a player being stuck is related to the amount of times they have tried and failed a level. The prompting is for instance done when a player logs onto the game. This increases engagement by helping players when the game is particularly difficult, and also adds a sense of collaboration and community among players. When a player has received extra moves this is indicated by a ribbon enveloping the node of the level in which the moves can be used.

In some implementations, the player can receive help from multiple friends. Help from multiple friends can be used at the same time or subsequently. When a player completes a level after receiving help from a friend, a 'thank you'-message can be sent to that friend. This message can have different implementations, such as the ones described in the passage above about a thank-you message related to sending lives.

Candy Crush Saga has a storyline that runs through the game. The main character is a little girl that goes around helping and defeating various creatures. At the start of the game, as well as at the start of every new episode, there are animated sequences. These sequences tell the story of how the girl goes around the world of Candy Crush Saga and how she overcomes obstacles that are presented to her.

In some implementations, an area will start off as being slightly dirty with a sad atmosphere, to become colourful and full of love and warmth as the player progresses through the levels. Areas become even more happy and colourful as the player earns more stars, even on previously completed levels.

Invite Friends

The player may in some implementations select subgroups of all available friends or filter the friends to only show the friends that also are playing the game.

The friend selection may appear when the player is to send requests to other player or ask for help. Exemplary implementations may include:

Send moves pop-up

Send lives pop-up

Invite friends pop-up

Other pop-ups which prompts the player to select friends

By way of example one implementation where the player can select to filter the friends may be based on a certain criteria such as the level of interaction the friends have had in the past or the skill level or progress in the games. These different criteria are illustrated with a pre-filtering in three tabs in a pop-up window in the game. This popup window can be automatically initiated by the game, or requested by the player through for instance pressing a button in the game.

The list of friends may be populated from friends of the player that are also active in the game or only from friends on a social network. In one implementation the default mode is that no friends have been selected. Clicking on a friend's picture or name will select that friend and a tick mar may appear to indicate that it has been selected.

Listed friends may be prioritised in the way they are shown in the list to the player. One such criteria in which the order of the listed friends show may be if they have paid for something in the game. Within that group players may be higher ranked if they have spent more money or if they have spent more money within a specific time period. Another criteria may be that the listed friends have been active in the game within a certain time period or with a certain activity level. Another criteria may be that the listed friends are ranked based on how many total game invites they have received to date, highest first.

If the user has no friends playing the game, this tab may be renamed 'Friends playing other games' and the same prioritisation may be applied to these game network players.

If the user has no friends at all playing games according to the filtering criteria then the tab may not appear.

The friends listed in the different tabs may be prioritised further. The following refers to the tabs 'all friends' and 'remind friends' but the person skilled in the art will understand that this may in some implementations also be applied to other filtered groups.

Friends are prioritised in the following way:

1. Paying players within the game company's network, in order of CLV (customer life-time value) (highest CLV first), then in order of the invites received to date for the current game (highest first)

2. Non-paying players within the game company's network, in order of CLV (if CLV is >$x; highest CLV first), then in order of invites received to date in the current game (highest first)

3. Non-users of the game company's network (in order of invites received to date in the current game, highest first)

Ideally, this list should be easy to reorganise. E.g. in month 1 the focus might be on virality, so we would prioritise the game network's players known to be viral, but in month 2 we might want to focus on monetisation, so we would want to prioritise the game network's players who spend a lot.

Prompting invitees may be stopped at some point so that they are not being spammed. For instance, invitees who have received >10 invites should no longer appear in the list.

Customising Friend Selection Pop-Ups

Friend selector pop-ups may be customized according to two factors: (1) the user who sees them, and (2) the current priorities of the game environment where it has been implemented.

For example: the game team wants to push monetization, so in the 'Send moves' pop-up the user's friends are arranged according to their spend, and so only friends with the highest spend appear in the pop-up.

The standard implementation for showing popups is to show all friends.

Reasons for customizing the popups can be several:
Increase spend (e.g. prioritise friends with high spend/CLV)
Increase retention (e.g. prioritise inactive friends)
Increase requests sent (e.g. prioritise viral friends)
Increase CTR on notifications by improving targeting (e.g. by increasing relevance to recipient)

All these give the game developer an additional tool to optimise performance of a game.

What information can be used for a typical implementation?

The players may be ranked according to a set of measures. For example:
Spend (for example how much has this player spent on in-game items over a period of time)
Virality (for instance how active is this player responding to notifications, help requests and other in-game viral effects)
Activity (for instance how active this player is playing the game; when did the player last play or how many levels have the player played)

These may also be combined—e.g. if the game team wants to reactive lapsed spenders, they might want the send moves pop-up to display each user's friends in order of spend, but to display only users who have been inactive for 10+ days.

Examples of Implementation in a System

There are many possible approaches. Customisation could be approached on a game-specific basis, using only information relating to a single game (e.g. the game could customise pop-ups using only the game's data): This information is stored in the game's own database. But customisation may be much more powerful if it used data from across the games company network, using data from all games. That information is typically stored in a database.

Customisation on a game-specific basis—the server creates the user rankings based their past behaviour in the game, and that determines which users the server sends to the client. The client would simply display the users selected.

Customisation on a game company network basis—we create user rankings based on information taken from a database, covering all their activity within the game company network. The rankings would be stored in a system, would be updated at least on a daily basis, and would be available to all games using that framework. An individual game's servers would pull the rankings out of the system, and determine which users to send to the client. The client would simply display the users selected.

Music, Sounds and Effects

Candy Crush Saga has both music and other audio effects that are important for the overall feel of the game. All sounds and music have the same warm feeling to them as the colours and animations.

Sounds and Effects

Audio effects are always played as soon as something is happening in the game whether it is due to an input from the player or if it's some kind of automated event. For example, an automated event could be when the user starts the game and a pop up appear suggesting that the player should send gifts to friends. When this pop up appear there is a discrete swishing sound to make the player aware that something happened. Another automated event could be before starting a level and a message screen shows up saying what needs to be done to pass the level before it automatically disappears again.

For all objects that can be interacted with in the game, there is always either a visual notification, a sound, or both, to let the player know that something in the interface can be interacted with. For example, in one implementation there is a shop icon that highlights, starts swinging and lets off a short sound when the mouse is hovered over it.

The sounds played to give indication of interactable objects are always non-disturbing sounds that the player does not even think about are there unless someone points it out to him.

Sounds and effects are not only there to indicate when an interaction is possible. They are also present when something is being or has been interacted with, for example a click on a button would make a certain sound and sometimes change the appearance on some of the buttons available. In one implementation a play button looks like a wrapped candy and when pressed the wrapper on the button becomes wrinkled.

Clicking on a candy when playing a level would also give a visual notification. In one implementation the candy would be highlighted and so the player will know what candy has been chosen. In another implementation a frame would appear around the chosen candy.

When making different kinds of switches there are also different kinds of sounds and animations connected to these. There is one sound if the player tries to make an invalid move, another sound for a match of three, yet another sound for a match of four and so on. When candies are removed there is a small animation of stars in the emptied space. This adds to the visual feeling of the game.

The game encourages players to make good moves, and the sounds made when generating special candies are triumphant-sounding and can give players a feeling of satisfaction.

Triggering special candies also have their unique sounds and visual effects. Animations with lines and stars are shown to emphasize how good it is to use these in the game and how much it helps the player.

If getting a cascade of matches falling one after the other then there is yet another sound together with a message shown on the screen saying either 'Delicious', 'Divine', 'Sweet' and 'Tasty' depending on how many matches were made with only one move. Together with these visual messages there is a voice saying them out loud in order to compliment and motivate the player and as a result adding more feeling to the game. The same thing happens when completing a level, there is a voice and a message saying 'Sugar crush!' in order to make the player feel like a good player.

Background Music

Music is constantly played while displaying the virtual landscape as well as when showing the game board. There can in some implementations be different music playing in a level compared to when viewing the virtual landscape.

Candy Crush Saga has implemented a background music that creates a state of mind of the player that is desirable to optimize engagement, virality and monetization.

The music is a waltz.
  dance music—human body is naturally inclined to 'dance' along (even if just subconsciously)
  strong beat falls approx. every second, feels in time with heartbeat, adds to sense of internalising the music
  the whole thing works on a subconscious level to keep the player involved in the game—mentally/subconsciously the player sings/dances along
  first few levels: whistle
  addition of 'human' sound is clever—adds a level of reality to an otherwise surreal/virtual game
  functions as question and answer (whistle provides the answer/response to the opening instrumental question)
  leads the player to subconsciously 'fill in' the answer along with the whistle
  all this, again, increases the level of absorption in the gaming experience The in-between level music (i.e. on the 'this is your score' pages)

Weird and jarring descending passages in an unusual mode—creates a slightly unpleasant and jittery feeling after the contrasting happy/swinging/jolly music of the game play->subconsciously makes the player speed up and get onto the next gameplay screen where 'normal' tonality and harmony resume!

The speed of the music in gameplay mode—
  a waltz has three beats in a bar (ONE two three|ONE two three|ONE two three, etc.)
  although strong beat of the waltz falls every second, giving impression of gentle calm pace, the actual beats (one, two and three) are quite fast (i.e. three to a second)—this speed in the music creates a pressure on the player.
  so the player is really absorbed in game and music, and is unwittingly spurred to play quickly (increasing the pressure, feeling of challenge, thrill, excitement, whatever you want to call it) because of this constant push from the music's tempo. Still there is a calm feeling.

The music experience is subtle, sly and effective!

See for instance the method and system described in U.S. application Ser. No. 13/479,107 filed on 23 May 2012 and incorporated in this document.

The system and method described herein can be implemented together with a game, in which players can see their own and also their social network friends' game level position on a virtual path (or other virtual world) and in which game state information is fully synchronised across different platforms, such as iOS, desktop and Android via Facebook or other online social network, so that a player can seamlessly stop and re-start playing the game on any of those different platforms.

Different Devices

Some implementations of the game allows for the game to be synchronised between different devices or platforms.

The game can for instance be played in an offline mode on a handheld device using locally stored information on the handheld device. The device can store all or some of the levels that are available for the player to play in the game. Some of the features in the game can be locally run on the device and dependent on the local machine. This can for instance be that if the game is implemented to regenerate lives after a certain period of time, then the time can be locally decided based on the clock on the device. In some implementations, the central game server clock can override the local clock when the local device has been synchronised with the server.

A game can be implemented so that the player knows if it has synchronised the available data with the central server or servers. This can for instance be through a coloured symbol or a check mark that indicates that the information is up to date.

The game can also indicate if it has been able to establish a connection with the central server for synchronisation or if for instance the network connection is down. That the device is offline can for instance be illustrated with a greyed out icon.

Different Platforms (FB/Google+)

The game can be implemented to synchronize game state information and/or retrieve and connect to the social graph information and user profile of the player on a social network such as Facebook or Google+.

The game can also be implemented so that it is connected to a plurality of social networks. The user can be given the option to select what information that can be derived and shared with which social network.

One example of how the game can be connected to a social network is the Facebook™'s Open Graph API allows websites and applications to draw and share information about more objects than simply people, including photos, events, and pages, and their relationships between each other. This expands the social graph concept to more than just relationships between individuals and instead applies it to virtual non-human objects between individuals, as well. A game can typically share in-game events such as that a level has been completed, that a player has passed a friend in the game or beaten a friend's high score on a level. The game can also post event such as that a player has purchased objects in the game or received objects from other players of the game.

Features that may be implemented using the inventions described herein

Having various elements to combine in the game.

There are six different game elements (candies). They can be combined in series of 3, 4 or 5 in a line, either row or a column, in a 2×2 square, or in combinations in the shape of a T- or L-form.

Having Game Elements with a Certain Size

The game elements have certain sizes, all similar but not identical, making it possible to have a specific maximum number of rows and columns with candies.

Having a transparent area for the game board.

The game board is dark, semi-transparent and placed on top of a background picture which is tied to the story of the game.

Having a specific area for each separate game element.

In the game board, each element has a square space that is delimited by light horizontal lines and darker vertical lines. The lines do not cover the full square, but leave a gap in all the corners.

Adding Extra Obstacles and Difficulties to Complete a Level

New special game elements are introduced throughout the game to increase the difficulty. For example a layer which has to be removed by matching a candy covered by the layer (Jelly) or an impassable block that has to be removed by matching candies next to it a number of times (Frosting).

Having another challenge for the level.

Most levels have two separate goals, one involving certain actions (remove jelly, get fruits to the bottom) and another related to score. This makes for a more challenging game.

Rewarding the Player with Points for Matching Combinations

The player is awarded points for each combination of at least 3 candies, enabling high score comparisons with other players as well as a challenge to beat oneself Showing What Points the Player is Earning The amount of points gained by a combination is shown upon completing a combination, in the same colour as the candies used in the combination.

Getting a Certain Amount of Points for Removing a Certain Amount of Game Elements The score given for different combinations is not linear, but formed in a way to encourage longer combinations and a more thought out approach of playing the game.

Give Bonus Points in the Form of Certain 'Schemes' to Player when Finishing a Level Sooner than Necessary When a player finishes with moves left, bonus points are awarded. These bonus points may be awarded by i) triggering any remaining special elements on the gameboard and ii) randomly placing special game elements on the board and then triggering them.

Having an Item that Removes Three Columns or Rows

There is a booster that removes three columns by turning three candies into striped candies. This booster is in the form of a coconut wheel.

Different Combinations of Games Elements Return Special Game Elements

By making certain combinations of candies, special game elements will be produced. These are formed by making combinations of 4 candies in a row or column (striped candy) 4 candies in a 2×2 grid (fish), 5 candies in a row or column (colour bomb), L or T-shapes of 5 candies (bomb candy).

One game element that when combined with the same colour removes all elements in that row or column.

A colour bomb-candy will be produced by combining 5 candies in a row or column. This item will either remove all candies of a certain colour (if combined with a regular candy), or it will remove all elements on the gameboard (if combined with a bomb candy) or it will transform all candies of the same colour into striped candies that subsequently trigger (if combined with a striped candy).

One Game Element Removes all Elements in a Certain Radius

By combining 5 or 6 candies into a L-shape or a T-shape, a bomb candy will be produced. This removes elements in a rectangle shape with a three-candy diameter.

Receive a Special Effect when Combining Striped Game Elements with Each Other

It is possible to combine striped candies, when doing so one column and one row of candies will be removed.

Receive a Special Effect when Combining a Striped Game Element with Bomb Candy

It is possible to combine a striped candy with a bomb candy, when doing so three columns and three rows of candies will be removed, originating from the spot where the combination was made.

Receive a Special Effect when Combining Two Bombs

It is possible to combine two bomb candies with each other. When doing so a rectangle shape with a diameter of 5 candies will be removed by each combined bomb candy.

Visualize the Effect when Combining a Striped Element with the Element Received from L- and T-Shapes When combining a striped candy with a bomb candy, a special visual animation is triggered in the form of a giant candy moving first horizontally in both directions from the point of origin, then vertically.

Have a Combination that Transforms Other Elements

When combining a colour bomb with a striped candy, all other candies of that colour will also be transformed into striped game elements that automatically trigger.

Having and Showing a Map of the Game

The player progresses through the levels of the game, which is visually represented on a map. This gives the player a more tangible way of seeing progress than if levels were just represented by a number.

Having an Indicator Showing which Level the Player has Reached

The highest level reached by a player is indicated by the corresponding node being highlighted orange. This makes it easy for the player to find the current level and also facilitates the visualization of how far he has progressed.

To Show that a Level or Part of the Game is not Yet Available to Play

All available levels in Candy Crush can be viewed in the map, even though they haven't been unlocked. However, a padlock symbol is shown to represent that a level is yet to be unlocked and that it currently cannot be played.

Having an Welcoming Message Displayed at the Start of the Game

At the start of Candy Crush the player is greeted by an encouraging message: "Your adventure starts today! Click here to play level 2!"

To have a Tutorial

Candy Crush offers a tutorial in the beginning of the game to introduce the player to new concepts. Basic concepts, possible combinations and the different game modes are explained among other things.

Multiple Game Modes

Different game modes makes for a more diverse game. Candy Crush offers at least seven different game modes—Score, Jelly, Ingredients, Orders, Time, Jelly Bear, and Lemonade.

To have Blocks that have to be Removed Before Objects can Pass Through

There are game elements in Candy Crush that have to be removed before objects can pass through the space they occupy. These are in the form of frosting blocks and require candies to be matched next to them a certain amount of times before they disappear.

Giving the Player Information about a Chosen Level and the Option to Use Extra Boosters When selecting a level from the map-view, information about the level is displayed together with an array of boosters that can be purchased and/or activated for that level. Information include previous scores of friends and specific instructions for the current level.

To Display Friends' Highscore

The previous high score of friends can be seen before playing a level, while playing a level and after a level has been played (provided that friends have played the level before). This increases competition and gives a sense of community at the same time.

To Give the Player the Option to Use Extra Boosters

The player can select boosters before playing a level as well as during the play of a level. The boosters which can be used in the two situations differ. This facilitates and adds more depth to the game.

Share a Result with Friends

After finishing a level, the player will get feedback to how his score relates to that of friends playing the game. An option is given to share results with friends, possibly accompanied by a message saying something along the lines of 'I beat your score'.

To Show the Player how Well a Level is being Completed

The player is provided real-time feedback in relation to the score during play of a level. This is done by a meter being filled, the meter having three different levels represented by one, two and three stars respectively.

Have Aesthetic Icons for Showing Results of Finished Levels.

In the map-view, the player can see results of previously completed levels in the form of how many stars were attained in those levels. This makes for an easy overview of the overall performance in the game.

Giving the Player a Maximum Amount of Life that is Restored Over Time

The player starts with 5 lives that are used up when failing to complete a level. These lives are then replenished with one life every 30 minutes.

Having an Algorithm for Reshuffling and Recognizing when there are No Possible Moves Left Candy Crush very quickly recognizes when there are no possible moves left. When that occurs, the candies on the game board are re-shuffled. When re-shuffling, there will be no combinations automatically triggering, i.e. 3 or more candies are not placed adjacent to each other.

A Match 3-Game with Boosters Usable Across Different Platforms

A match 3 switcher game, in which players can see their own and their social network friends' game level position on a virtual path, in which the game is fully sync'd across different platforms, such as iOS, desktop and Android via Facebook, and, in which the gameplay for each level can be enhanced through the use of an acquired item.

The acquired items can be synchronized across all of the platforms where the game is played by the user.

A Match 3-Game with a Mode to Bring Down Objects

A match 3 switcher game, in which players can see their own and their social network friends' game level position on a virtual path and, in which the game board contains switchable elements that can be matched with other switchable elements and switchable elements that cannot be matched with other switchable elements on the game board, where one of the goals for completing a level is to interact with the game board in such a way that a predefined number of non-matchable switchable elements are placed in any of a plurality of predefined areas on the game board.

A match 3-game with multiple different objectives

A match 3 game in which the player has to satisfy a plurality of criteria within a limited number of moves to complete the level; the criteria include at least one of the following:

reaching a target score removing matchable game elements to clear a path for a non-matchable game element to get to a predefined area on the game board clear a predefined number of a certain type of game items layered on the game board having a matchable game element together with each of the layered game items, each layered game item can be removed by removing a matcheable game element in the same position as the layered game item.

Bring a game object (a bear in a bubble) to a predefined level on the gameboard.

Uncover a game object (jelly bear) that occupies one or more tiles by removing jelly blocks that overlay said game object.

Figure 26:
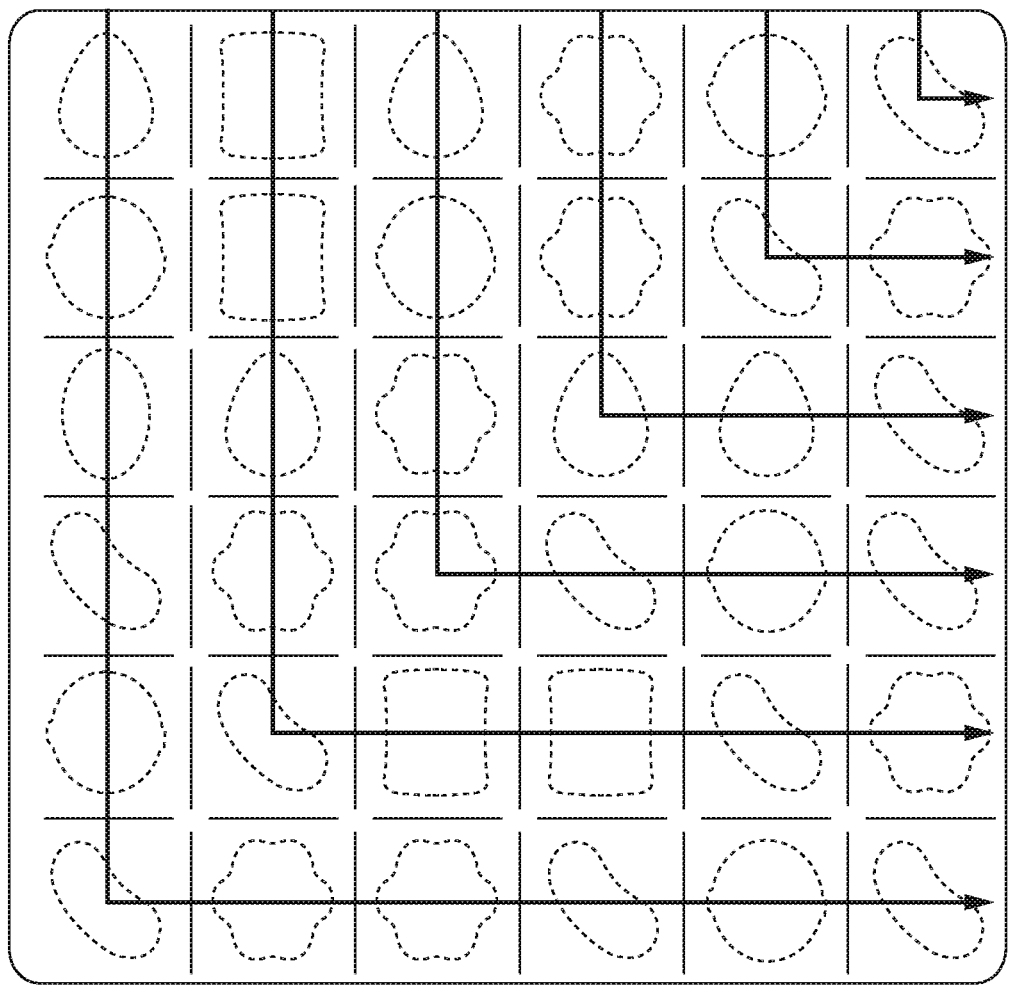
FIG. 26 shows an alternative implementation of the flow of falling game elements.

FIG. 26 illustrates an alternative implementation where new candies fall down from the top of the game board and then change direction to the right before starting to fall upwards again. The arrows in FIG. 26 indicate the direction of the falling candies.

Figure 27:
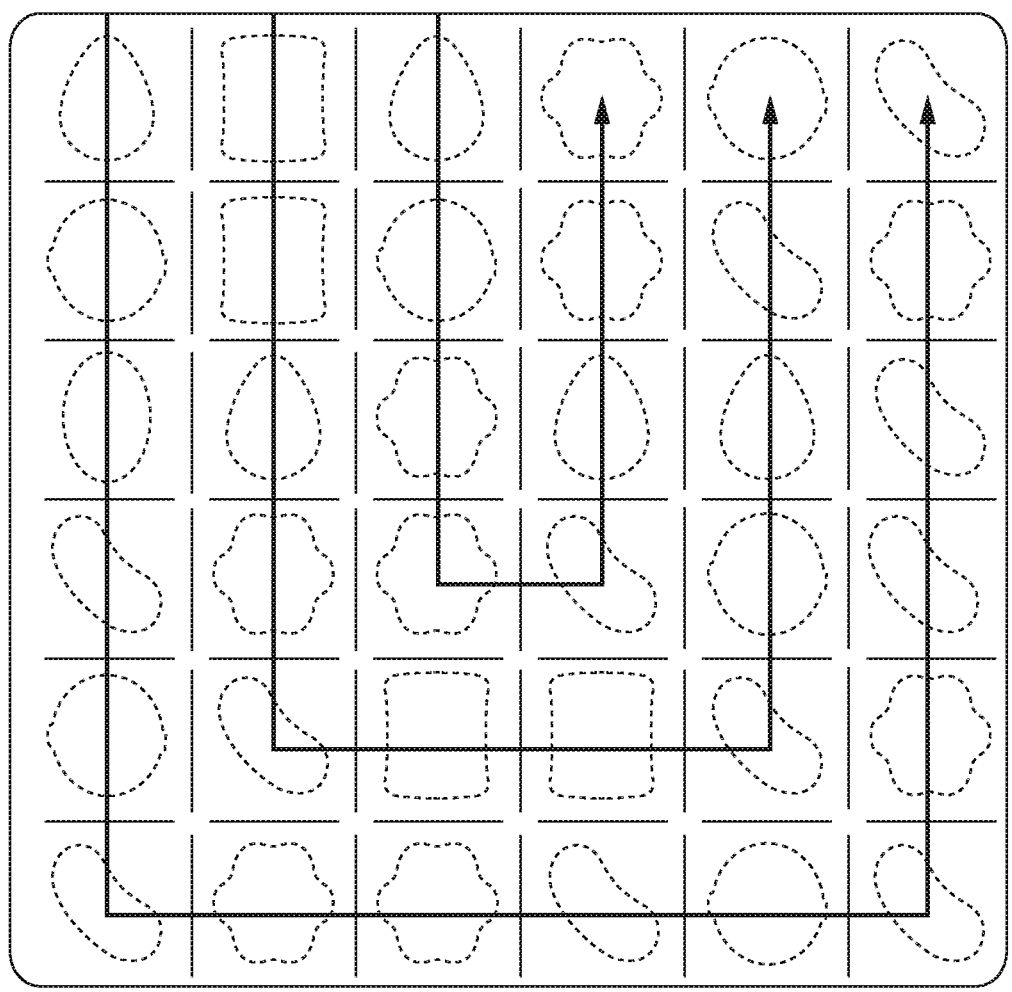
FIG. 27 shows an alternative implementation of the flow of falling game elements.

FIG. 27 shows another alternative implementation of the flow of falling candies; the arrows indicating the direction of the candies.

The invention claimed is:

1. A computer device having:
   a user interface configured to display user actuatable game elements, each user actuatable game element displayed on a respective tile, and to detect user input when a user engages with at least one of said user actuatable game elements;
   a processor configured to receive a detected user input and on detecting a match game condition of at least three user actuatable game elements to control the user interface to remove the at least three game elements from their respective locations on the display and to provide on the user interface replacement user actuatable game elements, wherein the manner of providing each replacement user actuatable game element has a graphical representation governed by the tile on which the user actuatable game element is displayed, wherein each tile has a selectable physics which controls at least one of (i) the direction in which it moves to replenish a vacancy left by the removed user game elements; and (ii) the speed at which it moves to replenish the vacancy, wherein the processor is configured to alter the physics for a subset of the tiles based on the user input of a user engaging with the user actuatable game elements at the user interface.

2. A computer device according to claim 1, comprising a data structure, wherein each tile has a tile identifier, the respective tile identifier for each tile having a vacancy defining the location from which its game element was removed, and for each of the subset of the tiles defining the altered physics of the tile wherein the processor is configured to select the physics for each tile based on user input at the user interface.

3. A computer device according to claim 1, wherein the processor is configured to select the physics for the tile of each replacement game element based on the location on the display from which the at least three game elements are removed.

4. A computer device according to claim 1, comprising a graphics controller which is connected to receive information from the processor defining the graphical representation and to supply the graphical representation to the user interface in the form of a video sequence based on the physics of the tile.

5. A computer device according to claim 1, wherein the user interface is configured to display each tile with a visual indication of its selected physics.

6. A computer device according to claim 5, wherein the visual indication is colour.

7. A computer device according to claim 1, wherein the user interface is configured to display a separator between tiles of a first physics and tiles of a second physics.

8. A computer device according to claim 7, wherein tiles of the first physics move in a direction to replenish a vacancy downwards from an upper portion of the screen, and tiles of the second physics move in the direction to replenish a vacancy upwards from a lower portion of the screen.

9. A computer device according to claim 1, wherein the selectable physics controls a direction in any orientation in either the Cartesian or polar axes for replenishment of tiles from an outer portion of a game board to an inner portion of a game board.

10. A computer device according to claim 1, wherein the user interface is controlled by the processor to sequentially apply a visual effect to sets of tiles, thereby indicating physics of the tiles.

11. A computer device according to claim 10, wherein the visual effect is applied in a first direction in a set of rows above a separator and not in a set of rows below the separator.

12. A computer device according to claim 1, wherein the number of replacement game elements is the same as the number of game elements in the match condition.

13. A computer device according to claim 1, wherein a game board of the game elements is generated by the processor, but only a portion of the game board is displayed to a user, with subsequent portions of the game board being displayed as a result of a scrolling action displayed on the user interface.

14. A computer implemented method of controlling a user interface responsive to user engagement with displayed user actuatable game elements on the interface, the method comprising the following steps implemented by a processor of a computer device;
　　receiving user inputs of a user engaging with at least one of the user actuatable game elements, each user actuatable game element displayed on a respective tile;
　　altering a physics for a subset of the tiles based on the user inputs of a user engaging with the user actuatable game elements;
　　detecting a match game condition of at least three user actuatable game elements responsive to user input;
　　removing the at least three game elements from their respective locations on the display;
　　generating replacement game elements to be displayed at the respective locations, each game element associated with a tile having its selected tile physics; and
　　controlling a graphical representation on the user interface of replacing the game element based on the altered tile physics, wherein the tile physics controls at least one of (i) the direction in which it moves to replenish the vacancy left by the removed game elements; and (ii) the speed at which it moves to replenish the vacancy.

15. A method according to claim 14, wherein the user interface displays a game board of game elements in rows, and wherein there is a visual indication of the tile physics associated with each tile in a row, wherein all tiles in the same row have the same physics.

16. A method according to claim 14, wherein a portion of the game board is displayed on the user interface, the displayed portion varying as a result of a scrolling action to display different portions of the game board on the display.

17. A method according to claim 16, wherein when a first portion of the game board is displayed on the display the target row is not visible to a player, and wherein when a second portion of the game board is displayed on the display as a result of said scrolling action, the target row comes into a view of the player.

18. A computer device having:
　　a user interface configured to display user actuatable game elements, each user actuatable game element displayed on a respective tile, and to detect user input when a user engages with a game element;
　　a processor configured to receive a detected user input which swaps adjacent game elements to create a match game condition in which at least three adjacent game elements are of the same type and to control the user interface to remove the at least three game elements from the display and to provide on the user interface replacement user actuatable game elements, wherein the manner of providing each replacement game element has a graphical representation governed by a tile associated with each game element, wherein each tile has a selectable physics which controls at least one of (i) the direction in which it moves to replenish a vacancy left by the removed user game elements; and (ii) the speed at which it moves to replenish the vacancy, wherein a first subset of the tiles has a first physics wherein the first physics controls at least one of the direction to be a first direction and a speed to be a first speed, and
　　a second subset of the tiles has a second different physics which controls at least one of the direction to be a second direction, different from the first direction and a second speed, different from the first speed.

19. A computer device according to claim 18, wherein the physics for the tiles are altered based on user input at the user interface.

20. A computer device according to claim 18, wherein the processor is configured to select the physics for the tile of each replacement game element based on the locations on the display from which the at least three game elements are removed.

* * * * *